(12) United States Patent
Ogata et al.

(10) Patent No.: US 9,261,682 B2
(45) Date of Patent: Feb. 16, 2016

(54) ZOOM LENS

(71) Applicant: OLYMPUS CORPORATION, Tokyo (JP)

(72) Inventors: Yasuji Ogata, Tokyo (JP); Hirohiko Kimata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/172,325

(22) Filed: Feb. 4, 2014

(65) Prior Publication Data

US 2014/0218808 A1    Aug. 7, 2014

(30) Foreign Application Priority Data

Feb. 5, 2013  (JP) .................................. 2013-020376
Feb. 5, 2013  (JP) .................................. 2013-020377
Feb. 5, 2013  (JP) .................................. 2013-020378

(51) Int. Cl.
| | | |
|---|---|---|
| *G02B 3/02* | (2006.01) | |
| *G02B 9/62* | (2006.01) | |
| *G02B 15/14* | (2006.01) | |
| *G02B 15/173* | (2006.01) | |
| *G02B 27/64* | (2006.01) | |
| *G02B 15/17* | (2006.01) | |
| *G02B 13/00* | (2006.01) | |

(Continued)

(52) U.S. Cl.
CPC .............. *G02B 15/173* (2013.01); *G02B 15/14* (2013.01); *G02B 27/64* (2013.01); *G02B 9/62* (2013.01); *G02B 13/009* (2013.01); *G02B 15/17* (2013.01); *G02B 15/20* (2013.01); *G03B 5/00* (2013.01); *G03B 21/14* (2013.01)

(58) Field of Classification Search
CPC .... G02B 15/14; G02B 15/173; G02B 15/177; G02B 15/20; G02B 17/023; G02B 27/64; G02B 27/646; G02B 7/008; G02B 13/009; G02B 15/163; G02B 15/17; G03B 5/00; G03B 3/02; G03B 21/14; H04N 5/225; H04N 5/23296
USPC ......... 359/713, 752, 756, 757, 766, 557, 676, 359/683, 684, 686
See application file for complete search history.

(56) References Cited

U.S. PATENT DOCUMENTS 7,280,286 B2 * 10/2007 Hayakawa .................... 359/686
7,289,274 B1    10/2007 Saori (Continued)

FOREIGN PATENT DOCUMENTS

| JP | 2007-212830 | 8/2007 |
|---|---|---|
| JP | 2010-191336 | 9/2010 |

(Continued)

*Primary Examiner* — Loha Ben
(74) *Attorney, Agent, or Firm* — Kenyon & Kenyon LLP

(57) ABSTRACT

A zoom lens comprises a first lens unit G1 having a positive refractive power, a second lens unit G2 having a negative refractive power, a third lens unit G3 having a positive refractive power, a fourth lens unit G4 having a negative refractive power, a fifth lens unit G5, and a sixth lens unit G6 having a positive refractive power. Zooming from a wide angle end to a telephoto end is carried out by changing a distance between the lens units, and a distance between the first lens unit G1 and the third lens unit G3 narrows at the telephoto end than at the wide angle end, and the first lens unit G1 is stationary at the time of zooming from the wide angle end to the telephoto end, and lens units from the second lens unit G2 to the fifth lens unit G5 move.

80 Claims, 26 Drawing Sheets

(51) Int. Cl.
   *G02B 15/20* (2006.01)
   *G03B 5/00* (2006.01)
   *G03B 21/14* (2006.01)

(56) References Cited

U.S. PATENT DOCUMENTS

| 7,532,412 | B2 * | 5/2009 | Hatada | 359/688 |
| 7,535,657 | B2 * | 5/2009 | Kuroda et al. | 359/757 |
| 7,848,028 | B2 * | 12/2010 | Ohtake | 359/683 |
| 8,416,506 | B2 | 4/2013 | Ito | |
| 8,537,249 | B2 | 9/2013 | Imaoka et al. | |
| 8,867,143 | B2 * | 10/2014 | Taki | 359/684 |
| 8,908,284 | B2 * | 12/2014 | Tashiro et al. | 359/683 |
| 2014/0009832 | A1 * | 1/2014 | Sugita | 359/557 |
| 2014/0118839 | A1 * | 5/2014 | Sugita | 359/683 |

FOREIGN PATENT DOCUMENTS

| JP | 2011-186095 | 9/2011 |
| JP | 2012-047814 | 3/2012 |

\* cited by examiner

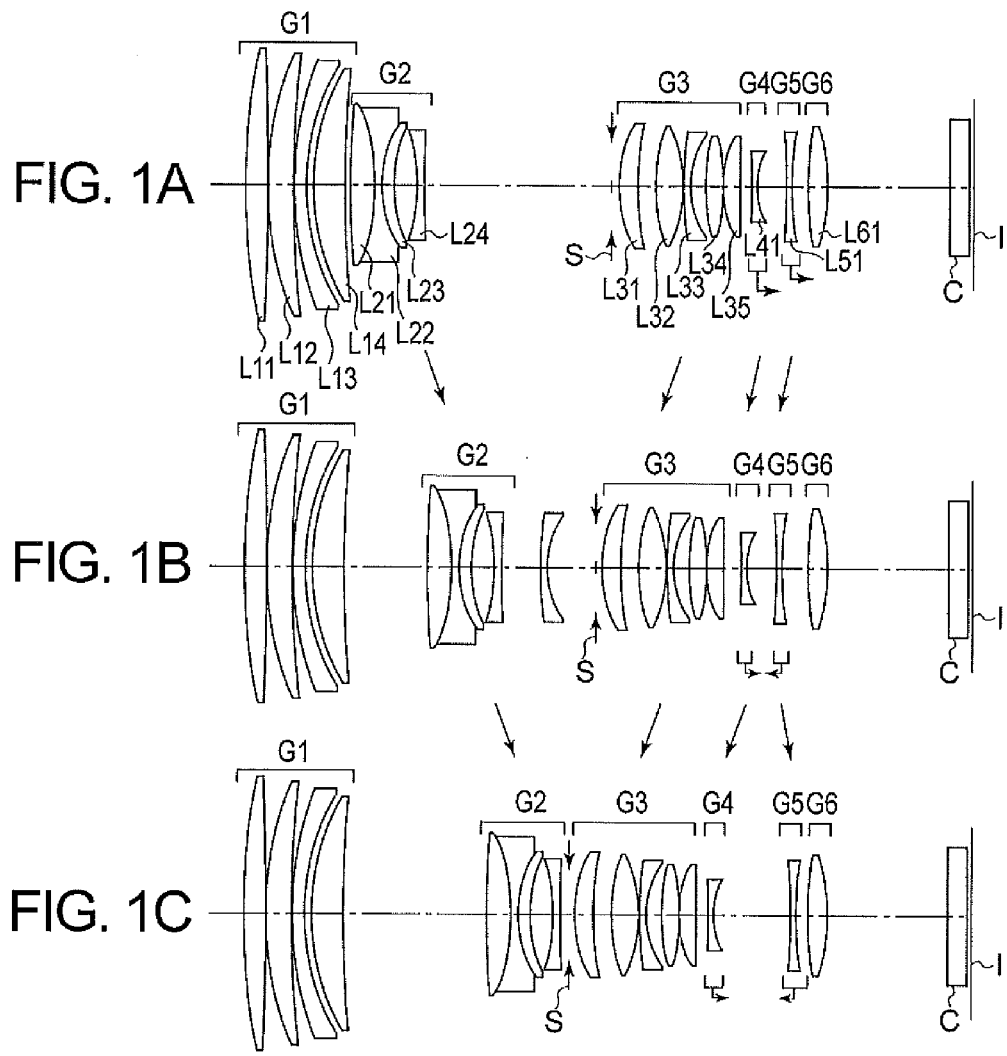

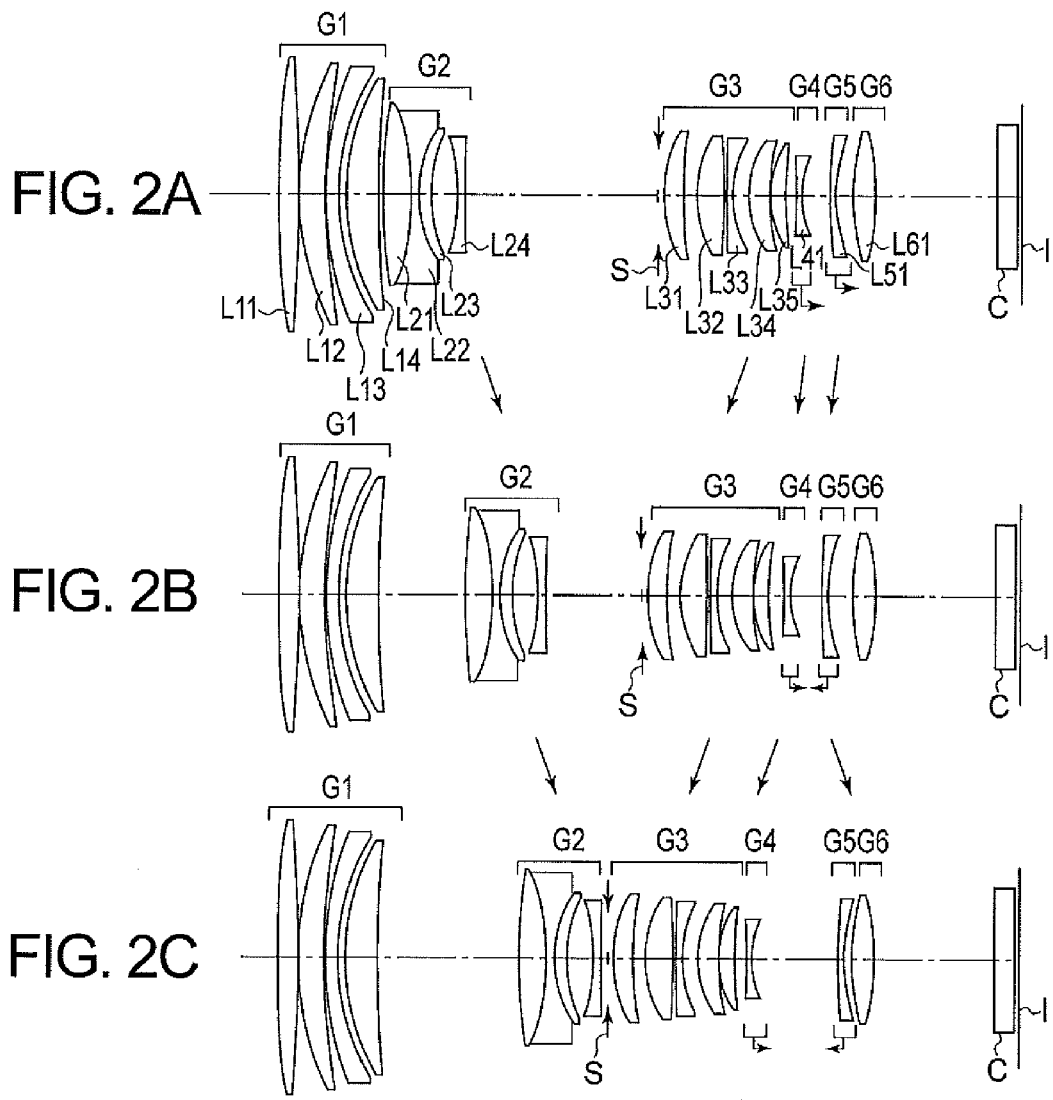

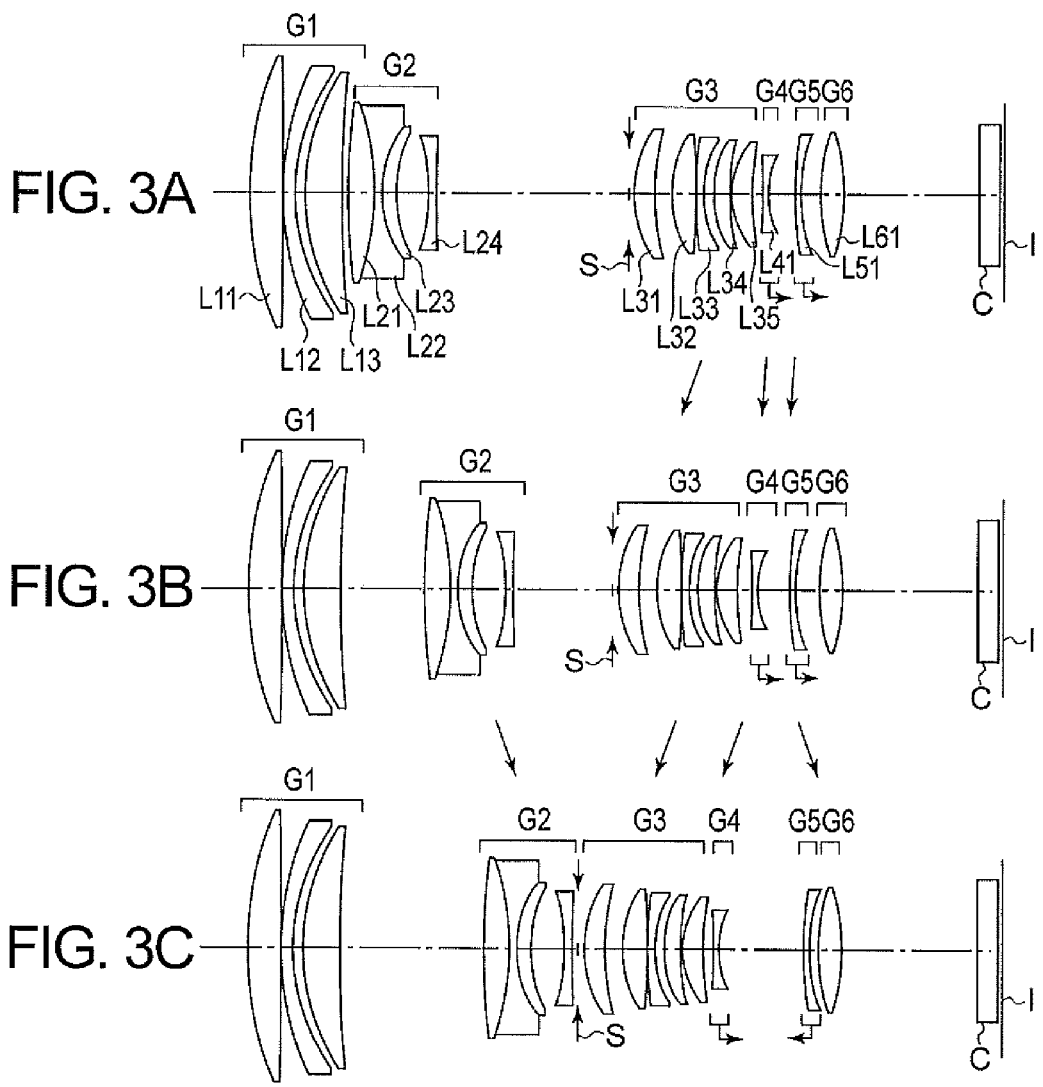

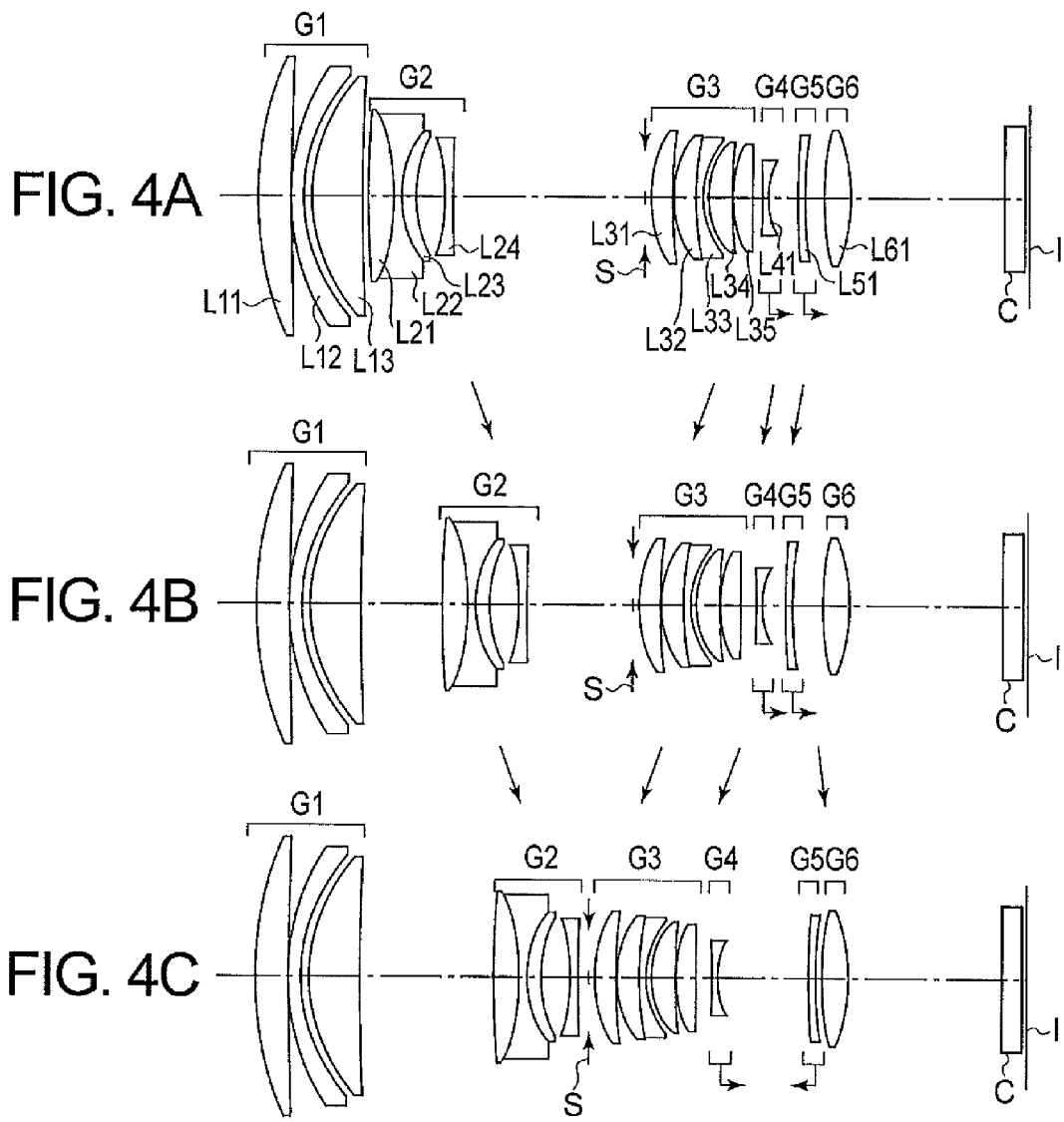

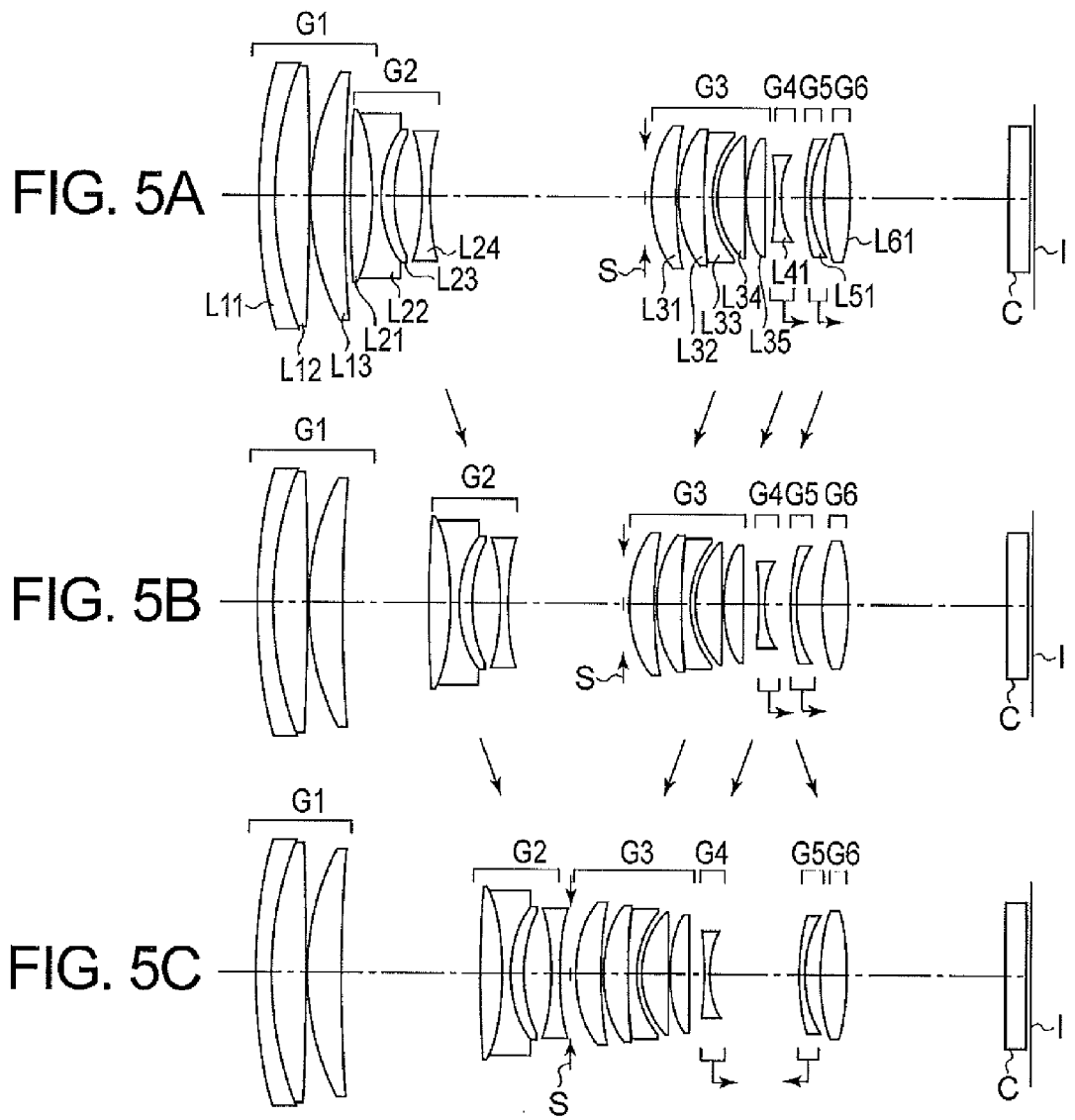

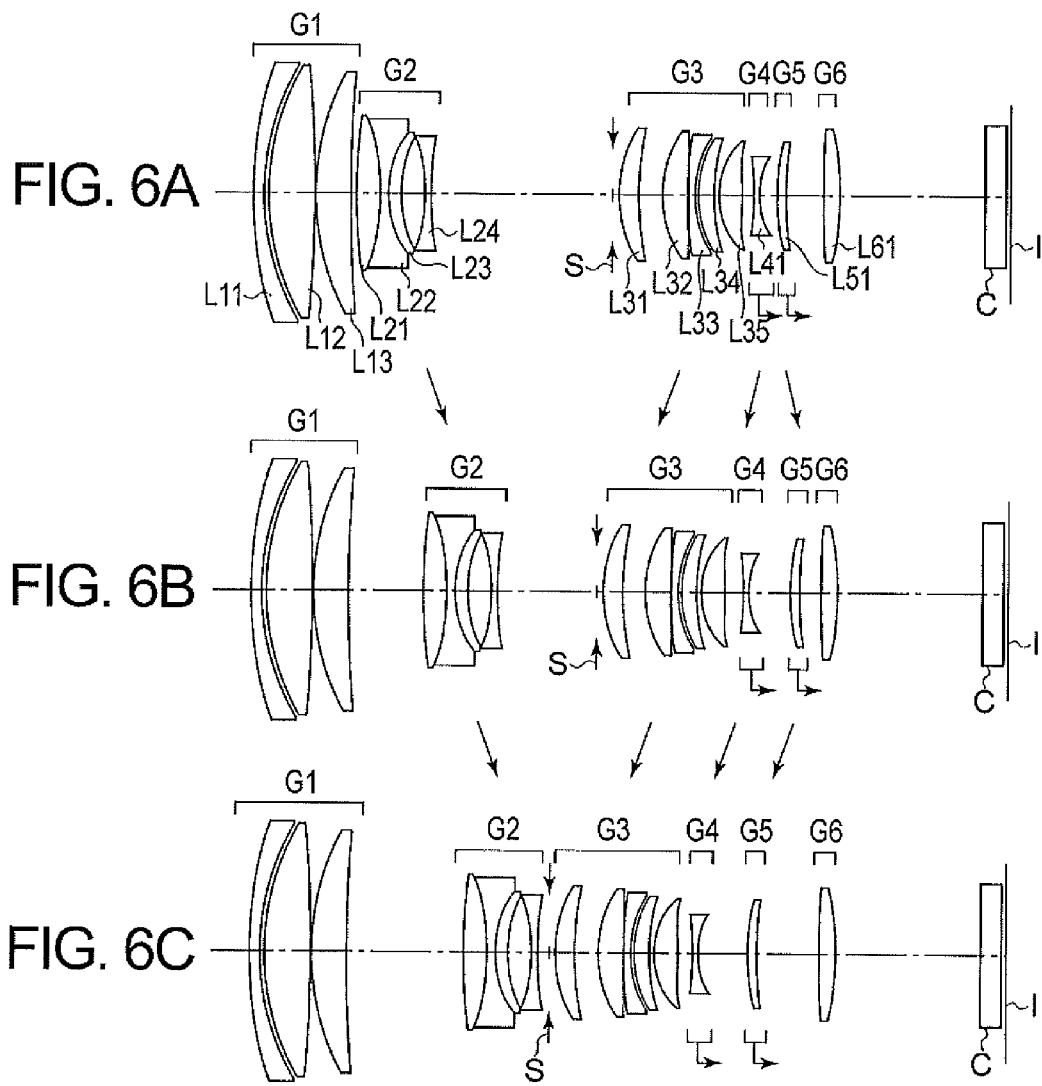

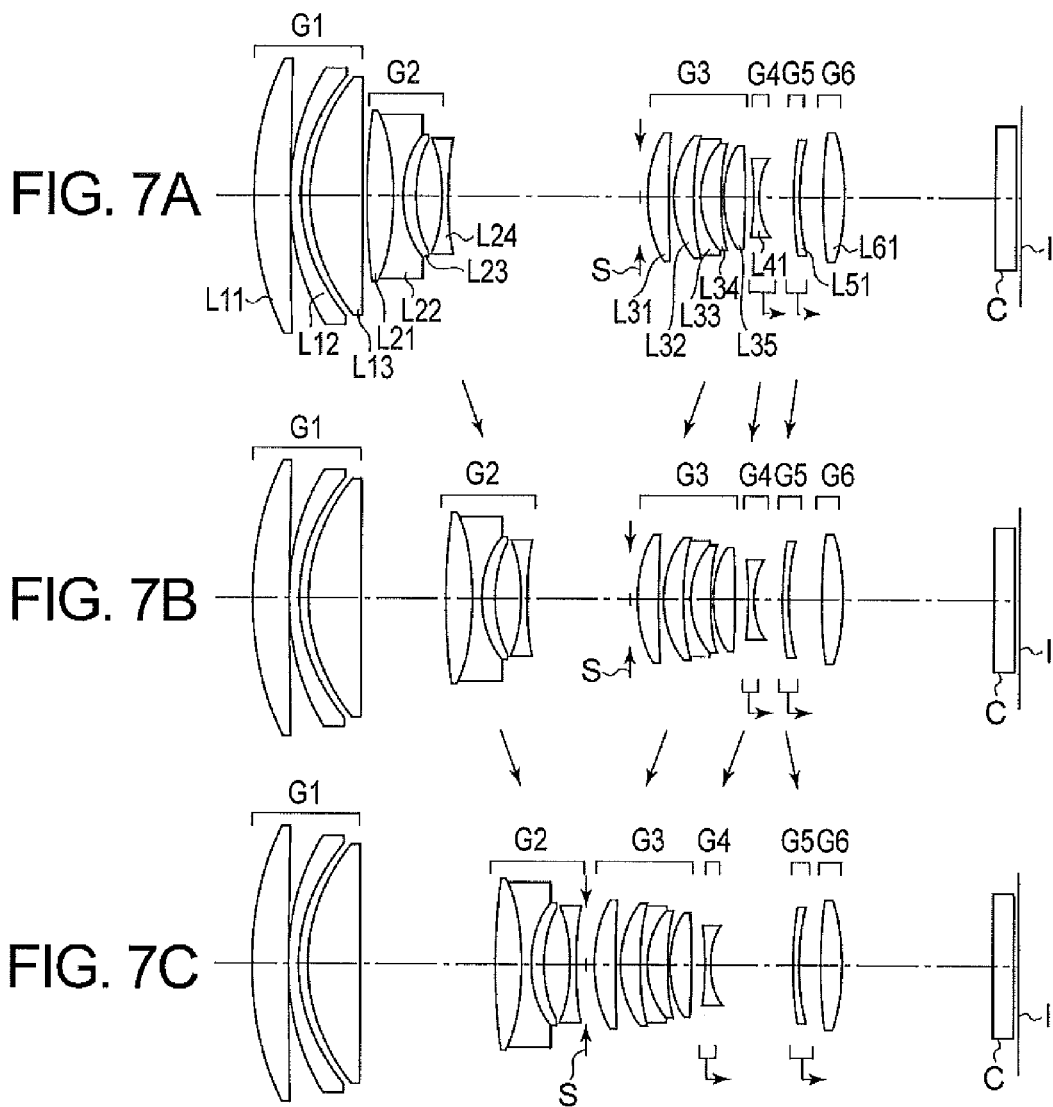

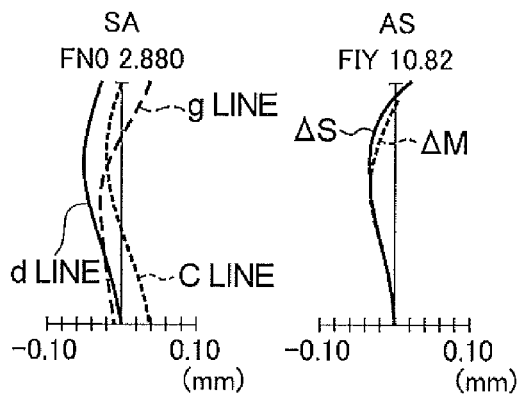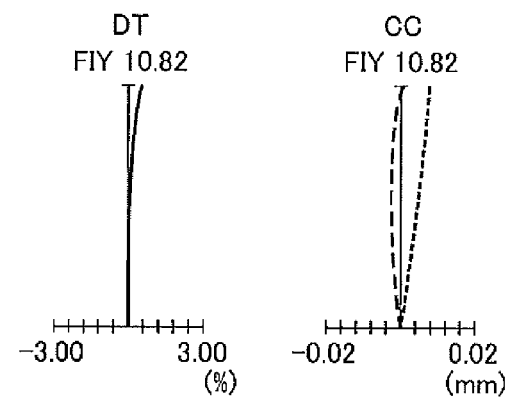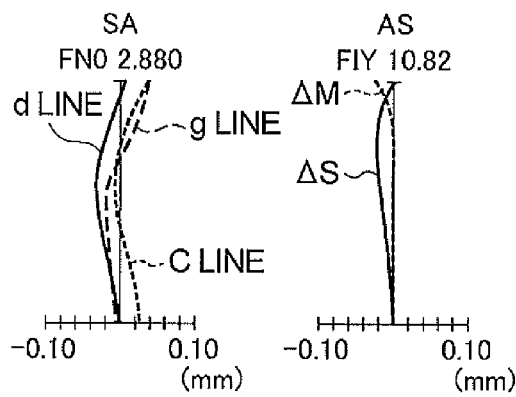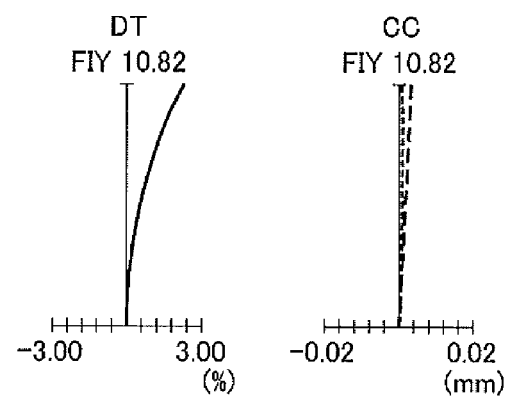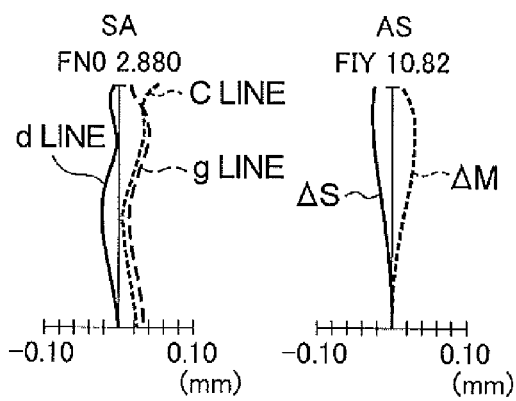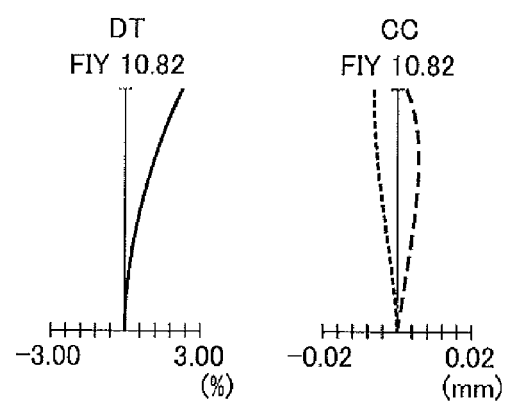

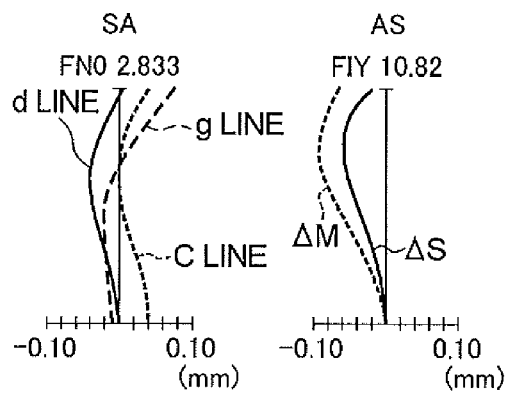
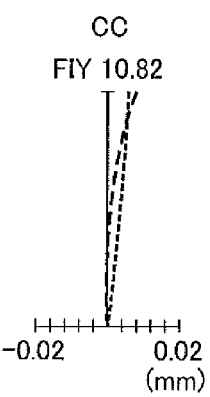
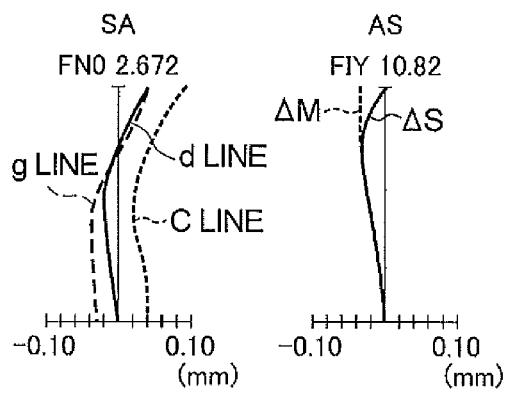
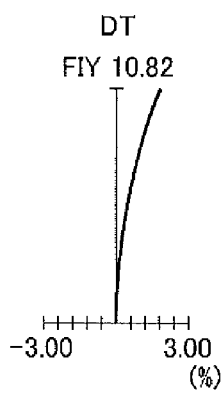
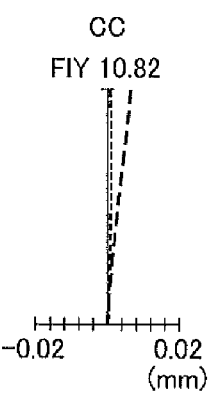
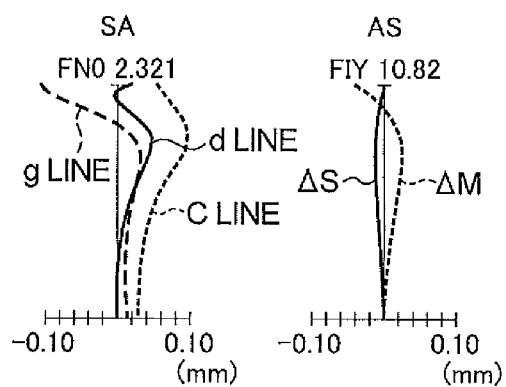
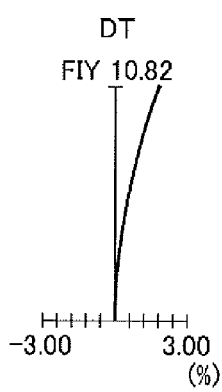
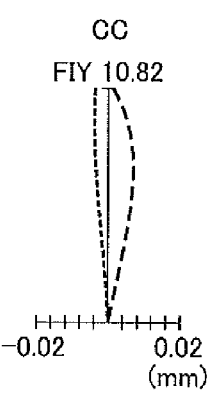

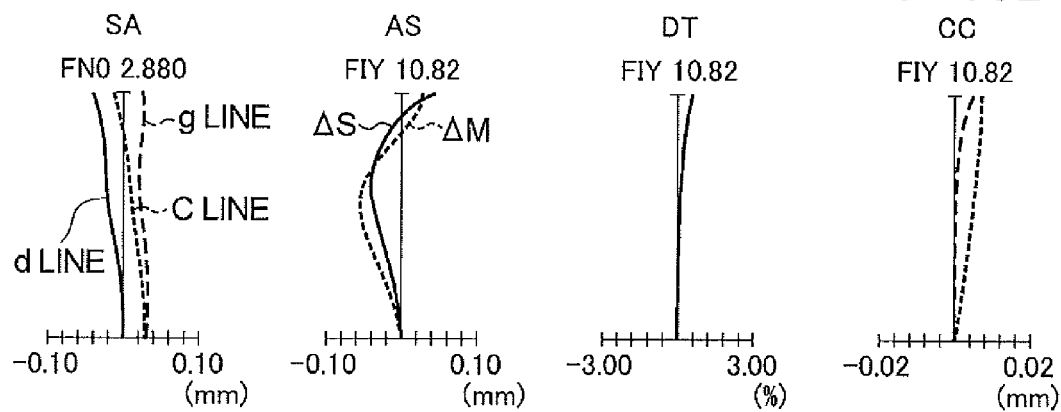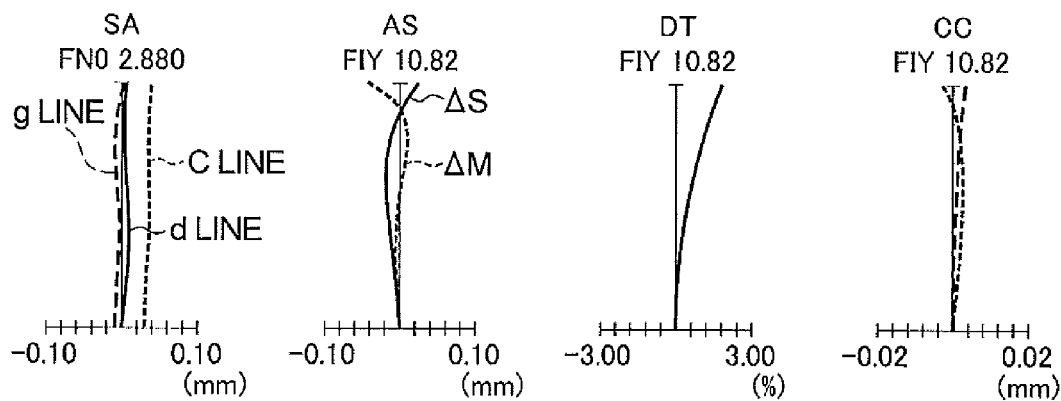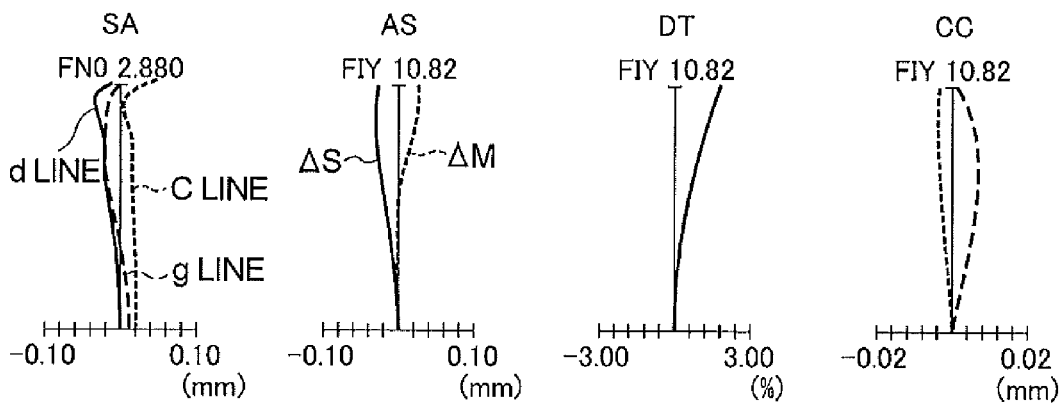

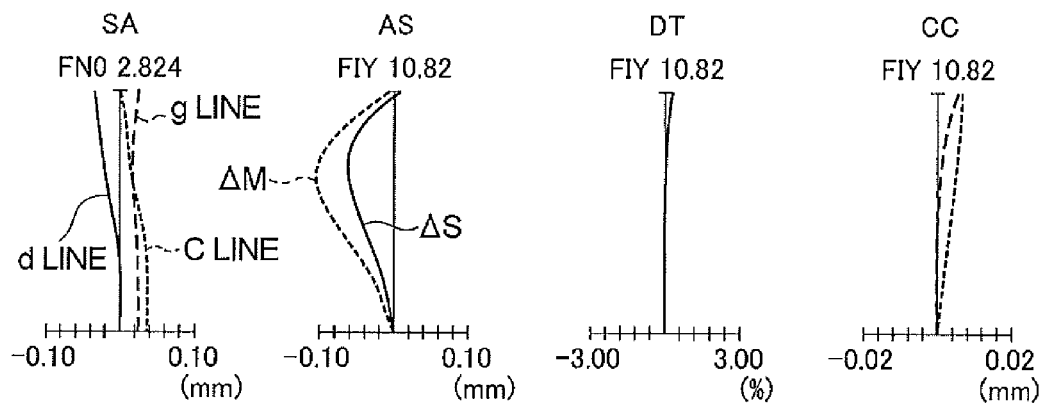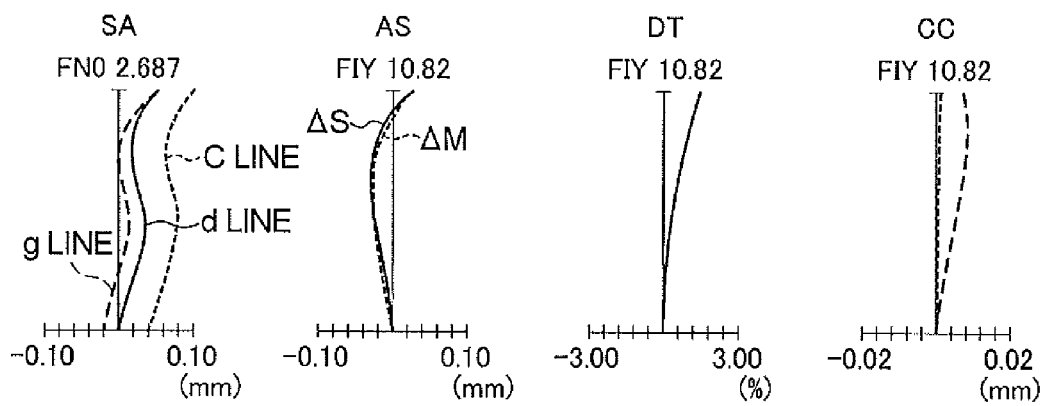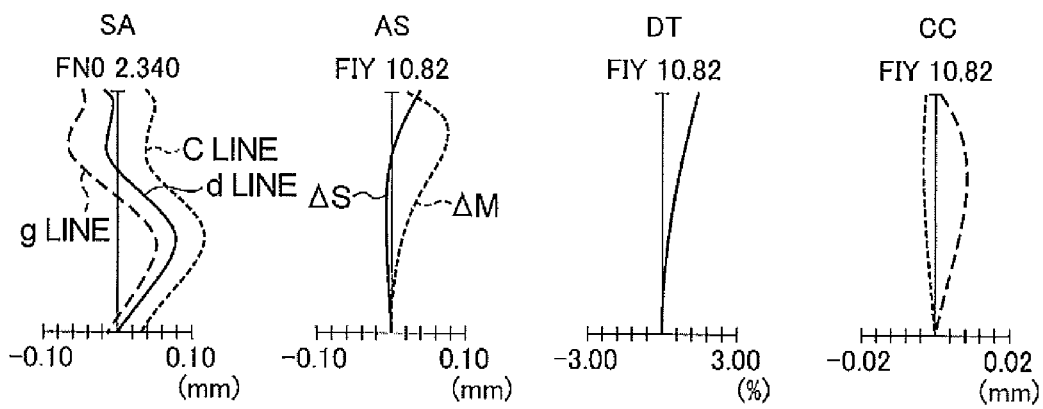

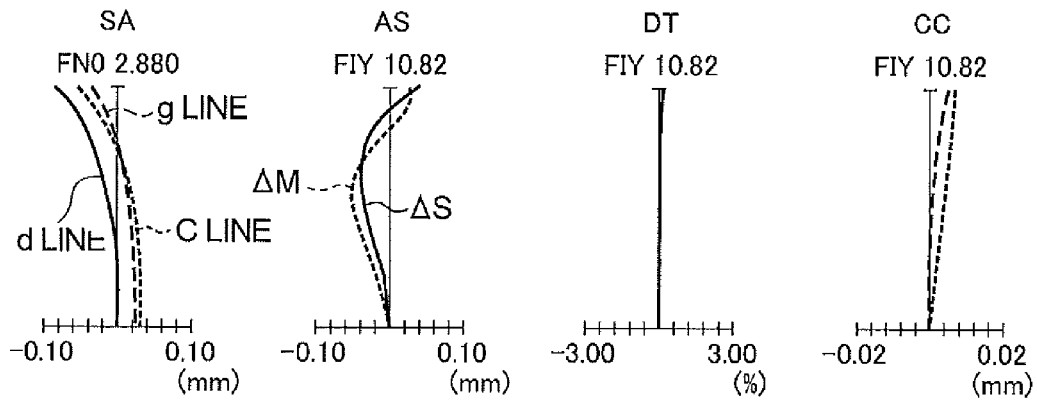
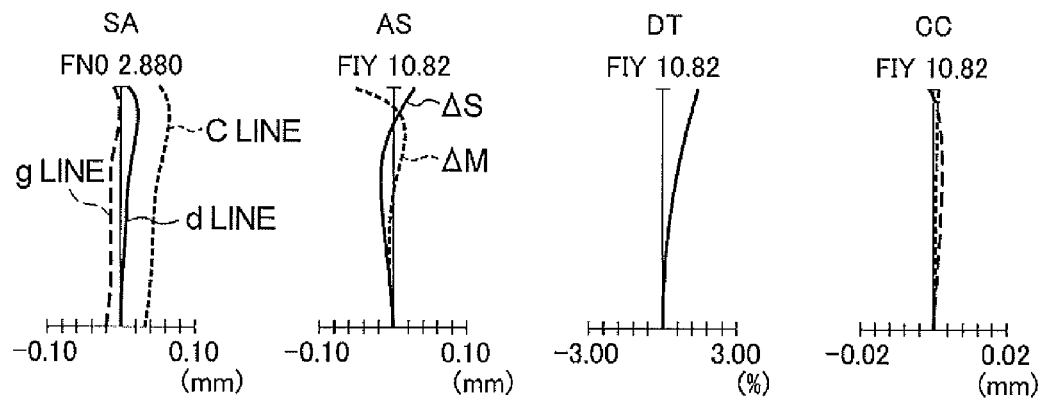
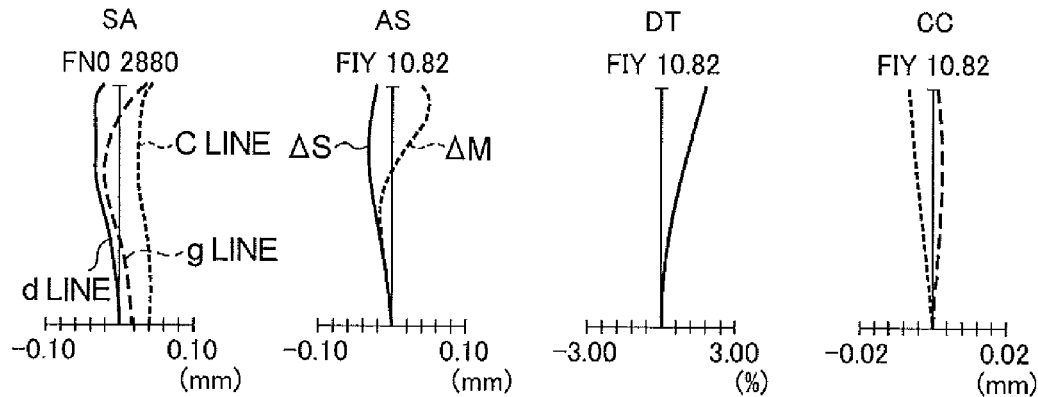

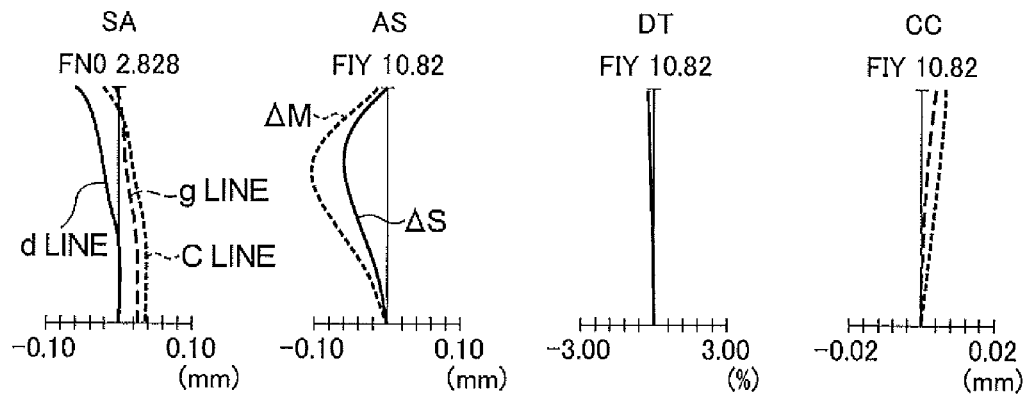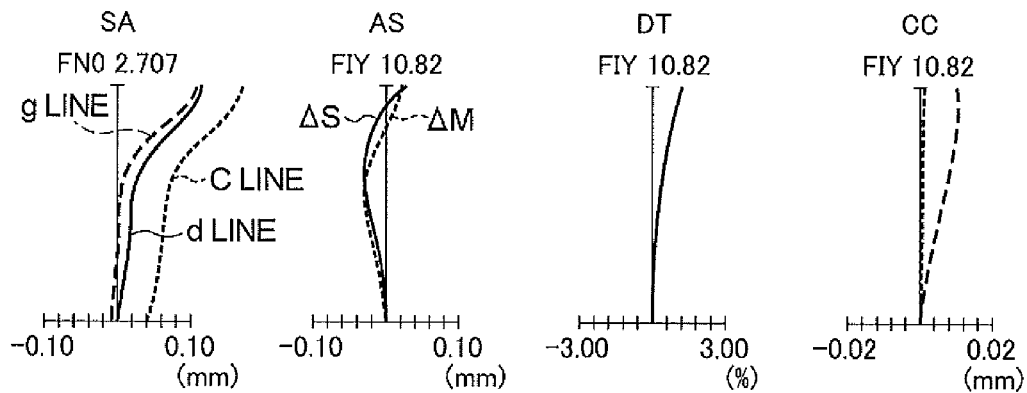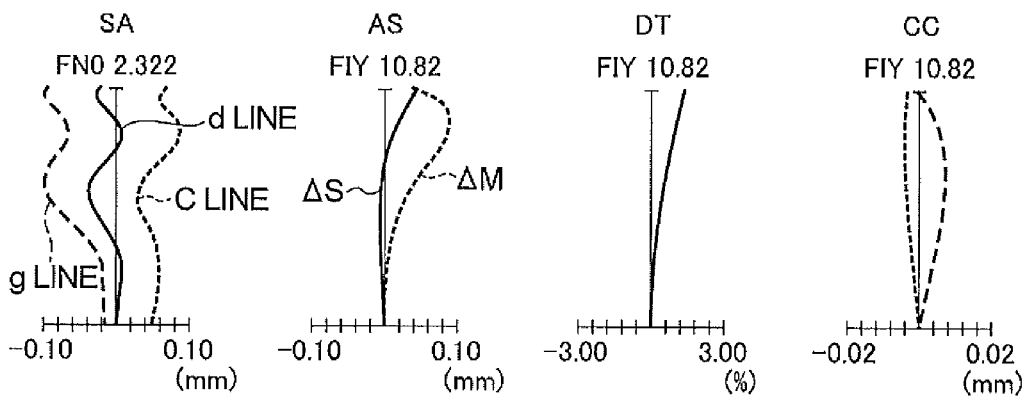

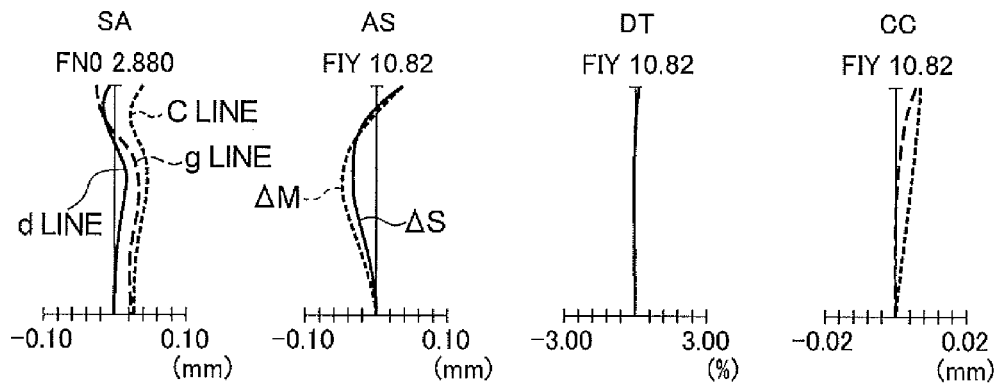
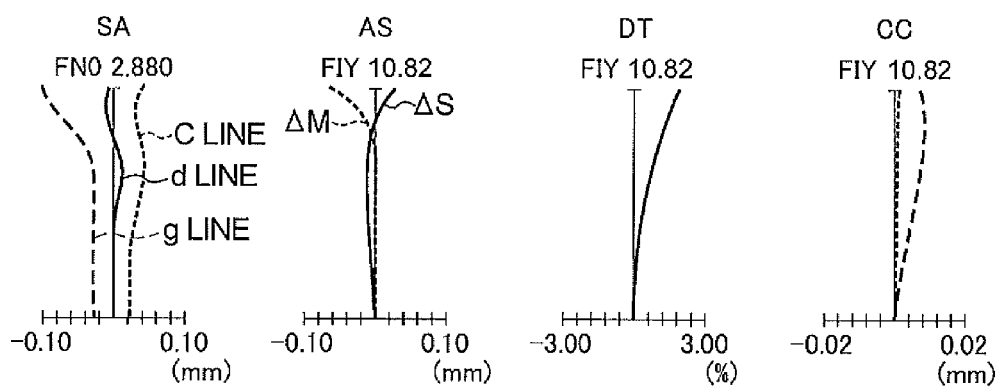
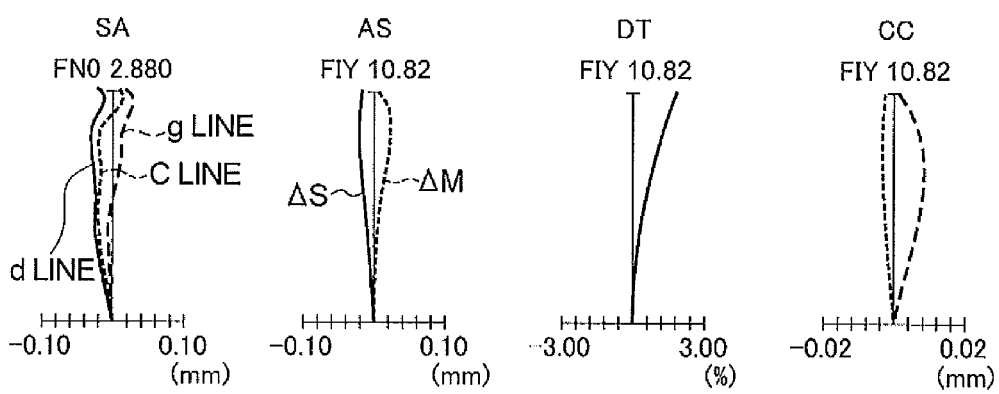

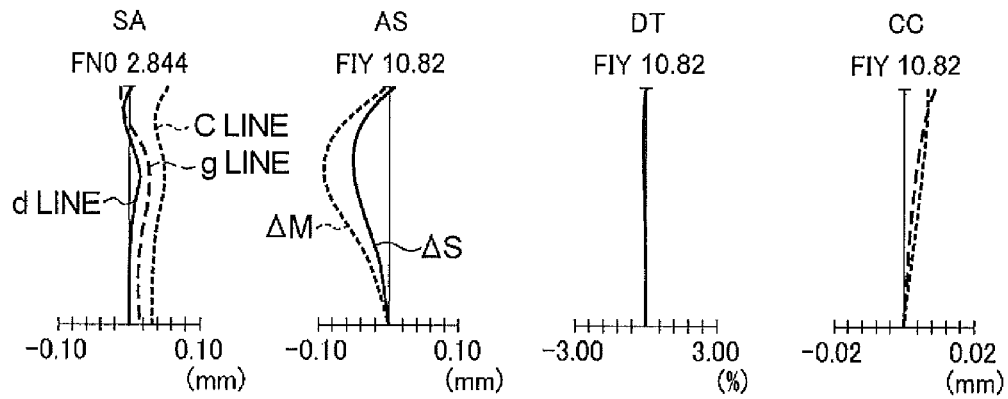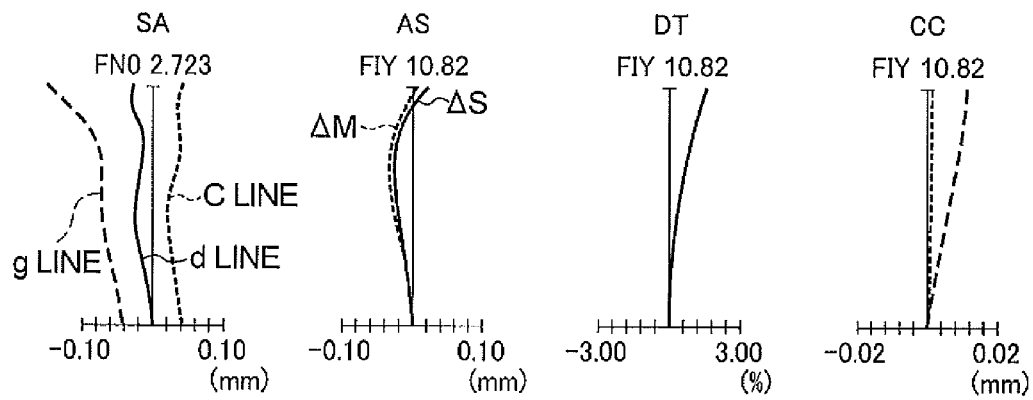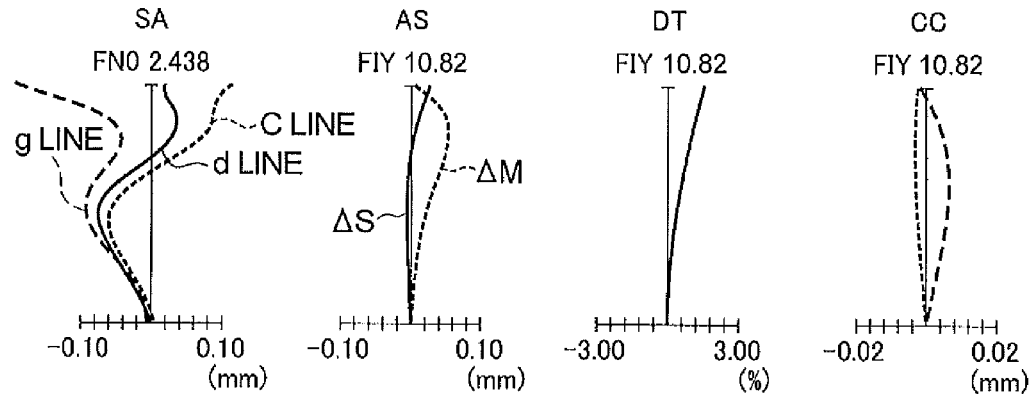

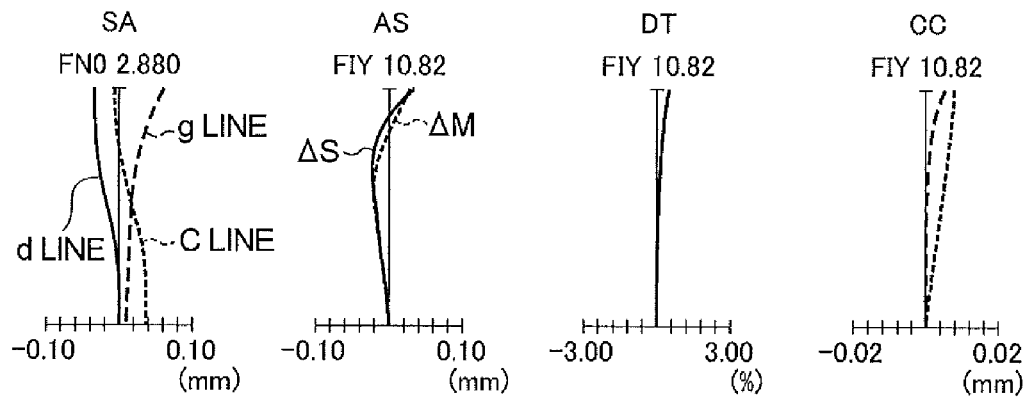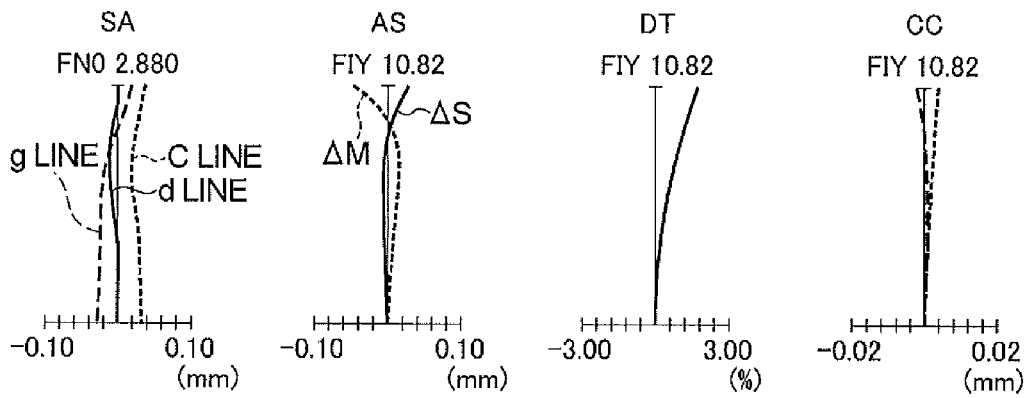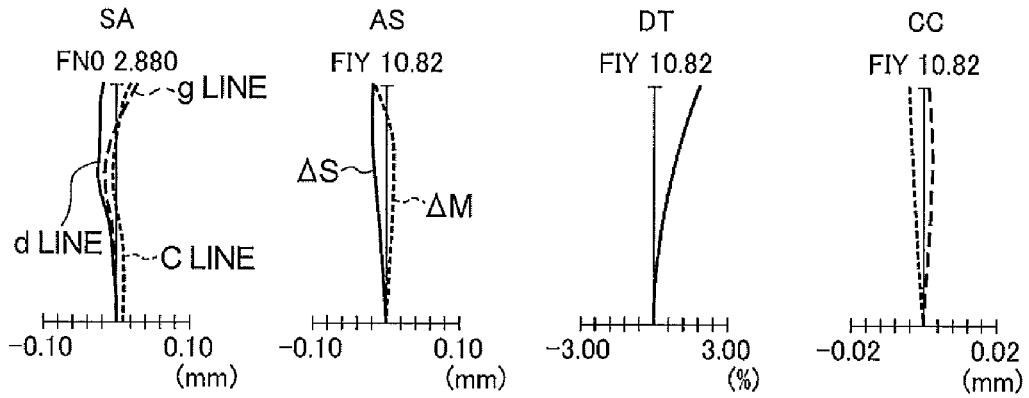

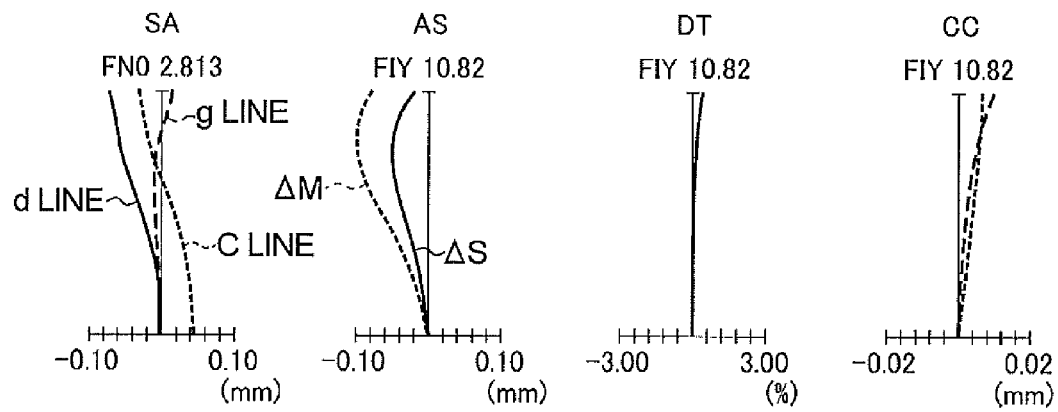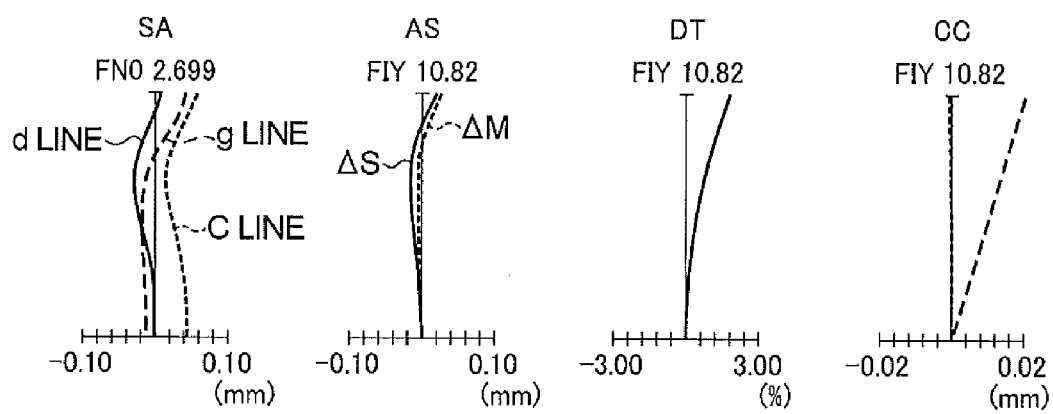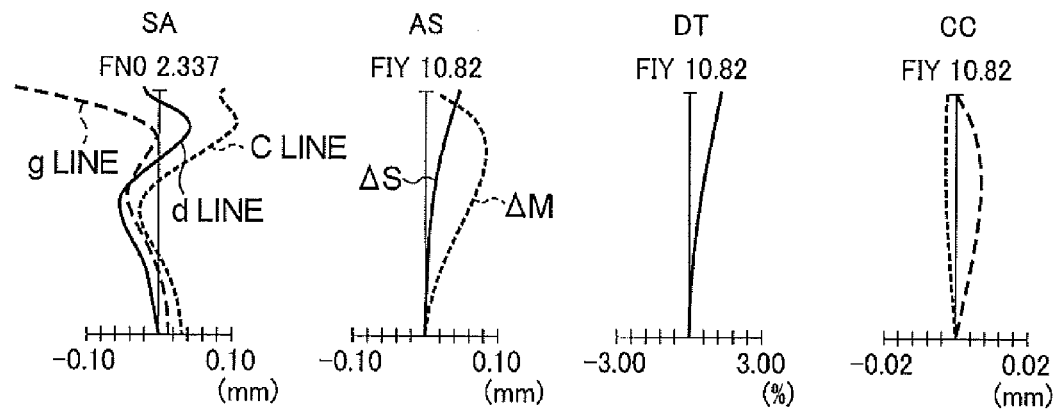

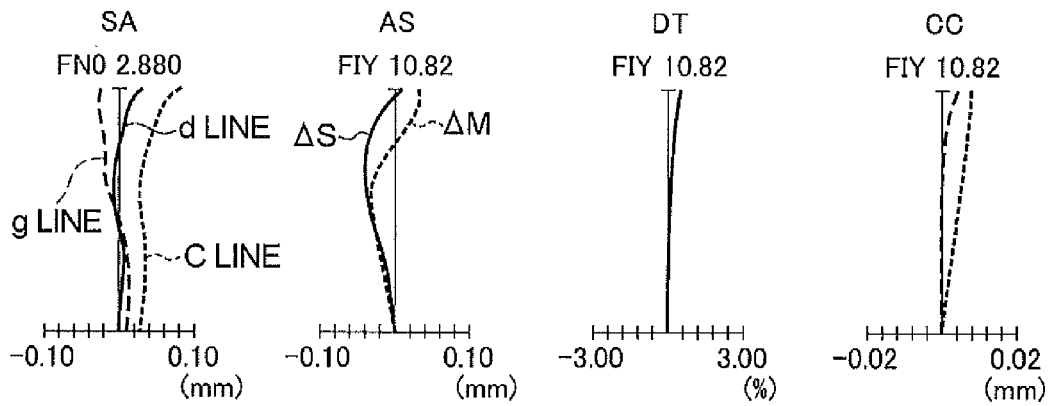
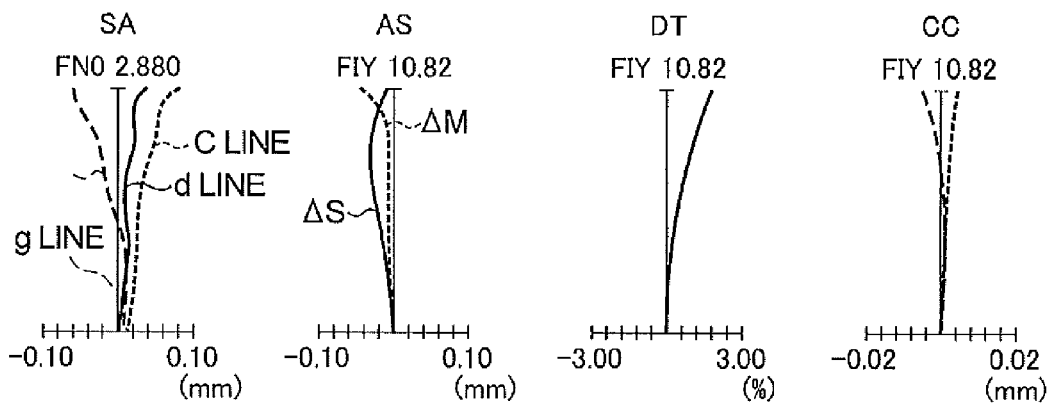
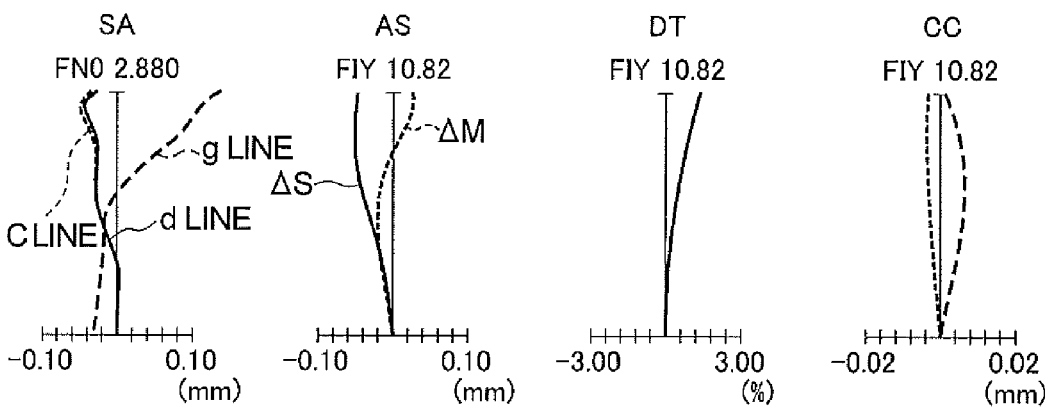

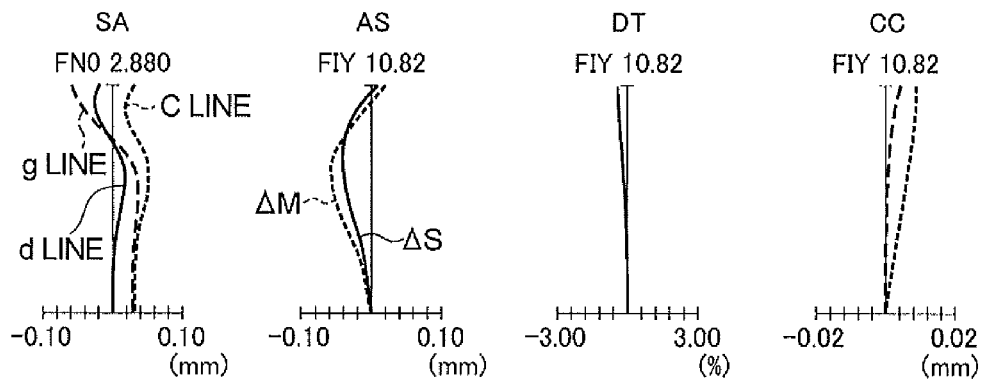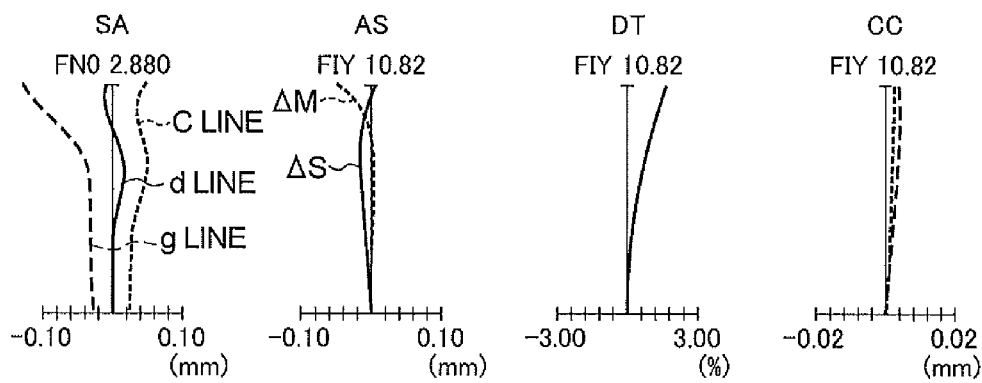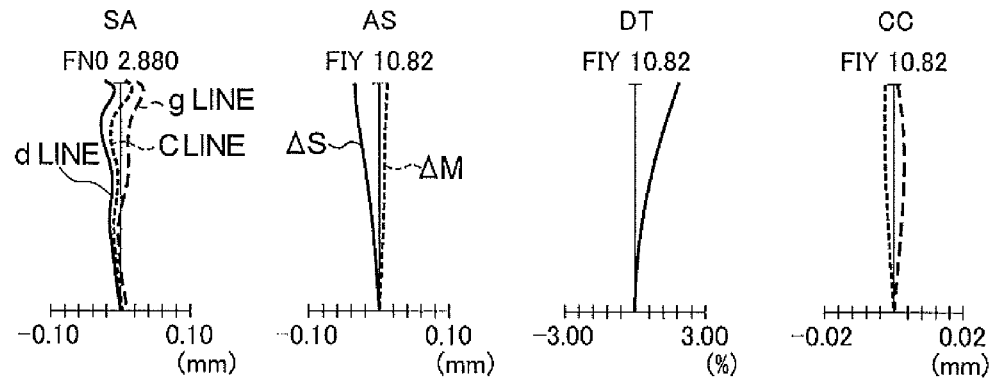

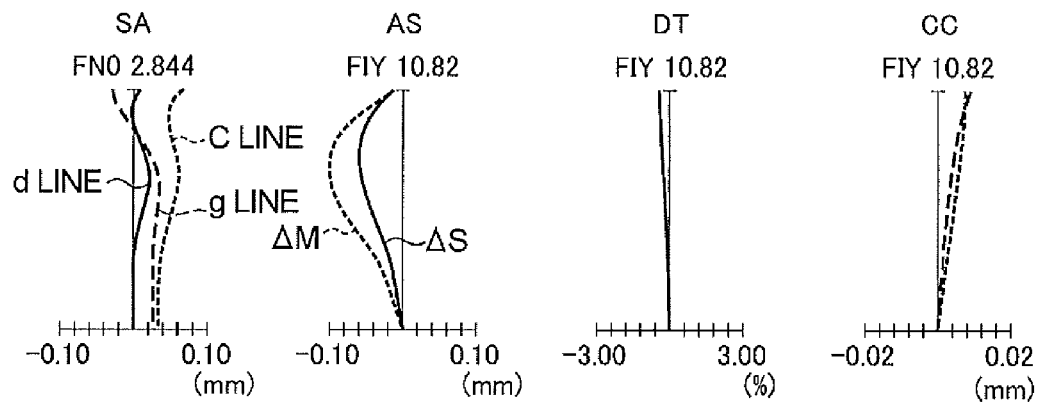
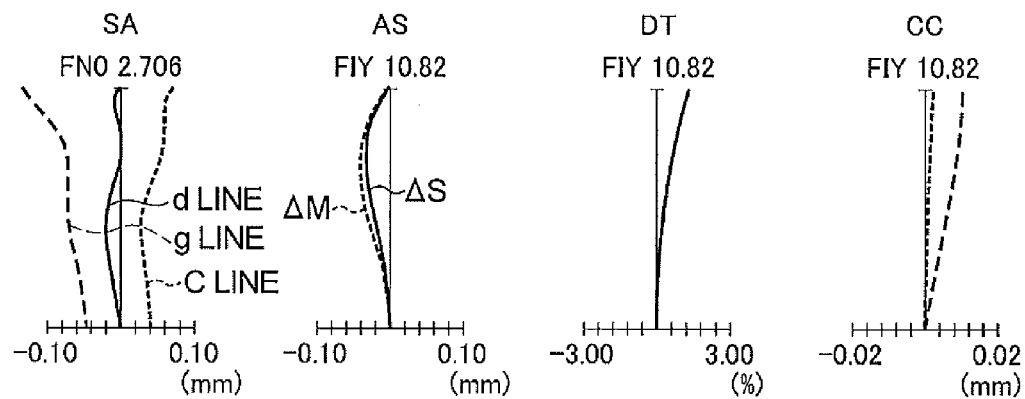
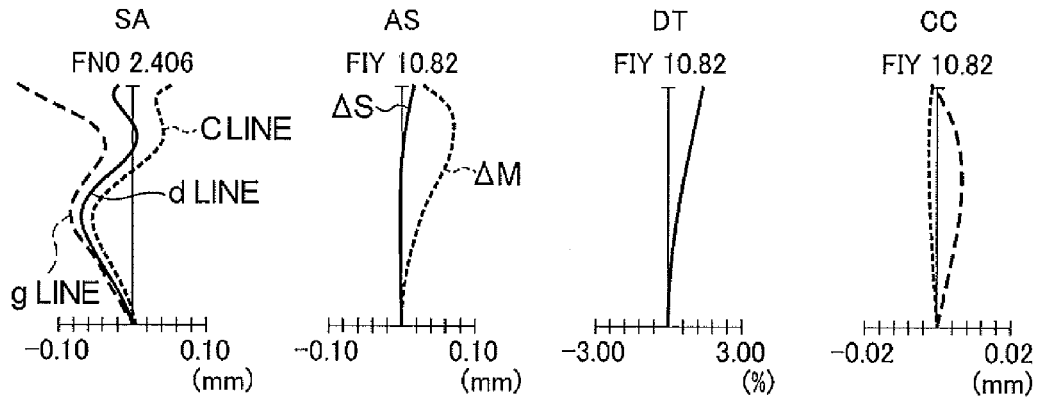

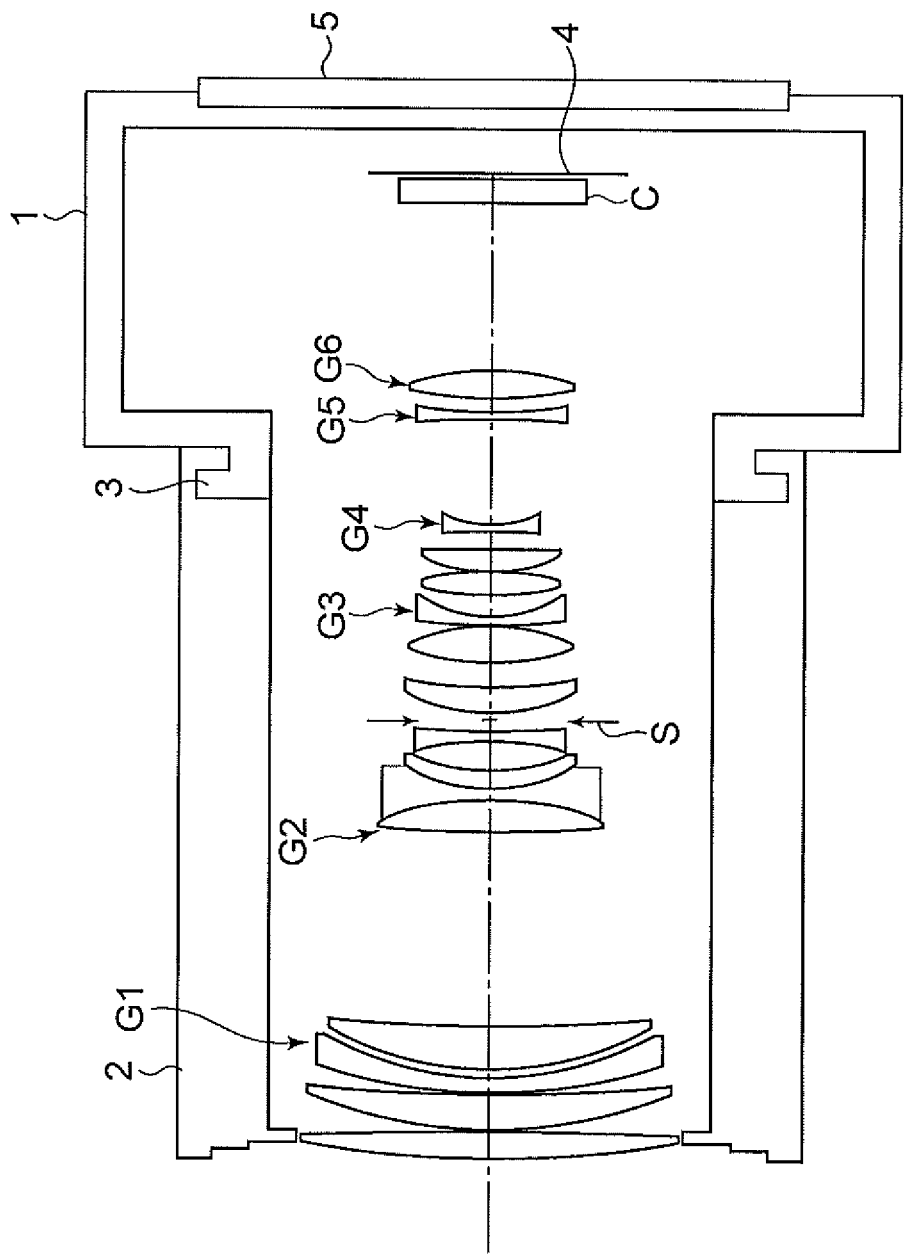

ZOOM LENS

CROSS-REFERENCE TO RELATED APPLICATION

The present application is based upon and claims the benefit of priority from the prior Japanese Patent Application Nos. 2013-020376 filed on Feb. 5, 2013, 2013-020377 filed on Feb. 5, 2013, and 2013-020378 filed on Feb. 5, 2013; the entire contents of which are incorporated herein by reference.

BACKGROUND OF THE INVENTION

1. Field of the Invention

The present invention relates to a zoom lens.

2. Description of the Related Art

As a large-aperture telephoto zoom lens of F2.8 class, a zoom lens shown in Japanese Patent Application Laid-open Publication No. 2007-212830 or Japanese Patent Application Laid-open Publication No. 2010-191336 has hitherto been proposed.

In Japanese Patent Application Laid-open Publication No. 2007-212830, a four-unit zoom lens with a refractive power of lens units in order of a positive refractive power, a negative refractive power, a positive refractive power, and a positive refractive power from an object side has been disclosed. In such type of zoom lens, zooming is carried out by a movement of a second lens unit having a negative refractive power and a third lens unit having a positive refractive power. Moreover, the first lens unit having a positive refractive power is divided into a front-unit and a rear-unit, and focusing is carried out by a movement of the front-unit. According to such an arrangement, the zoom lens is a telephoto zoom lens with an interchangeable lens application of a class of zooming ratio of three times.

In Japanese Patent application Laid-open Publication No. 2010-191336, a five-unit zoom lens with a refractive power of lens units in order of a positive refractive power, a negative refractive power, a positive refractive power, a negative refractive power, and a positive refractive power in order from the object side has been disclosed. In such type of zoom lens, zooming is carried out by movement of the second lens unit having a negative refractive power, the third lens unit having a positive refractive power, and the fourth lens unit having a negative refractive power. Moreover, focusing is carried out by movement of the third lens unit having a positive refractive power. According to such an arrangement, the zoom lens is a telephoto zoom lens with an interchangeable lens application of the class of zooming ratio of three times.

However, in recent years, there has been an increase in a need not only of still photography but also of video photography, and a lens system in which, a video photography function is optimized even in cameras such as an integrated-lens type camera and a digital camera of an interchangeable-lens type, has been sought.

Generally, in video photography, it is necessary to maintain a focused state by moving an auto-focus function all the time. As one of the methods for this, a method of moving a focusing lens unit in the vicinity of a focusing position by a minute amount (called as wobbling) has been known. By carrying out wobbling, a change in a contrast of an image on an image pickup surface is measured, and in a case in which, a judgment is made that the focusing state has changed, the focusing lens is to be moved appropriately once again to refocus. By such wobbling function, even if a distance between the zoom lens and an object changes, the focusing state is maintained continuously all the time, but an extreme high-velocity operation is necessary in accordance with a frame rate of a camera main body. For carrying out an appropriate drive control, the focusing lens unit is sought to be light-weight and with a small amount of movement. Moreover, a reduction in sound which is generated due to wobbling is also sought for reduction in noise at the time of video photography. Although the focusing lens unit and the wobbling lens unit are same normally in most of the cases, sometimes the focusing lens unit and the wobbling unit are arranged as separate lens units.

Moreover, a method of carrying out focusing by detecting a phase difference of an object image on the image pickup surface from a light ray that has passed through different pupil positions, and calculating an object distance, has also been known.

SUMMARY OF THE INVENTION

A zoom lens according to an aspect of the present invention includes in order from an object side, a first lens unit having a positive refractive power, a second lens unit having a negative refractive power, a third lens unit having a positive refractive power, a fourth lens unit having a negative refractive power, a fifth lens unit includes a lens, and a sixth lens unit having a positive refractive power, and a distance between the first lens unit and the second lens unit widens at a telephoto end than at a wide angle end, and a distance between the second lens unit and the third lens unit narrows at the telephoto end than at the wide angle end, and a distance between the third lens unit and the fourth lens unit changes at the time of zooming from the wide angle end to the telephoto end, and a distance between the fourth lens unit and the fifth lens unit changes at the time of zooming from the wide angle end to the telephoto end, and a distance between the fifth lens unit and the sixth lens unit changes at the time of zooming from the wide angle end to the telephoto end.

BRIEF DESCRIPTION OF THE DRAWINGS

FIG. 1A, FIG. 1B, and FIG. 1C are lens cross-sectional views at the time of infinite object point focusing of a zoom lens according to an example 1, where, FIG. 1A is a lens cross-sectional view at a wide angle end, FIG. 1B is a lens cross-sectional view in an intermediate focal length state, and FIG. 1C is a lens cross-sectional view at a telephoto end, and furthermore, FIG. 1A, FIG. 1B, and FIG. 1C are diagrams in which, a direction of displacement of each lens unit for the wide angle end and the intermediate focal length state, and the intermediate focal length state and the telephoto end, and a focusing method at the wide angle end, the intermediate focal length state, and the telephoto end are added;

FIG. 2A, FIG. 2B, and FIG. 2C are diagrams of an example 2, similar to FIG. 1A, FIG. 1B, and FIG. 1C;

FIG. 3A, FIG. 3B, and FIG. 3C are diagrams of an example 3, similar to FIG. 1A, FIG. 1B, and FIG. 1C;

FIG. 4A, FIG. 4B, and FIG. 4C are diagrams of an example 4, similar to FIG. 1A, FIG. 1B, and FIG. 1C;

FIG. 5A, FIG. 5B, and FIG. 5C are diagrams of an example 5, similar to FIG. 1A, FIG. 1B, and FIG. 1C;

FIG. 6A, FIG. 6B, and FIG. 6C are diagrams of an example 6, similar to FIG. 1A, FIG. 1B, and FIG. 1C;

FIG. 7A, FIG. 7B, and FIG. 7C are diagrams of an example 7, similar to FIG. 1A, FIG. 1B, and FIG. 1C;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of focusing at an infinite distance, of the example 1;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of focusing at a close distance, where, a distance between an object and an image is 0.7 m, of the example 1;

FIG. 10A, FIG. 10B, FIG. 10C, FIG. 10D, FIG. 10E, FIG. 10F, FIG. 10G, FIG. 10H, FIG. 10I, FIG. 10J FIG. 10K, and FIG. 10L are aberration diagrams at the time of focusing at an infinite distance, of the example 2;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are diagrams at the time of focusing at a close distance where, a distance between an object and an image is 0.7 m, of the example 2;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of focusing at an infinite distance, of the example 3;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of focusing at a close distance where, a distance between an object and an image is 0.7 m, of the example 3;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of focusing at an infinite distance, of the example 4;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams at the time of focusing at a close distance, where, a distance between an object and an image is 0.7 m, of the example 4;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of focusing at an infinite distance, of the example 5;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams at the time of focusing at a close distance, where, a distance between an object and an image is 0.7 m, of the example 5;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of focusing at an infinite distance, of the example 6;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of focusing at an infinite distance, of the example 7;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams at the time of focusing at a close distance, where, a distance between an object and an image is 0.7 m, of the example 7;

FIG. 22 is a cross-sectional view of an image pickup apparatus in which, a zoom lens of one of the embodiments has been used as an interchangeable lens;

DETAILED DESCRIPTION OF THE INVENTION

Figures 19A, 19B, 19C, 19D:
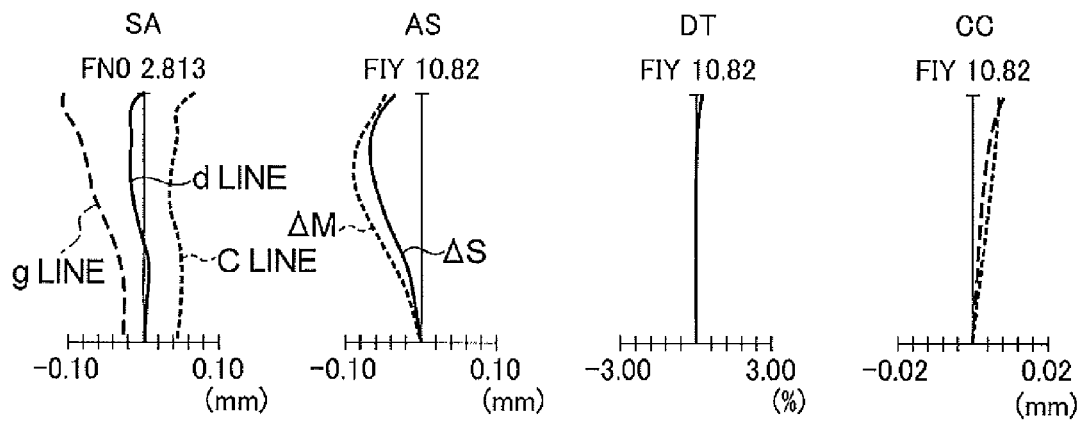
FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams at the time of focusing at a close distance, where, a distance between an object and an image is 0.7 m, of the example 6.
Figures 19E, 19F, 19G, 19H:
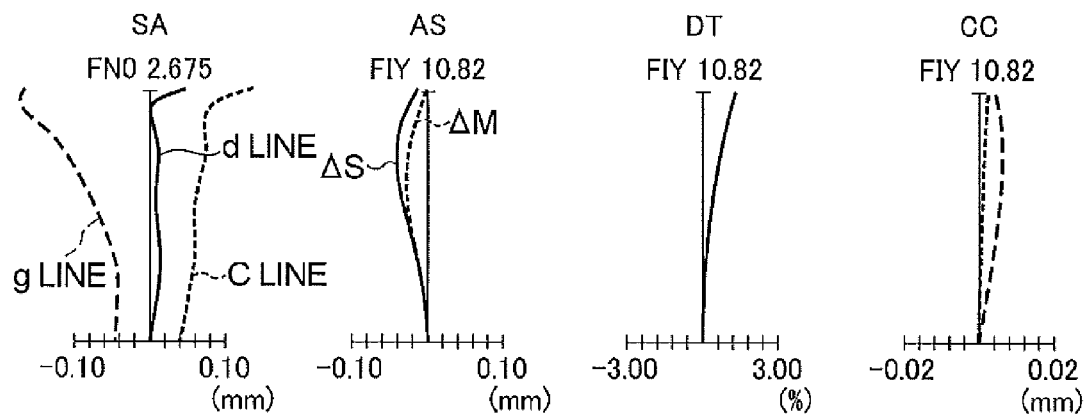
Figures 19I, 19J, 19K, 19L:
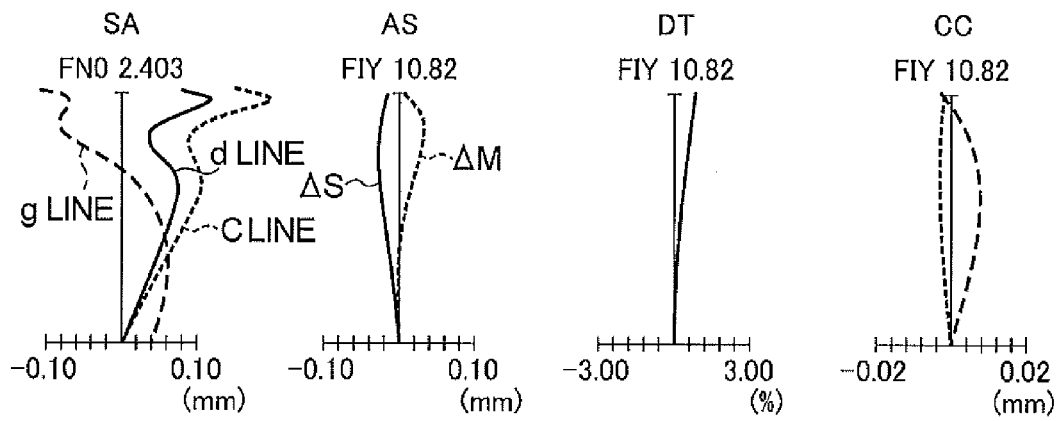

Exemplary embodiments of the present invention will be described below by referring to the accompanying diagrams. For explaining concretely an action and an effect of the present embodiment, description will be made by showing concrete examples. However, the embodiments to be exemplified, similarly as examples that will be described later, are some of the embodiments included in the present invention, and there is a large number of variations which can be made in the embodiments. Therefore, the embodiments exemplified for the present invention are not restricted to the embodiments described below.

Diagrams from FIG. 1A, FIG. 1B, and FIG. 1C to FIG. 7A, FIG. 7B, and FIG. 7C are cross-sectional views of zoom lenses along an optical axis according to examples from an example 1 to an example 7. In the diagrams, each of FIG. 1A, FIG. 2A, FIG. 3A, FIG. 4A, FIG. 5A, FIG. 6A, and FIG. 7A shows a cross-sectional view at a wide angle end (WE), each of FIG. 1B, FIG. 2B, FIG. 3B, FIG. 4B, FIG. 5B, FIG. 6B, and FIG. 7B shows a cross-sectional view in an intermediate focal length state (ST), and each of FIG. 1C, FIG. 2C, FIG. 3C, FIG. 4C, FIG. 5C, FIG. 6C, and FIG. 7C shows a cross-sectional view at a telephoto end (TE).

A zoom lens according to the present embodiment includes in order from an object side to an image side, a first lens unit G1 having a positive refractive power, a second lens unit G2 having a negative refractive power, a third lens unit G3 having a positive refractive power, a fourth lens unit G4 having a negative refractive power, a fifth lens unit G5 which includes a lens, and a sixth lens unit G6 having a positive refractive power.

Moreover, a distance between the first lens unit G1 and the second lens unit G2 widens at a telephoto end than at a wide angle end, and a distance between the second lens unit G2 and the third lens unit G3 narrows at the telephoto end than at the wide angle end, and a distance between the third lens unit G3 and the fourth lens unit G4 changes at the time of zooming from the wide angle end to the telephoto end, and a distance between the fourth lens unit G4 and the fifth lens unit G5 changes at the time of zooming from the wide angle end to the telephoto end, and a distance between the fifth lens unit G5 and the sixth lens unit G6 changes at the time of zooming from the wide angle end to the telephoto end.

In such manner, by disposing the first lens unit having a positive refractive power, the second lens unit having a negative refractive power, the third lens unit having a positive refractive power, and the fourth lens unit having a negative refractive power, and by changing mutual distances between the lens units, the overall length is shortened and a zooming ratio is secured.

The sixth lens unit G6 has a positive refractive power, and has en effect of separating away an exit pupil from an image plane. Reduction of shading is carried out by oblique incidence characteristics of an image pickup element.

The fifth lens unit G5 is disposed between the fourth lens unit G4 and the sixth lens unit G6, and the fifth lens unit G5 suppresses an aberration fluctuation which is due to zooming.

According to such an arrangement, in an embodiment, a distance between the first lens unit G1 and the third lens unit G3 may be narrowed at the telephoto end than at the wide angle end.

According to such an arrangement, in the embodiment, the fourth lens unit G4 and the fifth lens unit G5 may be moved at the time of the focusing operation.

According to such an arrangement, in the embodiment, the zoom lens may include an aperture stop S which is disposed between the second lens unit G2 and the fourth lens unit G4, and which determines an F-number of the zoom lens, and the following conditional expressions (I) and (II) may be satisfied.

$$0.2 < D36W/\phi AW < 1.5 \qquad (I)$$

$$1.0 < DS6W/\phi AW < 2.8 \qquad (II)$$

where,

D36W denotes a distance along an optical axis from an image-side surface of the third lens unit up to an object-side surface of the sixth lens unit, at the wide angle end, DS6W denotes a distance along the optical axis from the aperture stop up to the object-side surface of the sixth lens unit, at the wide angle end, and φAW denotes the maximum diameter of an aperture when the F-number of the aperture stop is the minimum, at the wide angle end.

By disposing the aperture stop at the above-mentioned position, a diameter of the overall zoom lens system is made small, and an aberration is reduced, thereby achieving both of small diameter and aberration reduction.

Conditional expression (I) is an expression which specifies a favorable distance between the third lens unit and the sixth lens unit at the wide angle end.

Conditional expression (II) is an expression which specifies a favorable distance between the aperture stop and the sixth lens unit at the wide angle end.

For suppressing a reduction in an amount of light around the image pickup surface while making an aperture of the zoom lens large, it is necessary to secure sufficiently a diameter of an off-axis light beam. However, when an attempt is made to secure the diameter of the off-axis light beam, it becomes necessary to make large a diameter of a lens separated away from the aperture stop.

In the embodiment, by making so as not to exceed an upper limit of conditional expressions (I) and (II) respectively, an entrance pupil with respect to the sixth lens unit is brought closer to the sixth lens unit, thereby achieving both of small-sizing and securing brightness around the image pickup surface at the wide angle end.

By making so as not to fall below a lower limit of conditional expressions (I) and (II) respectively, a space for disposing the fourth lens unit and the fifth lens unit, and a variable spacing distance are secured sufficiently.

In the embodiment, the following conditional expressions (III) and (IV) may be satisfied.

$$0.6 < D36T/\phi AT < 2.3 \qquad (III)$$

$$1.4 < DS6T/\phi AT < 3.5 \qquad (IV)$$

where,

D36T denotes a distance along an optical axis from an image-side surface of the third lens unit up an object-side surface of the sixth lens unit, at the telephoto end, DS6T denotes a distance along the optical axis from the aperture stop up to the object-side surface of the sixth lens unit, at the telephoto end, and φAT denotes the maximum diameter of an aperture when the F-number of the aperture stop is the minimum, at the telephoto end.

Conditional expression (III) is an expression which specifies a favorable distance between the third lens unit and the sixth lens unit at the telephoto end.

Conditional expression (IV) is an expression which specifies a favorable distance between the aperture stop and the sixth lens unit at the telephoto end.

In the embodiment, by making so as not to exceed an upper limit of conditional expressions (III) and (IV) respectively, the entrance pupil with respect to the sixth lens unit is brought closer to the sixth lens unit, thereby achieving both of small-sizing and securing brightness around the image pickup surface at the telephoto end.

By making so as not to fall below a lower limit of conditional expressions (III) and (IV) respectively, the space for disposing the fourth lens unit and the fifth lens unit, and a variable-spacing distance are secured sufficiently.

In the embodiment, the fourth lens unit and the fifth lens unit may be moved at the time of focusing operation.

The fourth lens unit and the fifth lens unit are lens units for which, it is easy to make a radial direction small. Since the fourth lens unit and the fifth lens unit are let to be focusing lens units, a drive load (such as electric power load) at the time of focusing is reduced. Since a plurality of lens units is let to be lens units that move at the time of focusing, it has become possible to reduce aberration at the time of focusing both at a long distance and at a close distance, as well as to shorten the closest focusing distance.

Here, the fourth lens unit and the fifth lens unit may be moved at the time of focusing, and the following conditional expression (A) may be satisfied.

$$-0.8 < f4/f5 < 1.2 \qquad (A)$$

where, f4 denotes a focal length of the fourth lens unit, and f5 denotes a focal length of the fifth lens unit.

Conditional expression (A) is an expression in which, a favorable balance of refractive power of the fourth lens unit and refractive power of the fifth lens unit which move at the time of focusing operation is specified.

By making so as not to fall below a lower limit, and so as not to exceed an upper limit, the fifth lens unit is let not to have a large positive refractive power or a large negative refractive power. In the embodiment, the focusing is carried out mainly by the movement of the fourth lens unit, and by making auxiliary movement of the fifth lens unit, the aberration fluctuation due to focusing is reduced, and the closest focusing distance is shortened.

By suppressing an absolute value of the refractive power of the fifth lens unit, even when the fifth lens unit is decentered, it is possible to reduce an effect on the aberration, and it is advantageous for securing an optical performance.

The fourth lens unit and the fifth lens unit may satisfy the following conditional expressions (B) and (C).

$$-0.7 < f4/fw < -0.3 \qquad (B)$$

$$1.0 < |f5|/fw < 5.0 \qquad (C)$$

where, fw denotes a focal length at the wide angle end of the zoom lens.

By making so as not to fall below a lower limit of conditional expression (B), the negative refractive power of the fourth lens unit is secured, and an amount of movement of the fourth lens unit at the time of focusing is made small, which is advantageous for making the zoom lens compact.

By suppressing the negative refractive power of the fourth lens unit so as not exceed an upper limit, it is advantageous for making the fourth lens unit light-weight.

By suppressing the absolute value of the refractive power of the fifth lens unit G5 so as not to fall below a lower limit of conditional expression (C), it is advantageous for making the fifth lens unit light-weight.

By securing the absolute value of the refractive power of the fifth lens unit so as not to exceed an upper limit of conditional expression (C), it is advantageous for correction of a longitudinal aberration caused due to focusing.

Moreover, in the embodiment, a distance between the first lens unit G1 and the third lens unit G3 may narrow at the telephoto end than at the wide angle end.

By the distance between the first lens unit and the third lens unit becoming small at the telephoto end than at the wide angle end, a position of the entrance pupil is not let to be excessively far from the first lens unit, at the telephoto end. Therefore, it is possible to secure a diameter of the entrance pupil at the telephoto end while making an effective diameter of the first lens unit small.

Moreover, in the embodiment, a position of the first lens unit G1 may be stationary at the time of zooming from the wide angle end to the telephoto end.

This is advantageous for reducing dust that enters into the lens system, suppressing sound leakage when a lens unit moves, and reducing a fluctuation in a balance of weight resulting from zooming of the lens system.

The fourth lens unit G4 and the fifth lens unit G5 may move at the time of zooming from the wide angle end to the telephoto end. This is advantageous for achieving both of reducing an aberration and securing the zooming ratio.

Furthermore, the second lens unit G2 and the third lens unit G3 may move at the time of zooming from the wide angle end to the telephoto end.

Zooming in which, the aberration is suppressed may be carried out by moving the second lens unit, the third lens unit, the fourth lens unit, and the fifth lens unit at the time of zooming from the wide angle end to the telephoto end.

Regarding the movement of the third lens unit G3, the third lens unit G3 may satisfy the following conditional expression (1).

$$0.2 < \Delta G3/f3 < 1 \quad (1)$$

where, $\Delta G3$ denotes an amount of displacement of the third lens unit, at a position at the telephoto end with respect to the wide angle end, where the displacement to an object side is plus, and f3 denotes a focal length of the third lens unit.

By making so as not to exceed an upper limit of conditional expression (1), an amount of movement of the third lens unit is suppressed, and an increase in the overall length of the lens is suppressed. Moreover, this leads to suppressing of the refractive power of the third lens unit, aberration reduction, and reduction of the number of lenses.

By making so as not to fall below a lower limit, a size in a radial direction of the first lens unit is made small.

The zoom lens may include an aperture stop S which is disposed between the second lens unit G2 and the fourth lens unit G4, and which moves toward the object side at the telephoto end with respect to the wide angle end. More concretely, the aperture stop S may be disposed between the second lens unit G2 and the third lens unit G3.

By such an arrangement, both small sizing of the overall zoom lens system and aberration reduction are achieved.

The aperture stop S may let to have an aperture size large when the F-number is the minimum, at the telephoto end than at the wide angle end.

Accordingly, a difference in the amount of light at an image-plane center and in the vicinity of the image-plane due to vignetting near the wide angle end is suppressed, and both an improvement in image quality and making the diameter small are achieved.

The fourth lens unit G4 and the fifth lens unit G5 may be moved at the time of the focusing operation.

The fourth lens unit is a lens unit of which, a size in the radial direction can be made small. Moreover, the fifth lens unit is a lens unit which is easy to make light-weight. By letting the fourth lens unit and the fifth lens unit to be the focusing lens units, the drive load (such as electric power load) at the time of focusing is reduced. Here, since the plurality of lens units is let to be lens units which move at the time of focusing, it has become possible to reduce aberration at the time of focusing both at a long distance and at a close distance, as well as to shorten the closest focusing distance.

In examples from an example 1 to an example 5, and an example 7 in which, the fifth lens unit G5 has a negative refractive power, a direction of movement at the time of focusing at a close distance when at the wide angle end and a direction of movement at the time of focusing at a close distance when at the telephoto end differ for the fourth lens unit G4 and the fifth lens unit G5.

According to such an arrangement, the aberration is suppressed in both cases namely, when focusing at infinity and when focusing at a close distance.

In zoom lenses of the examples from the example 1 to example 5, and example 7, the fifth lens unit G5 has a negative refractive power.

In a zoom lens of an example 6, the fifth lens unit G5 has a positive refractive power.

In each case, by changing an air space before and after the fourth lens unit, zooming ratio is secured and aberration is reduced, thereby achieving both effects.

A position of the sixth lens unit G6 may be let to be stationary at the time of zooming from the wide angle end to the telephoto end.

According to such an arrangement, dust entering into the zoom lens system is reduced, and sound leakage when a lens is driven is reduced A surface on the object side of a lens nearest to the object side in the first lens unit G1 may be a convex surface directed toward the object side. Moreover, a lens nearest to the image side in the first lens unit G1 may be a positive meniscus lens having a convex surface directed toward the object side.

The second lens unit G2 may include in order from the object side to the image side, a cemented triplet of a positive lens, a negative lens, and a positive lens.

Here, the lens component is a lens block having only two refracting surfaces namely, an object-side surface and an image-side surface, which are in contact with air in an optical path.

Such an arrangement makes it easy to suppress an occurrence of a distortion and an astigmatism at the wide angle end, a spherical aberration and a coma at the telephoto end, and a chromatic aberration of magnification, and a zooming function of the second lens unit is secured sufficiently.

The cemented triplet may include a biconvex positive lens, a biconcave negative lens, and a positive meniscus lens having a convex surface directed toward the object side. Moreover, the second lens unit G2 may include the cemented triplet, and a biconcave negative lens.

Particularly, the negative lens in the cemented triplet may satisfy the following conditional expression (2).

$$1 < (r21 - r22)/(r21 + r22) < 5 \quad (2)$$

where, r21 denotes a paraxial radius of curvature of an object-side surface of the negative lens in the cemented triplet, and r22 denotes a paraxial radius of curvature of an image-side surface of the negative lens in the cemented triplet.

In the embodiment, an arrangement is let to be such that by satisfying conditional expression (2) it is even easier to carry out reduction of aberration.

A size in the radial direction of the third lens unit G3 which receives an axial light beam diverged from the second lens unit G2 is susceptible to become large. In a case of a fast zoom lens as in the embodiment, a diameter of the axial light beam becomes particularly large in the third lens unit G3. The third lens unit G3 includes a negative lens and a plurality of positive lenses, and carries out correction of the spherical aberration which occurs at a telephoto side.

Furthermore, the following conditional expressions (3) and (4) may be satisfied.

$$75 < vd3p < 100 \quad (3)$$

$$1.4 < f31p/f3 < 3.7 \quad (4)$$

where, vd3p denotes the maximum value of Abbe's number with reference to a d-line for all the positive lenses in the third lens unit, f31p denotes a focal length of the positive lens nearest to the object side in the third lens unit, and f3 denotes a focal length of the third lens unit.

In the zoom lens of the embodiment, since a fast F-number is maintained even at the telephoto end, correction of a chromatic aberration becomes extremely important. Particularly, by correcting the longitudinal chromatic aberration at the telephoto side favorably, the performance is improved.

By making so as not to fall below a lower limit of conditional expression (3), correction of the longitudinal chromatic aberration is carried out.

By making so as not to exceed an upper limit of conditional expression (3), a material cost is reduced.

By making so as not to fall below a lower limit of conditional expression (4), the refractive power of the positive lens is suppressed to be appropriate, and the aberration is suppressed. By making so as not to exceed an upper limit of conditional expression (4), a converging effect of the positive lens nearest to the object side is secured sufficiently, and small-sizing of the subsequent lens is facilitated.

Moreover, the lens nearest to the object side in the third lens unit G3 may be a positive lens, and a negative lens may be disposed on the image side of the positive lens, and a positive lens may be disposed on the image side of the negative lens. More concretely, the third lens unit G3 may include in order from the object side five lenses namely, a positive lens, a positive lens, a negative lens, a positive lens, and a positive lens.

Such an arrangement is advantageous for small-sizing in the radial direction of the third lens unit, and for reduction of aberration such as the spherical aberration, the coma, and the astigmatism.

Moreover, an object-side surface of the lens nearest to the object side in the third lens unit G3 may be a convex surface directed toward the object side. Furthermore, an object-side surface of a lens nearest to the image side may be a convex surface directed toward the object side.

The fourth lens unit G4 may comprise one negative lens, and may be let to be light-weight. Since the fourth lens unit G4 is let to be a focusing lens unit in the embodiment, a load on a focusing drive mechanism is reduced. The fourth lens unit may include only a biconcave negative lens.

The fourth lens unit G4 may be let to be a wobbling lens unit. The wobbling lens unit may be let to be light-weight at the same time.

The fourth lens unit G4 may satisfy the following conditional expression (5).

$$0.6 < (r41 - r42)/(r41 + r42) < 2 \quad (5)$$

where, r41 denotes a paraxial radius of curvature of an object-side surface of the negative lens in the fourth lens unit, and r42 denotes a paraxial radius of curvature of an image-side surface of the negative lens in the fourth lens unit.

By the fourth lens unit satisfying conditional expression (5), the spherical aberration at the telephoto end is reduced. A fluctuation in the spherical aberration of the fourth lens unit due to focusing is also suppressed.

The fifth lens unit G5 may comprise one lens, and the fifth lens unit G5 may be made light-weight. Since the fifth lens unit is let to be the focusing lens unit in the embodiment, a load on the focusing drive mechanism is reduced. Moreover, the fifth lens unit may include only a lens having a concave surface as an image-side surface, directed toward the image side.

The fifth lens unit G5 may satisfy the following conditional expression (6).

$$-1 < (r51 - r52)/(r51 + r52) < 4 \quad (6)$$

where, r51 denotes a paraxial radius of curvature of an object-side surface of the lens in the fifth lens unit, and r52 denotes a paraxial radius of curvature of an image-side surface of the lens in the fifth lens unit.

Accordingly, the distortion at the wide angle end and the chromatic aberration of magnification at the telephoto end are reduced.

In the zoom lenses of examples from the example 1 to the example 5, and the example 7, the fifth lens unit G5 includes one negative lens.

Moreover, the following conditional expression (6-1) may be satisfied.

$$0 < (r51 - r52)/(r51 + r52) < 4 \quad (6-1)$$

Accordingly, the distortion at the wide angle end and the chromatic aberration of magnification at the telephoto end are reduced.

In the example 6, the fifth lens unit G5 includes one positive lens.

Moreover, the following conditional expression (6-2) may be satisfied.

$$-1 < (r51 - r52)/(r51 + r52) < 0 \quad (6-2)$$

Accordingly, the distortion at the wide angle end and the chromatic aberration at the telephoto end are reduced.

At the time of focusing from an infinite focusing state to a close focusing state, at the telephoto end, the fourth lens unit G4 and the fifth lens unit G5 move satisfying the following conditional expression (7).

$$0.2 < |\Delta G5(T)/\Delta G4(T)| < 2 \quad (7)$$

where,

ΔG4(T) denotes an amount of movement at the time of focusing from an infinite focusing state to a close focusing state of the fourth lens unit at the telephoto end, and ΔG5(T) denotes an amount of movement at the time of focusing from an infinite focusing state to a close focusing state of the fifth lens unit at the telephoto end.

By making so as not to fall below a lower limit, an amount of movement of the fifth lens unit is secured, and an effect of aberration correction is secured sufficiently.

By making so as not to exceed an upper limit, the amount of movement of the fifth lens unit is suppressed to be appropriate, and the chromatic aberration of magnification at the telephoto end is reduced.

The following conditional expressions (8) and (9) may be satisfied.

$$3.2 < ft/fw < 6 \quad (8)$$

$$1.4 < FNO(T) < 3.2 \quad (9)$$

where, ft denotes a focal length at the telephoto end of the zoom lens, fw denotes a focal length at the wide angle end of the zoom lens, and FNO (T) denotes an F-number at the telephoto end for the zoom lens.

By letting the zooming ratio to be so as not to fall below a lower limit of conditional expression (8), an angle of view is made to be easily changeable, and by making so as not to exceed an upper limit of conditional expression (8), small-sizing of the zoom lens is made easier.

By making so as not to fall below a lower limit of conditional expression (9), a diameter of the lens in the radial direction is made to be small, and by making so as not to exceed an upper limit, brightness at the telephoto end is secured.

The sixth lens unit G6 may include one positive lens. Concretely, the sixth lens unit G6 may include a biconvex positive lens.

The examples will be described later. It is possible to use as an image pickup apparatus which includes one of the above-mentioned zoom lenses, and an image pickup element disposed on the image side thereof, which has an image pickup surface that picks up an image formed by the zoom lens, and which converts the image picked up, to an electric signal.

It is more preferable that a plurality of above-mentioned arrangements and conditional expressions are satisfied simultaneously.

Moreover, in a case in which, the zoom lens includes a focusing mechanism, each of the abovementioned arrangements and conditional expressions are to be let to be in a state of the zoom lens focusing at the longest distance.

When an upper limit value and a lower limit value of each of the abovementioned conditional expressions are changed as follow, it is possible to have more assured effect.

For conditional expression (I), it is more preferable to let the lower limit value to be 0.3, and 0.4 is even more preferable. Moreover, for conditional expression (I), it is more preferable to let the upper limit value to be 1.2, and 1.1 is even more preferable, and 1.0 is all the more preferable.

For conditional expression (II), it is more preferable to let the lower limit value to be 1.2, and 1.4 is even more preferable. Moreover, for conditional expression (II), it is more preferable to let the upper limit value to be 2.6, and 2.4 is even more preferable.

For conditional expression (III), it is more preferable to let the lower limit value to be 0.7, and 0.8 is even more preferable. Moreover, for conditional expression (III), it is more preferable to let the upper limit value to be 1.6, and 1.5 is even more preferable, and 1.4 is all the more preferable.

For conditional expression (IV), it is more preferable to let the lower limit value to be 1.6, and 1.8 is even more preferable. Moreover, for conditional expression (IV), it is more preferable to let the upper limit value to be 3.0, and 2.8 is even more preferable, and 2.6 is all the more preferable.

For conditional expression (A), it is more preferable to let the lower limit value to be −0.5, and −0.3 is even more preferable. Moreover, for conditional expression (A), it is more preferable to let the upper limit value to be 0.9, and 0.7 is even more preferable.

For conditional expression (B), it is more preferable to let the lower limit value to be −0.6. Moreover, for conditional expression (B), it is more preferable to let the upper limit value to be −0.4.

For conditional expression (C), it is more preferable to let the lower limit value to be 1.3. Moreover, for conditional expression (C), it is more preferable to let the upper limit value to be 4.0.

For conditional expression (1), it is more preferable to let the lower limit value to be 0.3, and 0.35 is even more preferable. Moreover, for conditional expression (1), it is more preferable to let the upper limit value to be 0.65, and 0.61 is even more preferable.

For conditional expression (2), it is more preferable to let the lower limit value to be 2, and 2.5 is even more preferable. Moreover, for conditional expression (2), it is more preferable to let the upper limit value to be 4.5, and 4 is even more preferable.

For conditional expression (3), it is more preferable to let the lower limit value to be 80. Moreover, for conditional expression (3), it is more preferable to let the upper limit value to be 96.

For conditional expression (4), it is more preferable to let the lower limit value to be 1.8. Moreover, for conditional expression (4), it is more preferable to let the upper limit value to be 2.7.

For conditional expression (5), it is more preferable to let the lower limit value to be 1, and 1.1 is even more preferable. Moreover, for conditional expression (5), it is more preferable to let the upper limit value to be 1.8, and 1.6 is even more preferable.

For conditional expression (6-1), it is more preferable to let the lower limit value to be 0.2. Moreover, for conditional expression (6-1), it is more preferable to let the upper limit value to be 3.

For conditional expression (6-2), it is more preferable to let the lower limit value to be −0.5. Moreover, for conditional expression (6-2), it is more preferable to let the upper limit value to −0.1.

For conditional expression (7), it is more preferable to let the lower limit value to be 0.4, and 0.45 is even more preferable. Moreover, for conditional expression (7), it is more preferable to let the upper limit value to be 1.6, and 1.5 is even more preferable.

For conditional expression (8), it is more preferable to let the lower limit value to be 3.4. Moreover, for conditional expression (8), it is more preferable to let the upper limit value to be 5.

For conditional expression (9), it is more preferable to let the lower limit value to be 2.0. Moreover, for conditional expression (9), it is more preferable to let the upper limit value to be 30.

In each of the abovementioned conditional expressions, by restricting either of the upper limit value and the lower limit value or both, that function can be realized more assuredly, and therefore it is favorable. Moreover, for each conditional expression, only the upper limit value or the lower limit value of a further limited numerical range of the conditional expression may be restricted. While restricting the numerical range of the conditional expression, the upper limit value or the lower limit of each conditional expression may be let to be the upper limit value or the lower limit value of the other conditional expression.

The zoom lenses of examples from the example 1 to the example 7 will be described below. However, the present invention is not restricted to the examples described below. The positive polarity or the negative polarity is based on the paraxial radius of curvature.

The zoom lens in any of the examples from the example 1 to the example 7 includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 including a lens, and a sixth lens unit G6 having a positive refractive power. At the time of zooming from a wide angle end to a telephoto end, the first lens unit is fixed, the second lens unit moves only toward the image side, the third lens unit moves only toward the object side, the fourth lens unit moves only toward the object side, the fifth lens unit makes a reciprocating movement along an optical axis, and the sixth lens unit is fixed with respect to an image plane.

An aperture stop S is disposed immediately before the object side of the third lens unit G3, and moves integrally with the third lens unit.

The maximum diameter of an aperture of the aperture stop S increases from the wide angle end to the telephoto end, and is arranged such that an F-number is almost a constant value (2.88) irrespective of a focal length in a state of being focused at infinity.

On the image side of the zoom lens, filters, a flat parallel plate C, which is a member optically equivalent to a cover glass of an image pickup element, and an image pickup surface I of the image pickup element, are positioned.

The fifth lens unit G5 of the examples from the example 1 to the example 5, and the example 7 has a negative refractive power, and at the time of zooming form the wide angle end to the telephoto end, moves toward the image side after moving toward the object side first. At the time of focusing from a long distance to a close distance, the fourth lens unit G4 and the fifth lens unit G5 move toward the image side independently, at the wide angle end. The fourth lens unit G4 moves toward the image side and the fifth lens unit G5 moves toward the object side, at the telephoto end. The fourth lens unit G4 also carries out a wobbling operation.

The fifth lens unit G5 of the example 6 has a positive refractive power, and moves toward the object side after moving toward the image side first, at the time of zooming from the wide angle end to the telephoto end. At the time of focusing from a long distance to a close distance, the fourth lens unit G4 and the fifth lens unit G5 move independently toward the image side, from the wide angle end to the telephoto end. The fourth lens unit G4 also carries out the wobbling operation.

Each example is a telephoto zoom lens with a large aperture and an improved performance, which is optimum for an application as an interchangeable lens system.

FIG. 1A, FIG. 1B, and FIG. 1C are cross-sectional views of the zoom lens of the example 1.

The first lens unit G1 includes four lenses namely, a positive lens L11, a positive lens L12, a negative lens L13, and a positive lens L14.

The second lens unit G2 includes four lenses namely, a cemented triplet consisting of a positive lens L21, a negative lens L22, and a positive lens L23, and a negative lens L24.

The third lens unit G3 includes five lenses namely, a positive lens L31 of which, both surfaces are aspheric surfaces, a positive lens L32, a negative lens L33, a positive lens L34, and a positive lens L35 of which, both surfaces are aspheric surfaces.

The fourth lens unit G4 includes one negative lens L41 of which, an image-side surface is an aspheric surface.

The fifth lens unit G5 includes one negative lens L51.

The sixth lens unit G6 includes one positive lens L61. FIG. 2A, FIG. 2B, and FIG. 2C are cross-sectional views of the zoom lens of the example 2.

The first lens unit G1, the second lens unit G2, and the sixth lens unit G6 are same as in the example 1.

The third lens unit G3 includes five lenses namely, a positive lens L31, a positive lens L32, a negative lens L33, a positive lens L34, and a positive lens L35 of which, both surfaces are aspheric surfaces.

The fourth lens unit G4 includes one negative lens L41 of which, both surfaces are aspheric surfaces.

The fifth lens unit G5 includes one negative lens L51 of which, both surfaces are aspheric surfaces.

FIG. 3A, FIG. 3B, and FIG. 3C are cross-sectional views of the zoom lens of the example 3.

For the second lens unit G2 and the sixth lens unit G6, description is same as in the example 1, and for the third lens unit G3, the fourth lens unit G4, and the fifth lens unit G5, description is same as in the example 2.

The first lens unit G1 includes three lenses namely, a positive lens L11, a negative lens L12, and a positive lens L13.

FIG. 4A, FIG. 4B, and FIG. 4C are cross-sectional views of the zoom lens of the example 4.

For the second lens unit G2, the fifth lens unit G5, and the sixth lens unit G6, description is same as in the example 1, for the fourth lens unit G4, description is same as in the example 2, and for the first lens unit G1, description is same as in the example 3.

The third lens unit G3 includes five lenses namely, a positive lens L31, a cemented negative lens component consisting of a positive lens L32 and a negative lens L33, a positive lens L34, and a positive lens L35 of which, both surfaces are aspheric surfaces.

FIG. 5A, FIG. 5B, and FIG. 5C are cross-sectional views of the zoom lens of the example 5.

For the second lens unit G2, the fourth lens unit G4, and the sixth lens unit G6, description is same as in the example 1, for the fifth lens unit G5, description is same as in the example 2, and for the third lens unit G3, description is same as in the example 4.

The first lens unit G1 includes three lenses namely, a cemented lens component consisting of a negative lens L11 and a positive lens L12, and a positive lens L13.

FIG. 6A, FIG. 6B, and FIG. 6C are cross-sectional views of the zoom lens of the example 6.

For the second lens unit G2 and the fourth lens unit G4, description is same as in the example 1, and for the third lens unit G3, description is same as in the example 2.

The first lens unit G1 includes three lenses namely, a negative lens L11, a positive lens L12, and a positive lens L13.

The fifth lens unit G5 includes one positive lens L51.

The sixth lens unit G6 includes one positive lens L61 of which, an image-side surface is an aspheric surface.

FIG. 7A, FIG. 7B, and FIG. 7C are cross-sectional views of the zoom lens of the example 7.

For the second lens unit G2 and the fifth lens unit G5, description is same as in the example 1, for the fourth lens unit G4, description is same as in the example 2, for the first lens unit G1, description is same as in the example 3, and for the sixth lens unit G6, description is same as in the example 5.

The third lens unit G3 includes five lenses namely, a positive lens L31, a three cemented lens negative component consisting of a positive lens L32, a negative lens L33, and a positive lens L34, and a positive lens L35 of which, both surfaces are aspheric surfaces.

In each example, since the first lens unit G1 and the sixth lens unit G6 are let to be fixed with respect to the image plane, it is possible to simplify a lens-barrel structure. Moreover, a change in the center of gravity at the time of zooming from the wide angle end (WE) to the telephoto end (TE), and stable retention is possible. Furthermore, it is advantageous for reduction of sound which is generated at the time of zooming from the wide angle end (WE) to the telephoto end (TE), and at the time of focusing.

Various types of numerical data of the examples from the example 1 to the example 7, is shown below.

In surface data, a radius of curvature r of each lens surface (optical surface) for each surface number, a surface separation d, a refractive index nd with respect to a d-line (587.6 nm) of each lens (optical medium), and Abbe's number νd for d-line for each lens (optical medium) are shown. Unit of both the radius of curvature r and the surface separation d is millimeter (mm). In the surface data, '∞' mentioned in the radius of curvature indicates that it is infinite.

A surface marked with * mark to the surface number is an aspheric surface. In aspheric surface coefficient, data related to a lens surface which is let to have an aspheric shape, in the surface data is indicated. The aspherical-surface coefficient is indicated by the following expression when x is let to be an optical axis with a direction of traveling of light as a positive direction, and y is let to be in a direction orthogonal to the optical axis.

$$z=(y^2/r)/[1+\{1-(K+1)\cdot(y/r)^2\}^{1/2}]+A4y^4+A6y^6+A8y^8+A10y^{10}$$

where, r denotes a paraxial radius of curvature, K denotes a conical coefficient, A4, A6, A8, and A10 denote aspherical-surface coefficients of a fourth order, a sixth order, an eighth order, and a tenth order. A symbol 'E' indicates that a numerical value that follows is to be a power of 10. This means that '1.0E-5' for example, is '1.0×10$^{-5}$'.

In zoom data, a focal length, an F-number (Fno), a maximum value (φ) of a diameter of an aperture stop having a circular shape, an angle of view 2ω(°), a variable surface separation D, an air-converted back focus (BF), overall length of lens, and an image height are indicated. Unit of each of the abovementioned items except the F-number and the angle of view in the zoom data is millimeter (mm). Also, Stop denotes an aperture stop.

Moreover, WE denotes a wide angle end, ST denotes an intermediate focal length state, and TE denotes a telephoto end.

In data of focal length of each lens unit, focal lengths f1, f2, f3, f4, f5, and f6 (hereinafter, 'focal lengths f1 to f6') in each lens unit are indicated. Unit of focal length is millimeter (mm).

EXAMPLE 1

| Surface data | | | | |
|---|---|---|---|---|
| Surface no. | r | d | nd | νd |
| 1 | 161.8625 | 4.385 | 1.48749 | 70.23 |
| 2 | -939.1645 | 0.150 | | |
| 3 | 73.7720 | 5.204 | 1.49700 | 81.54 |
| 4 | 252.3629 | 0.150 | | |
| 5 | 76.4145 | 2.500 | 1.80000 | 29.84 |
| 6 | 47.9471 | 1.555 | | |
| 7 | 49.2297 | 6.796 | 1.49700 | 81.54 |
| 8 | 315.6860 | D8 (Variable) | | |
| 9 | 208.6397 | 5.191 | 1.91082 | 35.25 |
| 10 | -42.8331 | 1.600 | 1.69700 | 48.52 |
| 11 | 25.0886 | 2.709 | 1.92286 | 18.90 |
| 12 | 32.7854 | 4.591 | | |
| 13 | -36.2846 | 1.500 | 1.83481 | 42.71 |
| 14 | 135.2384 | D14 (Variable) | | |
| 15 (Stop) | ∞ | 1.250 | | |
| 16* | 29.9169 | 4.096 | 1.74320 | 49.29 |
| 17* | -9370.4409 | 3.777 | | |
| 18 | 39.8922 | 5.573 | 1.43875 | 94.93 |
| 19 | -32.6290 | 0.150 | | |
| 20 | 84.7715 | 1.400 | 1.90366 | 31.32 |
| 21 | 18.6481 | 3.264 | | |
| 22 | 48.7115 | 3.498 | 1.49700 | 81.54 |
| 23 | -63.3717 | 0.150 | | |
| 24* | 24.4196 | 3.565 | 1.58313 | 59.38 |
| 25* | 536.4898 | D25 (Variable) | | |
| 26 | -128.6809 | 1.200 | 1.74320 | 49.29 |
| 27* | 16.0684 | D27 (Variable) | | |
| 28 | -137.3219 | 1.200 | 1.48749 | 70.23 |
| 29 | 63.8881 | D29 (Variable) | | |
| 30 | 56.6262 | 4.565 | 1.76200 | 40.10 |
| 31 | -41.8597 | 25.763 | | |
| 32 | ∞ | 4.000 | 1.51633 | 64.14 |
| 33 | ∞ | 0.800 | | |
| Image plane (Image pickup surface) | ∞ | | | |

| Aspherical surface data |
|---|

16th surface

K = 0
A4 = 9.1265E-06, A6 = 4.0231E-08, A8 = 1.1599E-10,
A10 = 0.0000E+00

17th surface

K = 0
A4 = 3.2233E-05, A6 = 5.2116E-08, A8 = 1.5473E-10,
A10 = 0.0000E+00

24th surface

K = 0
A4 = 6.4394E-06, A6 = 1.5321E-08, A8 = 0.0000E+00,
A10 = 0.0000E+00

25th surface

K = 0
A4 = -1.0054E-05, A6 = -3.1844E-09, A8 = 0.0000E+00,
A10 = 0.0000E+00

27th surface

K = -0.8643
A4 = 8.3394E-06, A6 = -5.1963E-09, A8 = 0.0000E+00,
A10 = 0.0000E+00

| | WE | ST | TE |
|---|---|---|---|
| Zoom data | | | |
| Focal length | 40.80 | 77.50 | 147.00 |
| Fno | 2.88 | 2.88 | 2.88 |

-continued

| | | | | |
|---|---|---|---|---|
| φ | 20.64 | 21.21 | 22.80 | |
| Angle of field (2ω) | 29.55° | 15.53° | 8.24° | |
| IH | 10.82 | 10.82 | 10.82 | |
| BF | 29.20 | 29.20 | 29.20 | in air |
| Lens total length | 151.88 | 151.88 | 151.88 | in air |
| Unit separation (infinite) | | | | |
| D8 | 1.000 | 17.531 | 30.023 | |
| D14 | 39.858 | 19.827 | 1.716 | |
| D25 | 2.500 | 3.760 | 2.667 | |
| D27 | 6.127 | 6.403 | 16.258 | |
| D29 | 3.179 | 5.143 | 2.000 | |
| Unit separation (a distance between an object and an image is 0.7 m) | | | | |
| D0 | 546.080 | 546.080 | 546.080 | |
| D8 | 1.000 | 17.531 | 30.023 | |
| D14 | 39.858 | 19.827 | 1.716 | |
| D25 | 3.072 | 5.863 | 9.475 | |
| D27 | 6.734 | 3.868 | 3.321 | |
| D29 | 2.000 | 5.575 | 8.129 | |

Unit focal length

| | |
|---|---|
| f1 | 92.809 |
| f2 | −26.387 |
| f3 | 23.823 |
| f4 | −19.153 |
| f5 | −89.268 |
| f6 | 32.231 |

EXAMPLE 2

Surface data

| Surface no. | r | d | nd | νd |
|---|---|---|---|---|
| 1 | 224.1379 | 4.079 | 1.48749 | 70.23 |
| 2 | −385.1974 | 0.150 | | |
| 3 | 57.8744 | 5.093 | 1.49700 | 81.54 |
| 4 | 133.2050 | 0.150 | | |
| 5 | 67.9609 | 2.500 | 1.90366 | 31.32 |
| 6 | 44.2704 | 1.949 | | |
| 7 | 45.7334 | 6.628 | 1.49700 | 81.54 |
| 8 | 263.9719 | D8 (Variable) | | |
| 9 | 128.2550 | 5.588 | 1.91082 | 35.25 |
| 10 | −47.3000 | 1.600 | 1.69700 | 48.52 |
| 11 | 23.9824 | 2.664 | 1.92286 | 18.90 |
| 12 | 30.5465 | 5.390 | | |
| 13 | −36.0447 | 1.500 | 1.83481 | 42.71 |
| 14 | 119.3580 | D14 (Variable) | | |
| 15 (Stop) | ∞ | 1.250 | | |
| 16 | 26.4663 | 3.984 | 1.77250 | 49.60 |
| 17 | 85.0893 | 2.668 | | |
| 18 | 22.5884 | 5.730 | 1.43875 | 94.93 |
| 19 | −213.4986 | 0.538 | | |
| 20 | 1058.5517 | 1.400 | 1.90366 | 31.32 |
| 21 | 23.7500 | 3.082 | | |
| 22 | 18.1277 | 4.245 | 1.49700 | 81.54 |
| 23 | 43.4126 | 0.150 | | |
| 24* | 18.1696 | 3.319 | 1.58313 | 59.38 |
| 25* | −1988.2486 | D25 (Variable) | | |
| 26* | −178.1930 | 1.200 | 1.74320 | 49.29 |
| 27* | 15.3626 | D27 (Variable) | | |
| 28* | 217.1212 | 1.200 | 1.58313 | 59.38 |
| 29* | 37.0521 | D29 (Variable) | | |
| 30 | 43.3556 | 4.912 | 1.80610 | 40.88 |
| 31 | −51.7168 | 25.308 | | |
| 32 | ∞ | 4.000 | 1.51633 | 64.14 |
| 33 | ∞ | 0.800 | | |
| Image plane (Image pickup surface) | ∞ | | | |

Aspherical surface data

24th surface $K = -0.1539$
$A4 = -1.7974E-05, A6 = 9.7260E-08, A8 = -5.2928E-10,$
$A10 = 8.7249E-12$ 25th surface $K = 0$
$A4 = 4.5095E-05, A6 = 3.7225E-08, A8 = 8.2034E-10,$
$A10 = 2.7708E-12$ 26th surface $K = 0$
$A4 = -1.1341E-05, A6 = -6.1677E-08, A8 = 3.5886E-09,$
$A10 = -2.9499E-11$ 27th surface $K = -1.0873$
$A4 = 3.0008E-06, A6 = 7.9340E-08, A8 = 8.4760E-10,$
$A10 = -1.0821E-11$ 28th surface $K = 0$
$A4 = 1.2835E-05, A6 = -5.6280E-09, A8 = 0.0000E+00,$
$A10 = 0.0000E+00$ 29th surface $K = 1.5494$
$A4 = 4.4391E-06, A6 = -1.9963E-08, A8 = 0.0000E+00,$
$A10 = 0.0000E+00$

| | WE | ST | TE | |
|---|---|---|---|---|
| Zoom data | | | | |
| Focal length | 40.80 | 77.96 | 147.00 | |
| Fno | 2.88 | 2.88 | 2.88 | |
| φ | 19.96 | 20.41 | 22.40 | |
| Angle of field (2ω) | 29.53° | 15.53° | 8.26° | |
| IH | 10.82 | 10.82 | 10.82 | |
| BF | 28.75 | 28.75 | 28.75 | in air |
| Lens total length | 151.88 | 151.88 | 151.88 | in air |
| Unit separation (infinite) | | | | |
| D8 | 0.845 | 17.800 | 29.252 | |
| D14 | 40.030 | 19.950 | 1.500 | |
| D25 | 2.006 | 3.060 | 2.163 | |
| D27 | 5.835 | 6.396 | 17.752 | |
| D29 | 3.451 | 4.961 | 1.500 | |
| Unit separation (a distance between an object and an image is 0.7 m) | | | | |
| D0 | 546.700 | 546.700 | 546.700 | |
| D8 | 0.845 | 17.800 | 29.252 | |
| D14 | 40.030 | 19.950 | 1.500 | |
| D25 | 2.616 | 5.188 | 8.818 | |
| D27 | 5.718 | 4.865 | 7.919 | |
| D29 | 2.958 | 4.364 | 4.678 | |

Unit focal length

| | |
|---|---|
| f1 | 94.630 |
| f2 | −26.657 |
| f3 | 23.388 |
| f4 | −18.980 |
| f5 | −76.804 |
| f6 | 29.948 |

EXAMPLE 3

Surface data

| Surface no. | r | d | nd | vd |
|---|---|---|---|---|
| 1 | 78.3067 | 6.287 | 1.48749 | 70.23 |
| 2 | ∞ | 0.150 | | |
| 3 | 58.3004 | 2.357 | 1.80518 | 25.42 |
| 4 | 41.5439 | 1.972 | | |
| 5 | 42.9221 | 7.667 | 1.49700 | 81.54 |
| 6 | 300.3014 | D6 (Variable) | | |
| 7 | 133.8679 | 5.450 | 1.91082 | 35.25 |
| 8 | −52.8170 | 1.600 | 1.69700 | 48.52 |
| 9 | 23.0332 | 2.938 | 1.92286 | 18.90 |
| 10 | 29.6919 | 6.656 | | |
| 11 | −36.1478 | 1.500 | 1.83481 | 42.71 |
| 12 | 139.4883 | D12 (Variable) | | |
| 13 (Stop) | ∞ | 1.250 | | |
| 14 | 25.3033 | 3.844 | 1.77250 | 49.60 |
| 15 | 62.4416 | 3.670 | | |
| 16 | 22.6985 | 5.048 | 1.43875 | 94.93 |
| 17 | −176.8538 | 0.150 | | |
| 18 | 318.8681 | 1.400 | 1.90366 | 31.32 |
| 19 | 23.7626 | 1.958 | | |
| 20 | 21.4425 | 3.394 | 1.49700 | 81.54 |
| 21 | 54.1793 | 0.150 | | |
| 22* | 17.0527 | 4.140 | 1.58313 | 59.38 |
| 23* | −1542.0344 | D23 (Variable) | | |
| 24* | −135.3978 | 1.200 | 1.74320 | 49.29 |
| 25* | 15.9244 | D25 (Variable) | | |
| 26* | 206.7566 | 1.200 | 1.58313 | 59.38 |
| 27* | 34.7332 | D27 (Variable) | | |
| 28 | 44.1850 | 4.638 | 1.80610 | 40.88 |
| 29 | −51.0153 | 28.038 | | |
| 30 | ∞ | 4.000 | 1.51633 | 64.14 |
| 31 | ∞ | 0.800 | | |
| Image plane (Image pickup surface) | ∞ | | | |

Aspherical surface data

22th surface

K = 0.1748
A4 = −1.5676E−05, A6 = 8.9000E−08, A8 = −6.2366E−10, A10 = 8.8579E−12

23th surface

K = 0
A4 = 5.1798E−05, A6 = 9.5847E−08, A8 = 2.9579E−10, A10 = 5.2940E−12

24th surface

K = 0
A4 = −1.0232E−05, A6 = 2.2180E−07, A8 = −2.2239E−09, A10 = 9.2648E−12

25th surface

K = −1.1692
A4 = 7.5244E−06, A6 = 3.2729E−07, A8 = −5.0891E−09, A10 = 3.2451E−11

26th surface

K = 0
A4 = 2.1885E−05, A6 = −6.5454E−08, A8 = 0.0000E+00, A10 = 0.0000E+00

27th surface

K = 2.2748
A4 = 8.2210E−06, A6 = −8.2973E−08, A8 = 0.0000E+00, A10 = 0.0000E+00

Zoom data

| | WE | ST | TE |
|---|---|---|---|
| Focal length | 40.80 | 75.66 | 147.00 |
| Fno | 2.88 | 2.88 | 2.88 |
| ϕ | 20.09 | 20.58 | 22.40 |
| Angle of field (2ω) | 29.67° | 16.05° | 8.26° |
| IH | 10.82 | 10.82 | 10.82 |
| BF | 31.48 | 31.48 | 31.48 in air |
| Lens total length | 151.88 | 151.88 | 151.88 in air |

Unit separation (infinite)

| | | | |
|---|---|---|---|
| D6 | 1.070 | 17.004 | 29.366 |
| D12 | 39.214 | 20.413 | 1.500 |
| D23 | 2.000 | 2.976 | 2.000 |
| D25 | 5.476 | 6.525 | 17.422 |
| D27 | 4.028 | 4.870 | 1.500 |

Unit separation (a distance between an object and an image is 0.7 m)

| | | | |
|---|---|---|---|
| D0 | 546.700 | 546.700 | 546.700 |
| D6 | 1.070 | 17.004 | 29.366 |
| D12 | 39.214 | 20.413 | 1.500 |
| D23 | 2.579 | 4.862 | 8.283 |
| D25 | 5.333 | 5.334 | 7.903 |
| D27 | 3.592 | 4.175 | 4.736 |

Unit focal length

| | |
|---|---|
| f1 | 92.7530 |
| f2 | −26.2412 |
| f3 | 22.7291 |
| f4 | −19.1074 |
| f5 | −71.7747 |
| f6 | 30.0259 |

EXAMPLE 4

Surface data

| Surface no. | r | d | nd | vd |
|---|---|---|---|---|
| 1 | 69.3745 | 6.700 | 1.48749 | 70.23 |
| 2 | 785.6394 | 0.150 | | |
| 3 | 48.6755 | 2.300 | 1.90366 | 31.32 |
| 4 | 34.6475 | 1.860 | | |
| 5 | 34.8467 | 9.880 | 1.43875 | 94.93 |
| 6 | 1099.2010 | D6 (Variable) | | |
| 7 | 127.3560 | 5.350 | 1.91082 | 35.25 |
| 8 | −47.2895 | 1.600 | 1.73400 | 51.47 |
| 9 | 20.9985 | 3.050 | 1.92286 | 20.88 |
| 10 | 29.4558 | 5.310 | | |
| 11 | −37.3953 | 1.500 | 1.83400 | 37.16 |
| 12 | 84.4109 | D12 (Variable) | | |
| 13 (Stop) | ∞ | 1.250 | | |
| 14 | 24.9309 | 4.500 | 1.74400 | 44.78 |
| 15 | 129.7204 | 0.150 | | |
| 16 | 21.1517 | 4.210 | 1.43875 | 94.93 |
| 17 | 58.6483 | 1.400 | 1.90366 | 31.32 |
| 18 | 16.9308 | 1.230 | | |
| 19 | 17.1435 | 4.540 | 1.49700 | 81.54 |
| 20 | 96.2764 | 0.150 | | |
| 21* | 22.1865 | 3.870 | 1.59201 | 67.02 |
| 22* | −161.5787 | D22 (Variable) | | |
| 23* | −77.5338 | 1.200 | 1.72903 | 54.04 |
| 24* | 15.3397 | D24 (Variable) | | |
| 25 | 138.5435 | 1.200 | 1.74077 | 27.79 |
| 26 | 59.4845 | D26 (Variable) | | |
| 27 | 59.3614 | 5.140 | 1.70154 | 41.24 |
| 28 | −36.9207 | 30.495 | | |
| 29 | ∞ | 4.000 | 1.51633 | 64.14 |
| 30 | ∞ | 0.800 | | |
| Image plane (Image pickup surface) | ∞ | | | |

-continued

Aspherical surface data

21th surface

K = 1.2214
A4 = −3.5419E−05, A6 = −5.2461E−08, A8 = −6.2408E−10, A10 = 6.4572E−12

22th surface

K = 0
A4 = 2.0286E−05, A6 = 5.8252E−08, A8 = −3.9011E−10, A10 = 8.5884E−12

23th surface

K = 0
A4 = −2.7251E−05, A6 = 8.4374E−07, A8 = −1.2333E−08, A10 = 6.9429E−11

24th surface

K = −1.5489
A4 = −1.2515E−06, A6 = 8.8028E−07, A8 = −1.5441E−08, A10 = 1.0150E−10

|  | WE | ST | TE |
|---|---|---|---|
| Zoom data | | | |
| Focal length | 40.80 | 76.12 | 147.00 |
| Fno | 2.88 | 2.88 | 2.88 |
| φ | 20.58 | 20.91 | 22.40 |
| Angle of field(2ω) | 29.67° | 15.90° | 8.27° |
| IH | 10.82 | 10.82 | 10.82 |
| BF | 33.93 | 33.93 | 33.93 in air |
| Lens total length | 151.88 | 151.88 | 151.88 in air |
| Unit separation (infinite) | | | |
| D6 | 0.800 | 15.955 | 26.474 |
| D12 | 38.742 | 21.234 | 2.214 |
| D22 | 2.000 | 3.098 | 3.063 |
| D24 | 5.824 | 4.714 | 18.159 |
| D26 | 4.044 | 6.409 | 1.500 |
| Unit separation (a distance between an object and an image is 0.7 m) | | | |
| D0 | 546.700 | 546.700 | 546.700 |
| D6 | 0.800 | 15.955 | 26.474 |
| D12 | 38.742 | 21.234 | 2.214 |
| D22 | 2.530 | 4.909 | 9.527 |
| D24 | 6.391 | 3.344 | 5.111 |
| D26 | 2.947 | 5.968 | 8.084 |
| Unit focal length | | | |
| f1 | 87.7817 | | |
| f2 | −23.7840 | | |
| f3 | 21.2976 | | |
| f4 | −17.4707 | | |
| f5 | −141.6348 | | |
| f6 | 33.1775 | | |

EXAMPLE 5

Surface data

| Surface no. | r | d | nd | vd |
|---|---|---|---|---|
| 1 | 101.0042 | 3.000 | 2.00069 | 25.46 |
| 2 | 70.9827 | 7.100 | 1.49700 | 81.54 |
| 3 | −380.7077 | 0.150 | | |
| 4 | 57.8570 | 6.400 | 1.49700 | 81.54 |
| 5 | 430.3072 | D5 (Variable) | | |
| 6 | 195.2492 | 4.600 | 2.00100 | 29.13 |
| 7 | −53.3154 | 1.600 | 1.70154 | 41.24 |
| 8 | 25.5454 | 2.700 | 1.92286 | 18.90 |
| 9 | 33.9351 | 5.370 | | |
| 10 | −40.0762 | 1.500 | 1.80610 | 40.92 |
| 11 | 71.8286 | D11 (Variable) | | |
| 12 (Stop) | ∞ | 1.250 | | |
| 13 | 23.9404 | 4.940 | 1.73077 | 40.50 |
| 14 | 82.8711 | 0.580 | | |
| 15 | 23.2683 | 5.000 | 1.49700 | 81.54 |
| 16 | 152.1455 | 1.400 | 1.90366 | 31.32 |
| 17 | 17.4316 | 1.220 | | |
| 18 | 17.2959 | 5.350 | 1.49700 | 81.54 |
| 19 | 243.7126 | 0.150 | | |
| 20* | 21.5646 | 4.000 | 1.58313 | 59.38 |
| 21* | −441.2009 | D21 (Variable) | | |
| 22 | −112.2889 | 1.200 | 1.72903 | 54.04 |
| 23* | 17.4561 | D23 (Variable) | | |
| 24* | 49.0253 | 1.200 | 1.63930 | 44.87 |
| 25* | 24.3386 | D25 (Variable) | | |
| 26 | 44.0591 | 5.100 | 1.76200 | 40.10 |
| 27 | −55.1131 | 31.586 | | |
| 28 | ∞ | 4.000 | 1.51633 | 64.14 |
| 29 | ∞ | 0.800 | | |
| Image plane (Image pickup surface) | ∞ | | | |

Aspherical surface data

20th surface

K = 0.4266
A4 = −2.9932E−05, A6 = −1.1345E−07, A8 = −5.3515E−10, A10 = 0.0000E+00

21th surface

K = 0
A4 = 1.5155E−05, A6 = −8.0327E−08, A8 = 7.3673E−11, A10 = 0.0000E+00

23th surface

K = −1.0346
A4 = 1.2152E−05, A6 = −2.2375E−08, A8 = −1.6219E−11, A10 = 0.0000E+00

24th surface

K = 0
A4 = −3.3317E−07, A6 = 0.0000E+00, A8 = 0.0000E+00, A10 = 0.0000E+00

25th surface

K = −0.9997
A4 = −2.8738E−06, A6 = 0.0000E+00, A8 = 0.0000E+00, A10 = 0.0000E+00

|  | WE | ST | TE |
|---|---|---|---|
| Zoom data | | | |
| Focal length | 40.80 | 75.77 | 147.00 |
| Fno | 2.88 | 2.88 | 2.88 |
| φ | 22.00 | 22.36 | 24.62 |
| Angle of field (2ω) | 29.55° | 15.99° | 8.26° |
| IH | 10.82 | 10.82 | 10.82 |
| BF | 35.02 | 35.02 | 35.02 in air |
| Lens total length | 151.88 | 151.88 | 151.88 in air |
| Unit separation (infinite) | | | |
| D 5 | 1.159 | 17.060 | 27.773 |
| D11 | 42.677 | 22.885 | 2.034 |
| D21 | 1.743 | 2.890 | 2.747 |
| D23 | 4.860 | 5.078 | 17.645 |
| D25 | 2.608 | 5.134 | 2.848 |
| Unit separation (a distance between an object and an image is 0.7 m) | | | |
| D 0 | 546.700 | 546.700 | 546.700 |
| D 5 | 1.159 | 17.060 | 27.773 |
| D11 | 42.677 | 22.885 | 2.034 |
| D21 | 2.306 | 4.775 | 9.253 |
| D23 | 4.689 | 4.688 | 7.627 |
| D25 | 2.216 | 3.639 | 6.360 |

| Unit focal length | |
|---|---|
| f1 | 87.231 |
| f2 | −26.381 |
| f3 | 23.304 |
| f4 | −20.642 |
| f5 | −77.066 |
| f6 | 32.863 |

EXAMPLE 6

| Surface data | | | | |
|---|---|---|---|---|
| Surface no. | r | d | nd | νd |
| 1 | 80.1028 | 2.300 | 1.90366 | 31.32 |
| 2 | 50.5589 | 0.770 | | |
| 3 | 50.2860 | 9.560 | 1.49700 | 81.54 |
| 4 | −268.1012 | 0.150 | | |
| 5 | 50.9358 | 7.090 | 1.49700 | 81.54 |
| 6 | 435.6754 | D6 (Variable) | | |
| 7 | 135.7187 | 4.830 | 1.91082 | 35.25 |
| 8 | −44.3532 | 1.600 | 1.69680 | 55.53 |
| 9 | 22.0220 | 2.510 | 1.92286 | 18.90 |
| 10 | 27.5103 | 4.810 | | |
| 11 | −33.5645 | 1.500 | 1.91082 | 35.25 |
| 12 | 96.0071 | D12 (Variable) | | |
| 13 (Stop) | ∞ | 1.250 | | |
| 14 | 25.2663 | 4.020 | 1.72000 | 41.98 |
| 15 | 63.0228 | 4.620 | | |
| 16 | 21.6993 | 5.140 | 1.49700 | 81.54 |
| 17 | 917.3736 | 0.210 | | |
| 18 | 150.9604 | 1.300 | 1.90366 | 31.32 |
| 19 | 21.4446 | 0.720 | | |
| 20 | 22.8790 | 3.300 | 1.49700 | 81.54 |
| 21 | 43.6271 | 0.770 | | |
| 22* | 16.1524 | 4.840 | 1.58313 | 59.38 |
| 23* | −150.0281 | D23 (Variable) | | |
| 24 | −89.8561 | 1.200 | 1.80610 | 40.92 |
| 25* | 16.2721 | D25 (Variable) | | |
| 26 | 47.5311 | 2.070 | 1.92286 | 20.88 |
| 27 | 96.4449 | D27(Variable) | | |
| 28 | 198.8617 | 3.430 | 1.74320 | 49.34 |
| 29* | −54.0459 | 29.525 | | |
| 30 | ∞ | 4.000 | 1.51633 | 64.14 |
| 31 | ∞ | 0.800 | | |
| Image plane (Image pickup surface) | ∞ | | | |

Aspherical surface data

22th surface

K = 0.6222
A4 = −3.8497E−05, A6 = 1.9927E−09, A8 = −1.5528E−09, A10 = 7.7231E−12

23th surface

K = 0
A4 = 4.4637E−05, A6 = 1.4329E−07, A8 = −1.6623E−09, A10 = 1.9521E−11

25th surface

K = −1.0646
A4 = 4.2772E−06, A6 = −9.2262E−09, A8 = −1.0765E−10, A10 = 0.0000E+00

29th surface

K = 4.7637
A4 = 3.1439E−06, A6 = 7.8968E−09, A8 = 0.0000E+00, A10 = 0.0000E+00

| | WE | ST | TE |
|---|---|---|---|
| Zoom data | | | |
| Focal length | 40.80 | 78.17 | 147.00 |
| Fno | 2.88 | 2.88 | 2.88 |
| φ | 21.81 | 21.71 | 23.00 |
| Angle of field(2ω) | 29.56° | 15.47° | 8.30° |
| IH | 10.82 | 10.82 | 10.82 |
| BF | 32.96 | 32.96 | 32.96 in air |
| Lens total length | 151.88 | 151.88 | 151.88 in air |
| Unit separation (infinite) | | | |
| D6 | 1.000 | 15.086 | 23.724 |
| D12 | 36.772 | 19.853 | 2.161 |
| D23 | 2.324 | 3.517 | 2.825 |
| D25 | 3.341 | 8.317 | 9.890 |
| D27 | 7.492 | 4.156 | 12.329 |
| Unit separation (a distance between an object and an image is 0.7 m) | | | |
| D0 | 546.700 | 546.700 | 546.700 |
| D6 | 1.000 | 15.086 | 23.724 |
| D12 | 36.772 | 19.853 | 2.161 |
| D23 | 2.860 | 5.494 | 9.546 |
| D25 | 3.000 | 7.582 | 11.985 |
| D27 | 7.297 | 2.914 | 3.513 |

| Unit focal length | |
|---|---|
| f1 | 73.156 |
| f2 | −21.320 |
| f3 | 22.948 |
| f4 | −17.005 |
| f5 | 99.531 |
| f6 | 57.513 |

EXAMPLE 7

| Surface data | | | | |
|---|---|---|---|---|
| Surface no. | r | d | nd | νd |
| 1 | 69.4893 | 6.860 | 1.48749 | 70.23 |
| 2 | 565.7563 | 0.150 | | |
| 3 | 49.6451 | 2.000 | 1.90366 | 31.32 |
| 4 | 35.4454 | 1.840 | | |
| 5 | 35.6044 | 10.250 | 1.43875 | 94.93 |
| 6 | 1710.8247 | D6 (Variable) | | |
| 7 | 120.4454 | 5.550 | 1.91082 | 35.25 |
| 8 | −44.7712 | 1.600 | 1.73400 | 51.47 |
| 9 | 21.0744 | 3.070 | 1.92286 | 20.88 |
| 10 | 29.6069 | 4.910 | | |
| 11 | −36.2415 | 1.500 | 1.83400 | 37.16 |
| 12 | 86.6417 | D12 (Variable) | | |
| 13 (Stop) | ∞ | 1.250 | | |
| 14 | 27.7712 | 4.350 | 1.74400 | 44.78 |
| 15 | 223.0077 | 1.100 | | |
| 16 | 22.9349 | 3.890 | 1.43875 | 94.93 |
| 17 | 57.3117 | 1.400 | 1.90366 | 31.32 |
| 18 | 17.2397 | 4.250 | 1.49700 | 81.54 |
| 19 | 62.1173 | 0.150 | | |
| 20* | 20.4824 | 4.280 | 1.59201 | 67.02 |
| 21* | −106.2208 | D21 (Variable) | | |
| 22* | −125.2693 | 1.200 | 1.72903 | 54.04 |
| 23* | 16.2033 | D23 (Variable) | | |
| 24 | 87.2011 | 1.200 | 1.78472 | 25.68 |
| 25 | 41.6649 | D25 (Variable) | | |
| 26 | 77.9370 | 4.430 | 1.83400 | 37.16 |
| 27* | −42.7999 | 30.335 | | |
| 28 | ∞ | 4.000 | 1.51633 | 64.14 |
| 29 | ∞ | 0.800 | | |
| Image plane | ∞ | | | |

-continued (Image pickup surface)

Aspherical surface data

20th surface

K = 1.2982
A4 = −3.2411E−05, A6 = −4.4282E−08, A8 = −8.3773E−10, A10 = 5.0168E−12
21th surface K = 0
A4 = 2.4624E−05, A6 = 6.0342E−08, A8 = −7.2514E−10, A10 = 9.1331E−12
22th surface K = 0
A4 = −3.2217E−05, A6 = 9.1917E−07, A8 = −1.2951E−08, A10 = 7.1111E−11
23th surface K = −1.6218
A4 = −2.7136E−06, A6 = 1.0068E−06, A8 = −1.6727E−08, A10 = 1.0766E−10
27th surface

K = 1.0102
A4 = −7.9365E−07, A6 = −1.8224E−09, A8 = 0.0000E+00, A10 = 0.0000E+00

|  | WE | ST | TE |
|---|---|---|---|
| Zoom data | | | |
| Focal length | 40.80 | 77.80 | 147.00 |
| Fno | 2.88 | 2.88 | 2.88 |
| φ | 20.39 | 20.72 | 22.40 |
| Angle of field(2ω) | 29.80° | 15.58° | 8.27° |
| IH | 10.82 | 10.82 | 10.82 |
| BF | 33.77 | 33.77 | 33.77 in air |
| Lens total length | 151.88 | 151.88 | 151.88 in air |
| Unit separation (infinite) | | | |
| D6 | 1.000 | 17.244 | 27.378 |
| D12 | 38.494 | 20.553 | 2.196 |
| D21 | 1.826 | 2.949 | 2.808 |
| D23 | 6.757 | 5.448 | 16.499 |
| D25 | 4.804 | 6.687 | 4.000 |
| Unit separation (a distance between an object and an image is 0.7 m) | | | |
| D0 | 546.700 | 546.700 | 546.700 |
| D6 | 1.000 | 17.244 | 27.378 |
| D12 | 38.494 | 20.553 | 2.196 |
| D21 | 2.387 | 4.989 | 9.772 |
| D23 | 6.978 | 3.527 | 4.962 |
| D25 | 4.022 | 6.568 | 8.573 |
| Unit focal length | | | |
| f1 | | | 89.618 |
| f2 | | | −24.217 |
| f3 | | | 21.418 |
| f4 | | | −19.610 |
| f5 | | | −102.868 |
| f6 | | | 33.689 |

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are aberration diagrams at the time of focusing at an infinite distance of the example 1. FIG. 8A, FIG. 8B, FIG. 8C, and FIG. 8D are aberration diagrams at a wide angle end, FIG. 8E, FIG. 8F, FIG. 8G, and FIG. 8H are aberration diagrams in an intermediate focal length state, FIG. 8I, FIG. 8J, FIG. 8K, and FIG. 8L are aberration diagrams at a telephoto end, and are a spherical aberration (SA), an astigmatism (AS), a distortion (DT), and a chromatic aberration of magnification (CC) respectively, in order from a left side.

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L (hereinafter, 'FIG. 9A to FIG. 9L') are aberration diagrams at the time of focusing at a close distance of the example 1. FIG. 9A, FIG. 9B, FIG. 9C, and FIG. 9D are aberration diagrams at the wide angle end, FIG. 9E, FIG. 9F, FIG. 9G, and FIG. 9H are aberration diagrams in the intermediate focal length state, FIG. 9I, FIG. 9J, FIG. 9K, and FIG. 9L are aberration diagrams at the telephoto end, and are the spherical aberration (SA), the astigmatism (AS), the distortion (DT), and the chromatic aberration of magnification (CC) respectively, in order from the left side. A close distance is a distance when a distance between an object and an image is 0.7 m.

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are aberration diagrams at the time of focusing at an infinite distance of the example 2. FIG. 10A, FIG. 10B, FIG. 10C, and FIG. 10D are aberration diagrams at a wide angle end, FIG. 10E, FIG. 10F, FIG. 10G, and FIG. 10H are aberration diagrams in an intermediate focal length state, FIG. 10I, FIG. 10J, FIG. 10K, and FIG. 10L are aberration diagrams at a telephoto end, and are a spherical aberration (SA), an astigmatism (AS), a distortion (DT), and a chromatic aberration of magnification (CC) respectively, in order from a left side.

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L (hereinafter, 'FIG. 11A to FIG. 11L') are aberration diagrams at the time of focusing at a close distance of the example 2. FIG. 11A, FIG. 11B, FIG. 11C, and FIG. 11D are aberration diagrams at the wide angle end, FIG. 11E, FIG. 11F, FIG. 11G, and FIG. 11H are aberration diagrams in the intermediate focal length state, FIG. 11I, FIG. 11J, FIG. 11K, and FIG. 11L are aberration diagrams at the telephoto end, and are the spherical aberration (SA), the astigmatism (AS), the distortion (DT), and the chromatic aberration of magnification (CC) respectively, in order from the left side.

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams at the time of focusing at an infinite distance of the example 3. FIG. 12A, FIG. 12B, FIG. 12C, and FIG. 12D are aberration diagrams at a wide angle end, FIG. 12E, FIG. 12F, FIG. 12G, and FIG. 12H are aberration diagrams in an intermediate focal length state, FIG. 12I, FIG. 12J, FIG. 12K, and FIG. 12L are aberration diagrams at a telephoto end, and are a spherical aberration (SA), an astigmatism (AS), a distortion (DT), and a chromatic aberration of magnification (CC) respectively, in order from a left side.

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L (hereinafter, 'FIG. 13A to FIG. 13L') are aberration diagrams at the time of focusing at a close distance of the example 3. FIG. 13A, FIG. 13B, FIG. 13C, and FIG. 13D are aberration diagrams at the wide angle end, FIG. 13E, FIG. 13F, FIG. 13G, and FIG. 13H are aberration diagrams in the intermediate focal length state, FIG. 13I, FIG. 13J, FIG. 13K, and FIG. 13L are aberration diagrams at the telephoto end, and are the spherical aberration (SA), the astigmatism (AS), the distortion (DT), and the chromatic aberration of magnification (CC) respectively, in order from the left side.

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are aberration diagrams at the time of focusing at an infinite distance of the example 4. FIG. 14A, FIG. 14B, FIG. 14C, and FIG. 14D are aberration diagrams at a wide angle end, FIG. 14E, FIG. 14F, FIG. 14G, and FIG. 14H are aberration diagrams in an intermediate focal length state, FIG. 14I, FIG. 14J, FIG. 14K, and FIG. 14L are aberration diagrams at a telephoto end, and are a spherical aberration (SA), an astigmatism (AS), a distortion (DT), and a chromatic aberration of magnification (CC) respectively, in order from a left side.

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L (hereinafter, 'FIG. 15A to FIG. 15L') are aberration diagrams at the time of focusing at a close distance of the example 4. FIG. 15A, FIG. 15B, FIG. 15C, and FIG. 15D are aberration diagrams at the wide angle end, FIG. 15E, FIG. 15F, FIG. 15G, and FIG. 15H are aberration diagrams in the intermediate focal length state, FIG. 15I, FIG. 15J, FIG. 15K, and FIG. 15L are aberration diagrams at the telephoto end, and are the spherical aberration (SA), the astigmatism (AS), the distortion (DT), and the chromatic aberration of magnification (CC) respectively, in order from a left side.

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are aberration diagrams at the time of focusing at an infinite distance of the example 5. FIG. 16A, FIG. 16B, FIG. 16C, and FIG. 16D are aberration diagrams at a wide angle end, FIG. 16E, FIG. 16F, FIG. 16G, and FIG. 16H are aberration diagrams in an intermediate focal length state, FIG. 16I, FIG. 16J, FIG. 16K, and FIG. 16L are aberration diagrams at a telephoto end, and are a spherical aberration (SA), an astigmatism (AS), a distortion (DT), and a chromatic aberration of magnification (CC) respectively, in order from a left side.

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L (hereinafter, 'FIG. 17A to FIG. 17L') are aberration diagrams at the time of focusing at a close distance of the example 5. FIG. 17A, FIG. 17B, FIG. 17C, and FIG. 17D are aberration diagrams at the wide angle end, FIG. 17E, FIG. 17F, FIG. 17G, and FIG. 17H are aberration diagrams in the intermediate focal length state, FIG. 17I, FIG. 17J, FIG. 17K, and FIG. 17L are aberration diagrams at the telephoto end, and are the spherical aberration (SA), the astigmatism (AS), the distortion (DT), and the chromatic aberration of magnification (CC) respectively, in order from the left side.

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are aberration diagrams at the time of focusing at an infinite distance of the example 6. FIG. 18A, FIG. 18B, FIG. 18C, and FIG. 18D are aberration diagrams at a wide angle end, FIG. 18E, FIG. 18F, FIG. 18G, and FIG. 18H are aberration diagrams in an intermediate focal length state, FIG. 18I, FIG. 18J, FIG. 18K, and FIG. 18L are aberration diagrams at a telephoto end, and are a spherical aberration (SA), an astigmatism (AS), a distortion (DT), and a chromatic aberration of magnification (CC) respectively, in order from a left side.

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L (hereinafter, 'FIG. 19A to FIG. 19L') are aberration diagrams at the time of focusing at a close distance of the example 6. FIG. 19A, FIG. 19B, FIG. 19C, and FIG. 19D are aberration diagrams at the wide angle end, FIG. 19E, FIG. 19F, FIG. 19G, and FIG. 19H are aberration diagrams in the intermediate focal length state, FIG. 19I, FIG. 19J, FIG. 19K, and FIG. 19L are aberration diagrams at the telephoto end, and are the spherical aberration (SA), the astigmatism (AS), the distortion (DT), and the chromatic aberration of magnification (CC) respectively, in order from a left side.

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are aberration diagrams at the time of focusing at an infinite distance of the example 7. FIG. 20A, FIG. 20B, FIG. 20C, and FIG. 20D are aberration diagrams at a wide angle end, FIG. 20E, FIG. 20F, FIG. 20G, and FIG. 20H are aberration diagrams in an intermediate focal length state, FIG. 20I, FIG. 20J, FIG. 20K, and FIG. 20L are aberration diagrams at a telephoto end, and are a spherical aberration (SA), an astigmatism (AS), a distortion (DT), and a chromatic aberration of magnification (CC) respectively, in order from a left side.

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L (hereinafter, 'FIG. 21A to FIG. 21L') are aberration diagrams at the time of focusing at a close distance of the example 7. FIG. 21A, FIG. 21B, FIG. 21C, and FIG. 21D are aberration diagrams at the wide angle end, FIG. 21E, FIG. 21F, FIG. 21G, and FIG. 21H are aberration diagrams in the intermediate focal length state, FIG. 21I, FIG. 21J, FIG. 21K, and FIG. 21L are aberration diagrams at the telephoto end, and are the spherical aberration (SA), the astigmatism (AS), the distortion (DT), and the chromatic aberration of magnification (CC) respectively, in order from the left side.

The spherical aberration SA is indicated for each of wavelengths 587.6 nm (d-line: solid line), 435.8 nm (g-line: long-dotted line), and 656.3 nm (C-line: short-dotted line). Moreover, the chromatic aberration of magnification CC is indicated for each of wavelengths 435.8 nm (g-line: long-dotted line) and 656.3 nm (C-line: short-dotted line) when the d-line is let to be a base. Furthermore, the astigmatism AS indicated by a solid line is for a sagittal image plane and the astigmatism AS indicated by a broken line is for a meridional image plane. FNO denotes an F-number. FIY denotes an image height.

Values for each component and values for each of conditional expressions (1) to (9) for the examples from the example 1 to the example 7 are shown below.

| Conditional expressions | Example 1 | Example 2 | Example 3 | Example 4 |
|---|---|---|---|---|
| (I)   | 0.688  | 0.686  | 0.692  | 0.693  |
| (II)  | 1.983  | 2.007  | 1.937  | 1.729  |
| (III) | 1.023  | 1.063  | 1.041  | 1.122  |
| (IV)  | 2.195  | 2.240  | 2.157  | 2.072  |
| (A)   | 0.215  | 0.247  | 0.266  | 0.123  |
| (B)   | −0.469 | −0.465 | −0.468 | −0.428 |
| (C)   | 2.188  | 1.882  | 1.759  | 3.471  |
| (1)   | 0.383  | 0.433  | 0.414  | 0.510  |
| (2)   | 3.828  | 3.057  | 2.547  | 2.597  |
| (3)   | 94.93  | 94.93  | 94.93  | 94.93  |
| (4)   | 1.685  | 2.065  | 2.318  | 1.913  |
| (5)   | 1.285  | 1.189  | 1.267  | 1.493  |
| (6)   | 2.740  | 0.708  | 0.712  | 0.399  |
| (6-1) | 2.740  | 0.708  | 0.712  | 0.399  |
| (6-2) |        |        |        |        |
| (7)   | 0.900  | 0.478  | 0.515  | 1.019  |
| (8)   | 3.603  | 3.603  | 3.603  | 3.603  |
| (9)   | 2.88   | 2.88   | 2.88   | 2.88   |

| Conditional expressions | Example 5 | Example 6 | Example 7 |
|---|---|---|---|
| (I)   | 0.528 | 0.753  | 0.774 |
| (II)  | 1.614 | 1.953  | 1.788 |
| (III) | 1.042 | 1.231  | 1.148 |
| (IV)  | 2.012 | 2.369  | 2.070 |
| (A)   | 0.268 | −0.171 | 0.191 |

-continued

|     |        |        |        |
| --- | ------ | ------ | ------ |
| (B) | −0.506 | −0.417 | −0.481 |
| (C) | 1.889  | 2.439  | 2.521  |
| (1) | 0.602  | 0.518  | 0.463  |
| (2) | 2.840  | 2.972  | 2.779  |
| (3) | 81.54  | 81.54  | 94.93  |
| (4) | 1.909  | 2.444  | 1.972  |
| (5) | 1.368  | 1.442  | 1.297  |
| (6) | 0.336  | −0.340 | 0.353  |
| (6-1) | 0.336 |        | 0.353  |
| (6-2) |       | −0.340 |        |
| (7) | 0.540  | 1.312  | 0.657  |
| (8) | 3.603  | 3.603  | 3.603  |
| (9) | 2.88   | 2.88   | 2.88   |

Each of the examples realizes a telephoto zoom lens with a large aperture and an improved performance, which can be used for an application as an interchangeable lens, and which is favorable also for video photography.

FIG. 22 is a cross-sectional view of a single-lens mirrorless camera as an image pickup apparatus in which a small-size CCD (charge coupled device) or a CMOS (complementary metal-oxide semiconductor) is used as an image pickup element, and which uses the zoom lens according to the embodiment. In FIG. 22, reference numeral 1 denotes the single-lens mirrorless camera, 2 denotes an image pickup lens system disposed inside a lens barrel, 3 denotes a mount portion of the lens barrel which makes the image pickup lens system 2 detachable from the single-lens mirrorless camera 1, in which, a screw-type mount or a bayonate-type mount is used. In this example, the bayonate-type mount is used. Moreover, reference numeral 4 denotes an image pickup element surface, and 5 denotes a back monitor.

As the image pickup lens system 2 of the single-lens mirrorless camera 1 having such an arrangement, the zoom lens according to the present embodiment described in examples from the example 1 and the example 7 is to be used.

Figure 23:
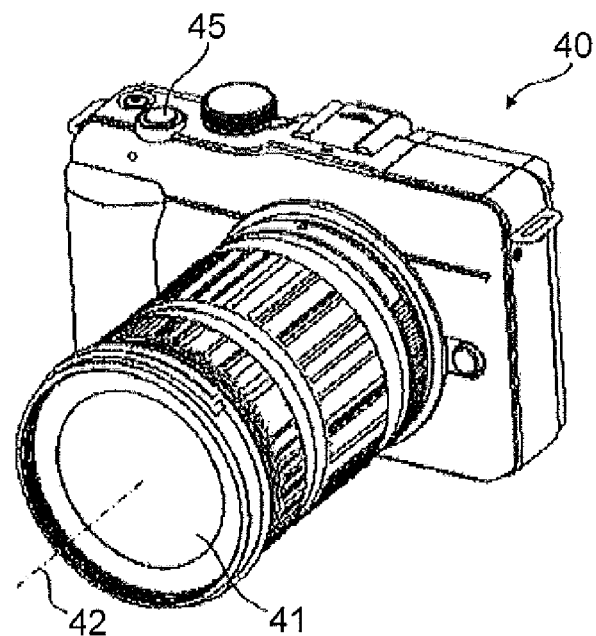
FIG. 23 is a front perspective view showing an appearance of a digital camera of one of the embodiments.
Figure 24:
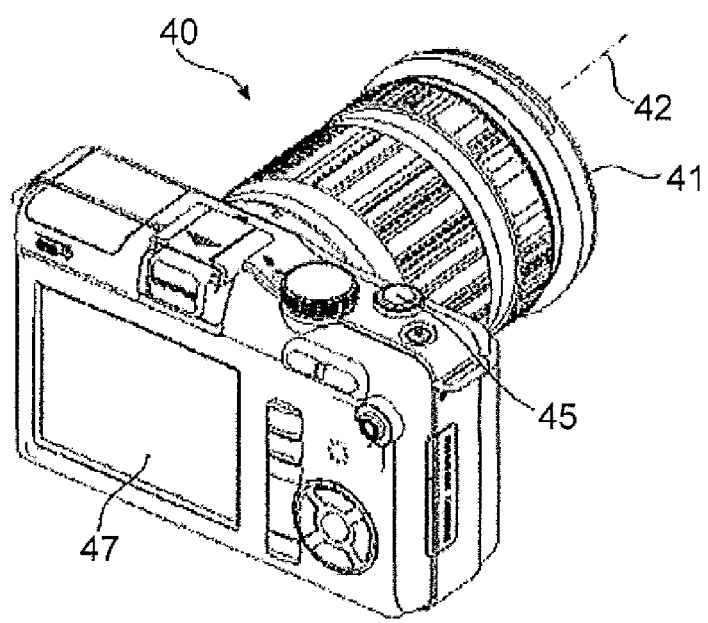
FIG. 24 is a rear perspective view showing an appearance of the digital camera of one of the embodiments.

FIG. 23 and FIG. 24 show conceptual diagrams of a structure of the image pickup apparatus of the present embodiment in which, the zoom lens is incorporated in a photographic optical system 41. FIG. 23 is a front perspective view showing an appearance of a digital camera 40 as the image pickup apparatus, and FIG. 24 is a rear perspective view showing an appearance of the digital camera 40 as the image pickup apparatus.

The digital camera 40 of the embodiment includes the photographic optical system 41 positioned in a photographic optical path 42, a shutter button 45, and a liquid-crystal display monitor 47. As the shutter button 45 disposed on an upper portion of the digital camera 40 is pressed, an image is captured through the photographic optical system 41 such as the lens system of the example 1, in conjunction with the pressing of the shutter button 45. An object image which is formed by the photographic optical system 41 is formed on an image pickup element (an opto-electric conversion surface) which is provided near an image forming surface. The object image received by the image pickup element is displayed on the liquid-crystal display monitor 47 provided on a rear surface of the digital camera 40, as an electronic image, by a processing unit. Moreover, it is possible to record the captured electronic image in a recording unit.

Figure 25:
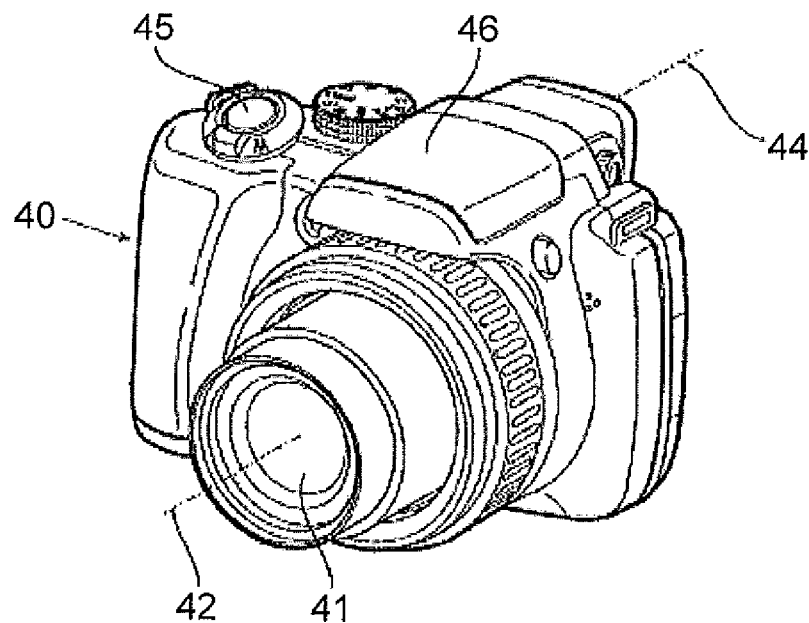
FIG. 25 is a front perspective view showing an appearance of a digital camera of another embodiment.
Figure 26:
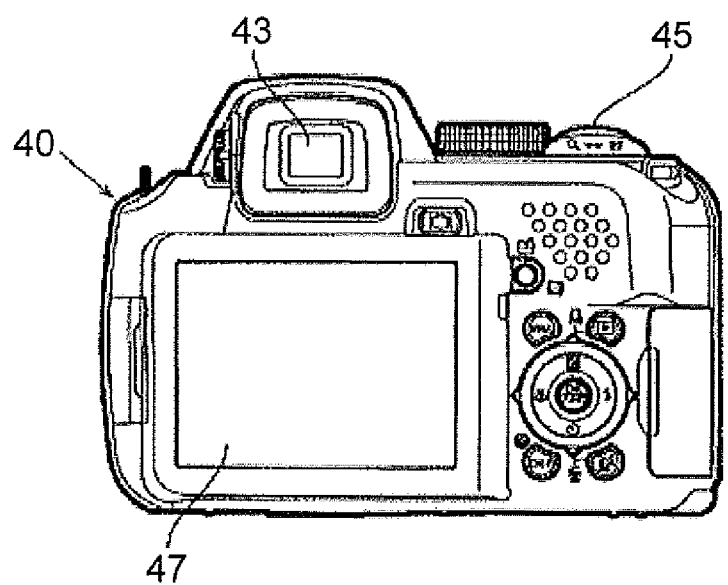
FIG. 26 is a rear view showing an appearance of the digital camera of another embodiment.
Figure 27:
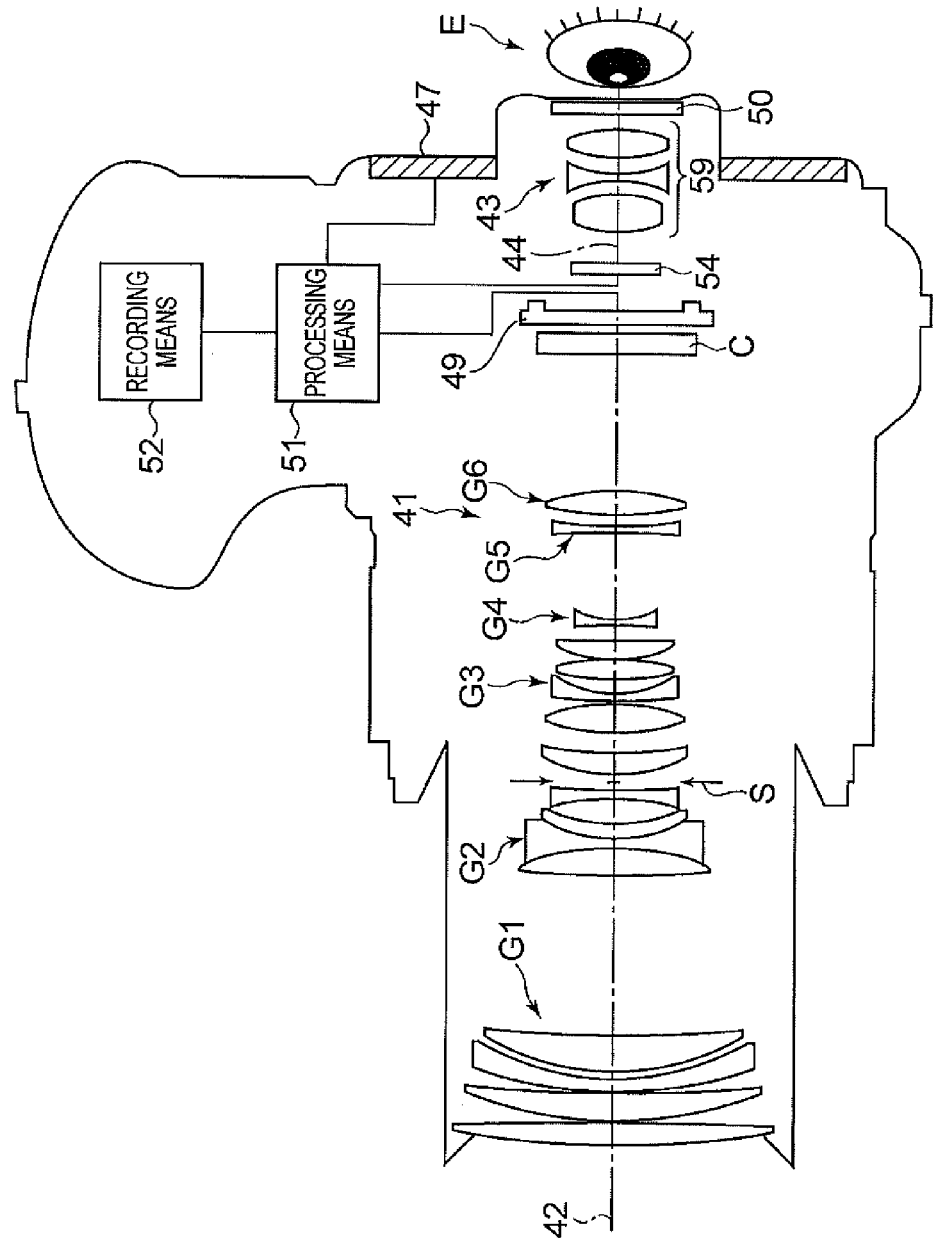
FIG. 27 is a schematic horizontal cross-sectional view showing an arrangement of a digital camera according to another embodiment.

FIG. 25, FIG. 26, and FIG. 27 show conceptual diagrams of a structure of another image pickup apparatus in which, the zoom lens is incorporated in the photographic optical system 41. FIG. 25 is a front perspective view showing an appearance of a digital camera 40, FIG. 26 is a rear view showing an appearance of the digital camera 40, and FIG. 27 is a schematic horizontal cross-sectional view showing an arrangement inside the digital camera 40.

The digital camera 40 in this case, includes a photographic optical system 41 positioned in the photographic optical path 42, a finder optical system 43 positioned in a finder optical path 44, a shutter button 45, a pop-up stroboscope 46, and a liquid-crystal display monitor 47. As the shutter button 45 disposed on an upper portion of the digital camera 40 is pressed, an image is captured through the photographic optical system 41 such as the lens of the example 1, in conjunction with the pressing of the shutter button 45. An object image which is formed by the photographic optical system 41 is formed on an image pickup surface (an opto-electric conversion surface) of a CCD 49 as an image pickup element provided near an image forming surface. The object image received by the CCD 49 is displayed as an electronic image on the liquid-crystal display monitor 47 provided on a rear surface of the digital camera 40, or on a finder image display element 54, via a processing unit 51. Moreover, a recording unit 52 is connected to the processing unit 51, and it is possible to record the captured electronic image.

The recording unit 52 may be provided separately from the processing unit 51, or an arrangement may be made to carry out recording and writing electronically by a flexible disc, a memory card, and an MO (magnetic optical disc).

Furthermore, a finder eye piece 59 is disposed in the finder optical path 44. An object image displayed on the finder image display element 54 is enlarged and adjusted to be easily visible by a viewer by the finder eye piece 59, and is guided to viewer's eyeball E. A cover member 50 is disposed on an emergence side of the finder eye piece 59.

Figure 28:
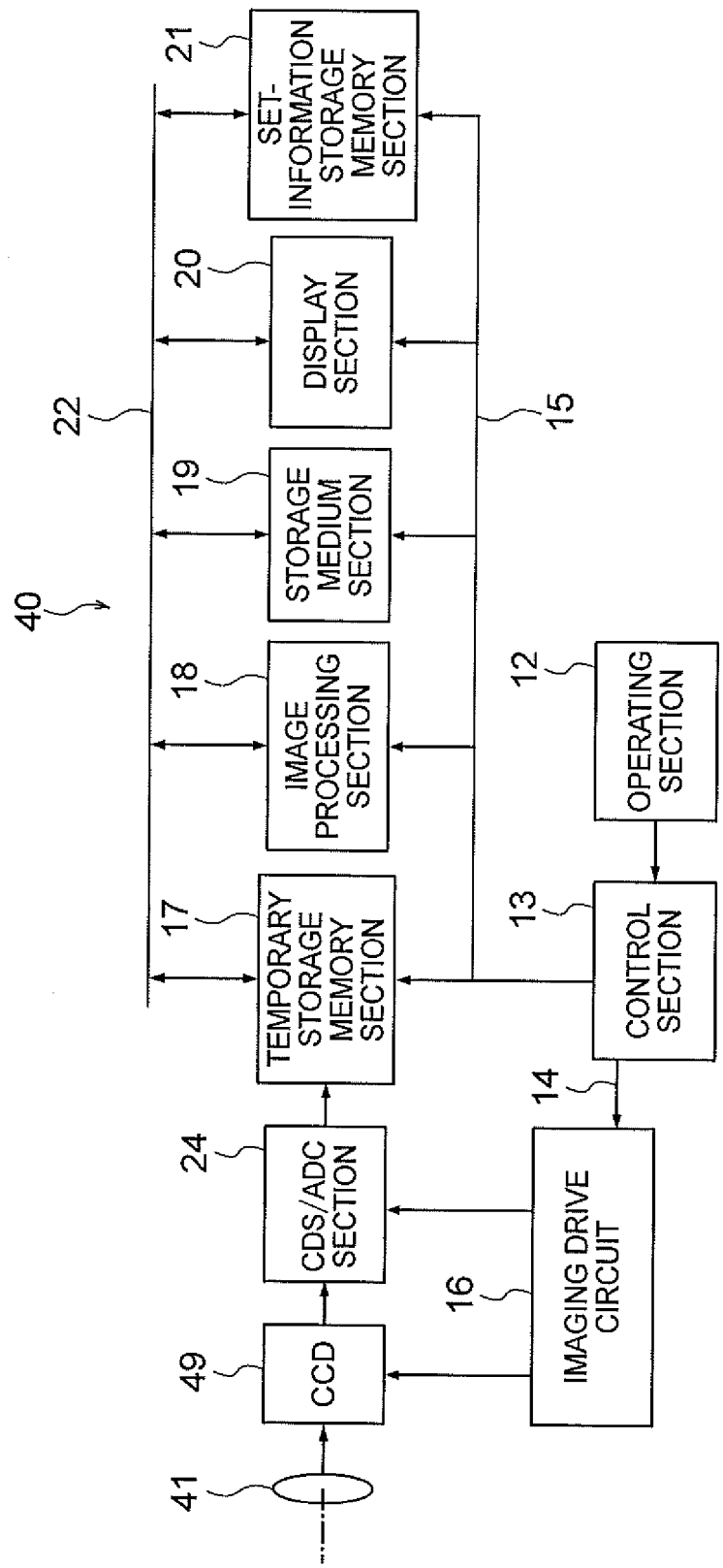
FIG. 28 is a block diagram showing a control arrangement of a digital camera of the present embodiment.

FIG. 28 is a block diagram showing an internal circuit of main components of the digital camera 40 of the present embodiment. In the following description, the above-mentioned processing unit 51 includes sections such as a CDS/ADC (correlated double sampling/analog-to-digital converter) section 24, a temporary storage memory 17, and an image processing section 18, and the storage unit 52 includes sections such as a storage-medium section 19.

As shown in FIG. 28, the digital camera 40 includes an operating section 12, a control section 13 which is connected to the operating section 12, an image pickup drive circuit 16 and the temporary storage memory 17 which are connected to a control signal output port of the control section 13 via buses 14 and 15, the image processing section 18, the storage medium section 19, a display section 20, and a setting-information storage memory section 21.

It is possible to input and output data mutually to and from the temporary storage memory 17, the image processing section 18, the storage medium section 19, the display section 20, and the setting-information storage memory section 21, via a bus 22. Moreover, the CCD 49 and the CDS/ADC section 24 are connected to the image pickup drive circuit 16.

The operating section 12 includes various input buttons and switches, and notifies event information that is input from an outside (by a user of the camera) via the input buttons and switches, to the control section 13. The control section 13 is a central processing unit, and has a built-in computer program memory which is not shown in the diagram. The control section 13 controls the overall digital camera 40 according to computer programs stored in the computer program memory.

The CCD 49 is an image pickup element which is controlled and driven by the image pickup drive circuit 16. The CCD 49 converts an amount of light per pixel of an object image formed through the photographic optical system 41 to an electric signal, and outputs to the CDS/ADC section 24.

The CDS/ADC section 24 is a circuit which amplifies the electric signal input from the CCD 49, as well as carries out analog-to-digital conversion thereof. The CDS/ADC section 24 outputs image raw data (bayer data, hereinafter called as RAW data) which is subjected to amplification and analog-to-digital conversion, to the temporary storage memory 17.

The temporary storage memory 17 is a buffer including a memory such as an SDRAM (synchronous dynamic random access memory), and is a memory unit which stores temporarily the RAW data output from the CDS/ADC section 24. The image processing section 18 is a circuit which reads the RAW data stored in the temporary storage memory 17 or the RAW data stored in the storage-medium section 19, and carries out electrically various image processing based on image-quality parameters specified in the control section 13.

The storage-medium section 19 has a storage medium in the form of a card or a stick including a memory such as a flash memory, installed detachably. The storage-medium section 19 stores and holds the RAW data transferred from the temporary storage memory 17 and image data that has been subjected to image processing in the image processing section 18 in these flash memories.

The display section 20 includes a liquid-crystal display monitor 47, and displays the RAW data that is captured, and image data and operation menu. The setting-information storage memory section 21 includes a ROM (read only memory) section in which, various image-quality parameters are stored in advance, and a RAM (random access memory) section which stores the image-quality parameters read from the ROM section by an input operation on the operating section 12.

By using the zoom lens according to the example as the photographic optical system 41, it is possible to let the digital camera 40 configured in such manner to be an image pickup apparatus which is suitable for video photography while being bright and small-sized with an improved performance.

Various embodiments of the present invention have been described heretofore. However, the present invention is not restricted to the embodiments described, and embodiments which are arranged by combining appropriately the arrangements in the embodiments are also within the scope of the present invention. A lens which is not shown in the diagrams of the aforementioned examples, and which does not have a practical refractive power may be disposed in any lens unit or outside any lens unit.

According to the examples, it is possible to provide a zoom lens which includes six lens units, and which is advantageous for an improved performance.

What is claimed is:

1. A zoom lens comprising in order from an object side to an image side:
    a first lens unit having a positive refractive power;
    a second lens unit having a negative refractive power;
    a third lens unit having a positive refractive power;
    a fourth lens unit having a negative refractive power;
    a fifth lens unit which includes a lens; and
    a sixth lens unit having a positive refractive power, wherein:
    a distance between the first lens unit and the second lens unit widens more at a telephoto end than at a wide angle end,
    a distance between the first lens unit and the third lens unit narrows more at the telephoto end than at the wide angle end,
    a distance between the second lens unit and the third lens unit narrows more at the telephoto end than at the wide angle end,
    a distance between the third lens unit and the fourth lens unit changes at the time of zooming from the wide angle end to the telephoto end,
    a distance between the fourth lens unit and the fifth lens unit changes at the time of zooming from the wide angle end to the telephoto end, and
    a distance between the fifth lens unit and the sixth lens unit changes at the time of zooming from the wide angle end to the telephoto end.

2. The zoom lens according to claim 1, wherein:
    a position of the first lens unit is stationary at the time of zooming from the wide angle end to the telephoto end, and
    the second lens unit, the third lend unit, the fourth lens unit, and the fifth lens unit move at the time of zooming from the wide angle end to the telephoto end.

3. The zoom lens according to claim 1, wherein a position of the first lens unit is stationary at the time of zooming from the wide angle end to the telephoto end.

4. The zoom lens according to claim 1, wherein the third lens unit is positioned at the object side at the telephoto end with respect to the wide angle end.

5. The zoom lens according to claim 4, wherein the third lens unit satisfies the following conditional expression (1)

$$0.2 < \Delta G3/f3 < 1 \quad (1)$$

where,
$\Delta G3$ denotes an amount of displacement of the third lens unit, at a position at the telephoto end with respect to the wide angle end, where the displacement to an object side is plus, and
f3 denotes a focal length of the third lens unit.

6. The zoom lens according to claim 1, further comprising:
    an aperture stop which is disposed between the second lens unit and the fourth lens unit, and which moves toward the object side at the telephoto end with respect to the wide angle end.

7. The zoom lens according to claim 6, wherein the aperture stop is disposed between the second lens unit and the third lens unit.

8. The zoom lens according to claim 6, wherein an aperture size of the aperture stop when the F-number is the minimum is larger, at the telephoto end than at the wide angle end.

9. The zoom lens according to claim 1, wherein the fourth lens unit and the fifth lens unit move at the time of zooming from the wide angle end to the telephoto end.

10. The zoom lens according to claim 1, wherein the fourth lens unit and the fifth lens unit move at the time of a focusing operation.

11. The zoom lens according to claim 10, wherein
    the fifth lens unit has a negative refractive power, and
    a direction of movement at the time of focusing at a close distance when at the wide angle end, and a direction of movement at the time of focusing at a close distance when at the telephoto end differ for the fourth lens unit and the fifth lens unit.

12. The zoom lens according to claim 1, wherein the fifth lens unit has a negative refractive power.

13. The zoom lens according to claim 12, wherein in fifth lens unit comprises one negative lens, and the following conditional expression (6-1) is satisfied $$0 < (r51 - r52)/(r51 + r52) < 4 \quad (6-1)$$

where,
r51 denotes a paraxial radius of curvature of an object-side surface of the lens in the fifth lens unit, and r52 denotes a paraxial radius of curvature of an image-side surface of the lens in the fifth lens unit.

14. The zoom lens according to claim 1, wherein the fifth lens unit has a positive refractive power.

15. The zoom lens according to claim 14, wherein the fifth lens unit comprises one positive lens, and the following conditional expression (6-2) is satisfied $$-1 < (r51-r52)/(r51+r52) < 0 \quad (6\text{-}2)$$

where,
r51 denotes a paraxial radius of curvature of an object-side surface of the lens in the fifth lens unit, and
r52 denotes a paraxial radius of curvature of an image-side surface of the lens in the fifth lens unit.

16. The zoom lens according to claim 1, wherein a position of the sixth lens unit is stationary at the time of zooming from the wide angle end to the telephoto end.

17. The zoom lens according to claim 1, wherein
the second lens unit includes in order from the object side to the image side, cemented triplet lens component of a positive lens, a negative lens, and a positive lens; and wherein, the lens component is a lens block having only two refracting surfaces namely, an object-side surface and an image-side surface, which are in contact with air in an optical path.

18. The zoom lens according to the claim 17, wherein the negative lens in the cemented triplet lens component satisfies the following conditional expression (2)

$$1 < (r21-r22)/(r21+r22) < 5 \quad (2)$$

where,
r21 denotes a paraxial radius of curvature of an object-side surface of the negative lens in the cemented triplet lens component, and
r22 denotes a paraxial radius of curvature of an image-side surface of the negative lens in the cemented triplet lens component.

19. The zoom lens according to claim 1, wherein the third lens unit includes a negative lens and a plurality of positive lenses, and the following conditional expressions (3) and (4) are satisfied $$75 < vd3p < 100 \quad (3)$$

$$1.4 \leq f31p/f3 < 3.7 \quad (4)$$

where,
vd3p denotes the maximum value of Abbe's number with reference to a d-line for all the positive lenses in the third lens unit,
f31p denotes a focal length of the positive lens nearest to the object side in the third lens unit, and
f3 denotes a focal length of the third lens unit.

20. The zoom lens according to claim 1, wherein the fourth lens unit comprises one negative lens, and satisfies the following conditional expression (5)

$$0.6 < (r41-r42)/(r41+r42) < 2 \quad (5)$$

where,
r41 denotes a paraxial radius of curvature of an object-side surface of the negative lens in the fourth lens unit, and
r42 denotes a paraxial radius of curvature of an image-side surface of the negative lens in the fourth lens unit.

21. The zoom lens according to claim 1, wherein the fifth lens unit comprises one lens, and satisfies the following conditional expression (6)

$$-1 < (r51-r52)/(r51+r52) < 4 \quad (6)$$

where,
r51 denotes a paraxial radius of curvature of an object-side surface of the lens in the fifth lens unit, and
r52 denotes a paraxial radius of curvature of an image-side surface of the lens in the fifth lens unit.

22. The zoom lens according to claim 1, wherein at the time of focusing from an infinite focusing state to a close focusing state, at the telephoto end, the fourth lens unit and the fifth lens unit move satisfying the following conditional expression (7)

$$0.2 < |\Delta G5(T)/\Delta G4(T)| < 2 \quad (7)$$

where,
ΔG4(T) denotes an amount of movement at the time of focusing from an infinite focusing state to a close focusing state of the fourth lens unit at the telephoto end, and
ΔG5(T) denotes an amount of movement at the time of focusing from an infinite focusing state to a close focusing state of the fifth lens unit at the telephoto end.

23. The zoom lens according to claim 1, wherein the following conditional expressions (8) and (9) are satisfied $$3.2 < ft/fw < 6 \quad (8)$$

$$1.4 < FNO(T) < 3.2 \quad (9)$$

where,
ft denotes a focal length at the telephoto end of the zoom lens,
fw denotes a focal length at the wide angle end of the zoom lens, and
FNO(T) denotes an F-number at the telephoto end for the zoom lens.

24. The zoom lens according to claim 1, further comprising:
an aperture stop which is disposed between the second lens unit and the fourth lens unit, and which determines an F-number, wherein
the following conditional expressions (I) and (II) are satisfied $$0.2 < D36W/\phi AW < 1.5 \quad (I)$$

$$1.0 < DS6W/\phi AW < 2.8 \quad (II)$$

where,
D36W denotes a distance along an optical axis from an image-side surface of the third lens unit up to an object-side surface of the sixth lens unit, at the wide angle end,
DS6W denotes a distance along the optical axis from the aperture stop up to the object-side surface of the sixth lens unit, at the wide angle end, and
φAW denotes the maximum diameter of an aperture when the F-number of the aperture stop is the minimum, at the wide angle end.

25. The zoom lens according to claim 24, wherein the following conditional expressions (III) and (IV) are satisfied $$0.6 < D36T/\phi AT < 2.3 \quad (III)$$

$$1.4 < DS6T/\phi AT < 3.5 \quad (IV)$$

where,
D36T denotes a distance along an optical axis from an image-side surface of the third lens unit up an object-side surface of the sixth lens unit, at the telephoto end,
DS6T denotes a distance along the optical axis from the aperture stop up to the object-side surface of the sixth lens unit, at the telephoto end, and
φAT denotes the maximum diameter of an aperture when the F-number of the aperture stop is the minimum, at the telephoto end.

26. The zoom lens according to claim 24, wherein the fourth lens unit and the fifth lens unit move at the time of a focusing operation.

27. The zoom lens according to claim 24, wherein the aperture stop moves toward the object side more at the telephoto end than at the wide angle end.

28. The zoom lens according to claim 1, the following conditional expression (A) is satisfied $$-0.8 < f4/f5 < 1.2 \quad (A)$$

where,
f4 denotes a focal length of the fourth lens unit, and
f5 denotes a focal length of the fifth lens unit.

29. The zoom lens according to claim 28, wherein the fourth lens unit and the fifth lens unit satisfy the following conditional expressions (B) and (C)

$$-0.7 < f4/fw < -0.3 \quad (B)$$

$$1.0 < |f5|/fw < 5.0 \quad (C)$$

where,
fw denotes a focal length at the wide angle end of the zoom lens.

30. A zoom lens comprising in order from an object side to an image side:
a first lens unit having a positive refractive power;
a second lens unit having a negative refractive power;
a third lens unit having a positive refractive power;
a fourth lens unit having a negative refractive power;
a fifth lens unit which includes a lens; and
a sixth lens unit having a positive refractive power, wherein:
a distance between the first lens unit and the second lens unit widens more at a telephoto end than at a wide angle end,
a distance between the second lens unit and the third lens unit narrows more at the telephoto end than at the wide angle end,
a distance between the third lens unit and the fourth lens unit changes at the time of zooming from the wide angle end to the telephoto end,
a distance between the fourth lens unit and the fifth lens unit changes at the time of zooming from the wide angle end to the telephoto end,
a distance between the fifth lens unit and the sixth lens unit changes at the time of zooming from the wide angle end to the telephoto end, and
a position of the first lens unit is stationary at the time of zooming from the wide angle end to the telephoto end.

31. The zoom lens according to claim 30, wherein the third lens unit is positioned at the object side at the telephoto end with respect to the wide angle end.

32. The zoom lens according to claim 30, wherein the third lens unit satisfies the following conditional expression (1)

$$0.2 < \Delta G3/f3 < 1 \quad (1)$$

where,
ΔG3 denotes an amount of displacement of the third lens unit, at a position at the telephoto end with respect to the wide angle end, where the displacement to an object side is plus, and
f3 denotes a focal length of the third lens unit.

33. The zoom lens according to claim 30, further comprising:
an aperture stop which is disposed between the second lens unit and the fourth lens unit, and which moves toward the object side at the telephoto end with respect to the wide angle end.

34. The zoom lens according to claim 33, wherein the aperture stop is disposed between the second lens unit and the third lens unit.

35. The zoom lens according to claim 33, wherein an aperture size of the aperture stop when the F-number is the minimum is larger, at the telephoto end than at the wide angle end.

36. The zoom lens according to claim 30, wherein the fourth lens unit and the fifth lens unit move at the time of zooming from the wide angle end to the telephoto end.

37. The zoom lens according to claim 30, wherein the fourth lens unit and the fifth lens unit move at the time of a focusing operation.

38. The zoom lens according to claim 37, wherein;
the fifth lens unit has a negative refractive power, and
a direction of movement at the time of focusing at a close distance when at the wide angle end, and a direction of movement at the time of focusing at a close distance when at the telephoto end differ for the fourth lens unit and the fifth lens unit.

39. The zoom lens according to claim 30, wherein the fifth lens unit has a negative refractive power.

40. The zoom lens according to claim 39, wherein in fifth lens unit comprises one negative lens, and the following conditional expression (6-1) is satisfied $$0 < (r51 - r52)/(r51 + r52) < 4 \quad (6-1)$$

where,
r51 denotes a paraxial radius of curvature of an object-side surface of the lens in the fifth lens unit, and
r52 denotes a paraxial radius of curvature of an image-side surface of the lens in the fifth lens unit.

41. The zoom lens according to claim 30, wherein the fifth lens unit has a positive refractive power.

42. The zoom lens according to claim 41, wherein the fifth lens unit comprises one positive lens, and the following conditional expression (6-2) is satisfied $$-1 < (r51 - r52)/(r51 + r52) < 0 \quad (6-2)$$

where,
r51 denotes a paraxial radius of curvature of an object-side surface of the lens in the fifth lens unit, and
r52 denotes a paraxial radius of curvature of an image-side surface of the lens in the fifth lens unit.

43. The zoom lens according to claim 30, wherein a position of the sixth lens unit is stationary at the time of zooming from the wide angle end to the telephoto end.

44. The zoom lens according to claim 30, wherein
the second lens unit includes in order from the object side to the image side, cemented triplet lens component of a positive lens, a negative lens, and a positive lens; and
wherein, the lens component is a lens block having only two refracting surfaces namely, an object-side surface and an image-side surface, which are in contact with air in an optical path.

45. The zoom lens according to the claim 44, wherein the negative lens in the cemented triplet lens component satisfies the following conditional expression (2)

$$1 < (r21 - r22)/(r21 + r22) < 5 \quad (2)$$

where,
r21 denotes a paraxial radius of curvature of an object-side surface of the negative lens in the cemented triplet, and
r22 denotes a paraxial radius of curvature of an image-side surface of the negative lens in the cemented triplet lens component.

46. The zoom lens according to claim 32, wherein the third lens unit includes a negative lens and a plurality of positive lenses, and the following conditional expressions (3) and (4) are satisfied $$75 < vd3p < 100 \quad (3)$$

$$1.4 < f31p/f3 < 3.7 \quad (4)$$

where, vd3p denotes the maximum value of Abbe's number with reference to a d-line for all the positive lenses in the third lens unit, f31p denotes a focal length of the positive lens nearest to the object side in the third lens unit, and f3 denotes a focal length of the third lens unit.

47. The zoom lens according to claim 30, wherein the fourth lens unit comprises one negative lens, and satisfies the following conditional expression (5)

$$0.6 < (r41 - r42)/(r41 + r42) < 2 \quad (5)$$

where, r41 denotes a paraxial radius of curvature of an object-side surface of the negative lens in the fourth lens unit, and r42 denotes a paraxial radius of curvature of an image-side surface of the negative lens in the fourth lens unit.

48. The zoom lens according to claim 30, wherein the fifth lens unit comprises one lens, and satisfies the following conditional expression (6)

$$-1 < (r51 - r52)/(r51 + r52) < 4 \quad (6)$$

where, r51 denotes a paraxial radius of curvature of an object-side surface of the lens in the fifth lens unit, and r52 denotes a paraxial radius of curvature of an image-side surface of the lens in the fifth lens unit.

49. The zoom lens according to claim 30, wherein at the time of focusing from an infinite focusing state to a close focusing state, at the telephoto end, the fourth lens unit and the fifth lens unit move satisfying the following conditional expression (7)

$$0.2 < |\Delta G5(T)/\Delta G4(T)| < 2 \quad (7)$$

where, $\Delta G4(T)$ denotes an amount of movement at the time of focusing from an infinite focusing state to a close focusing state of the fourth lens unit at the telephoto end, and $\Delta G5(T)$ denotes an amount of movement at the time of focusing from an infinite focusing state to a close focusing state of the fifth lens unit at the telephoto end.

50. The zoom lens according to claim 30, wherein the following conditional expressions (8) and (9) are satisfied $$3.2 < ft/fw < 6 \quad (8)$$

$$1.4 < FNO(T) < 3.2 \quad (9)$$

where, ft denotes a focal length at the telephoto end of the zoom lens, fw denotes a focal length at the wide angle end of the zoom lens, and FNO(T) denotes an F-number at the telephoto end for the zoom lens.

51. The zoom lens according to claim 30, further comprising:

an aperture stop which is disposed between the second lens unit and the fourth lens unit, and which determines an F-number, wherein the following conditional expressions (I) and (II) are satisfied $$0.2 < D36W/\phi AW < 1.5 \quad (I)$$

$$1.0 < DS6W/\phi AW < 2.8 \quad (II)$$

where,

D36W denotes a distance along an optical axis from an image-side surface of the third lens unit up to an object-side surface of the sixth lens unit, at the wide angle end, DS6W denotes a distance along the optical axis from the aperture stop up to the object-side surface of the sixth lens unit, at the wide angle end, and $\phi AW$ denotes the maximum diameter of an aperture when the F-number of the aperture stop is the minimum, at the wide angle end.

52. The zoom lens according to claim 51, wherein the following conditional expressions (III) and (IV) are satisfied $$0.6 < D36T/\phi AT < 2.3 \quad (III)$$

$$1.4 < DS6T/\phi AT < 3.5 \quad (IV)$$

where,

D36T denotes a distance along an optical axis from an image-side surface of the third lens unit up an object-side surface of the sixth lens unit, at the telephoto end, DS6T denotes a distance along the optical axis from the aperture stop up to the object-side surface of the sixth lens unit, at the telephoto end, and $\phi AT$ denotes the maximum diameter of an aperture when the F-number of the aperture stop is the minimum, at the telephoto end.

53. The zoom lens according to claim 51, wherein the fourth lens unit and the fifth lens unit move at the time of a focusing operation.

54. The zoom lens according to claim 51, wherein the aperture stop moves toward the object side more at the telephoto end than at the wide angle end.

55. The zoom lens according to claim 30, the following conditional expression (A) is satisfied $$-0.8 < f4/f5 < 1.2 \quad (A)$$

where, f4 denotes a focal length of the fourth lens unit, and f5 denotes a focal length of the fifth lens unit.

56. The zoom lens according to claim 55, wherein the fourth lens unit and the fifth lens unit satisfy the following conditional expressions (B) and (C)

$$-0.7 < f4/fw < -0.3 \quad (B)$$

$$1.0 < |f5|/fw < 5.0 \quad (C)$$

where, fw denotes a focal length at the wide angle end of the zoom lens.

57. A zoom lens comprising in order from an object side to an image side:

a first lens unit having a positive refractive power;

a second lens unit having a negative refractive power;

a third lens unit having a positive refractive power;

a fourth lens unit having a negative refractive power;

a fifth lens unit which includes a lens;

a sixth lens unit having a positive refractive power; and an aperture stop which is disposed between the second lens unit and the fourth lens unit, and which moves toward the object side at the telephoto end with respect to the wide angle end, wherein:

a distance between the first lens unit and the second lens unit widens more at a telephoto end than at a wide angle end, a distance between the second lens unit and the third lens unit narrows more at the telephoto end than at the wide angle end, a distance between the third lens unit and the fourth lens unit changes at the time of zooming from the wide angle end to the telephoto end, a distance between the fourth lens unit and the fifth lens unit changes at the time of zooming from the wide angle end to the telephoto end, and a distance between the fifth lens unit and the sixth lens unit changes at the time of zooming from the wide angle end to the telephoto end.

58. The zoom lens according to claim 57, wherein the aperture stop is disposed between the second lens unit and the third lens unit.

59. The zoom lens according to claim 57, wherein an aperture size of the aperture stop when the F-number is the minimum is larger, at the telephoto end than at the wide angle end.

60. The zoom lens according to claim 57, wherein the fourth lens unit and the fifth lens unit move at the time of zooming from the wide angle end to the telephoto end.

61. The zoom lens according to claim 57, wherein the fourth lens unit and the fifth lens unit move at the time of a focusing operation.

62. The zoom lens according to claim 61, wherein;
the fifth lens unit has a negative refractive power, and
a direction of movement at the time of focusing at a close distance when at the wide angle end, and a direction of movement at the time of focusing at a close distance when at the telephoto end differ for the fourth lens unit and the fifth lens unit.

63. The zoom lens according to claim 57, wherein the fifth lens unit has a negative refractive power.

64. The zoom lens according to claim 63, wherein in fifth lens unit comprises one negative lens, and the following conditional expression (6-1) is satisfied $$0 < (r51 - r52)/(r51 + r52) < 4 \quad (6\text{-}1)$$

where,
r51 denotes a paraxial radius of curvature of an object-side surface of the lens in the fifth lens unit, and
r52 denotes a paraxial radius of curvature of an image-side surface of the lens in the fifth lens unit.

65. The zoom lens according to claim 64, wherein the fifth lens unit comprises one positive lens, and the following conditional expression (6-2) is satisfied $$-1 < (r51 - r52)/(r51 + r52) < 0 \quad (6\text{-}2)$$

where,
r51 denotes a paraxial radius of curvature of an object-side surface of the lens in the fifth lens unit, and
r52 denotes a paraxial radius of curvature of an image-side surface of the lens in the fifth lens unit.

66. The zoom lens according to claim 57, wherein the fifth lens unit has a positive refractive power.

67. The zoom lens according to claim 57, wherein a position of the sixth lens unit is stationary at the time of zooming from the wide angle end to the telephoto end.

68. The zoom lens according to claim 57, wherein
the second lens unit includes in order from the object side to the image side, cemented triplet lens component of a positive lens, a negative lens, and a positive lens;

and wherein, the lens component is a lens block having only two refracting surfaces namely, an object-side surface and an image-side surface, which are in contact with air in an optical path.

69. The zoom lens according to the claim 68, wherein the negative lens in the cemented triplet lens component satisfies the following conditional expression (2)

$$1 < (r21 - r22)/(r21 + r22) < 5 \quad (2)$$

where,
r21 denotes a paraxial radius of curvature of an object-side surface of the negative lens in the cemented triplet, and
r22 denotes a paraxial radius of curvature of an image-side surface of the negative lens in the cemented triplet lens component.

70. The zoom lens according to claim 57, wherein the third lens unit includes a negative lens and a plurality of positive lenses, and the following conditional expressions (3) and (4) are satisfied $$75 < vd3p < 100 \quad (3)$$

$$1.4 < f31p/f3 < 3.7 \quad (4)$$

where,
vd3p denotes the maximum value of Abbe's number with reference to a d-line for all the positive lenses in the third lens unit,
f31p denotes a focal length of the positive lens nearest to the object side in the third lens unit, and
f3 denotes a focal length of the third lens unit.

71. The zoom lens according to claim 57, wherein the fourth lens unit comprises one negative lens, and satisfies the following conditional expression (5)

$$0.6 < (r41 - r42)/(r41 + r42) < 2 \quad (5)$$

where,
r41 denotes a paraxial radius of curvature of an object-side surface of the negative lens in the fourth lens unit, and
r42 denotes a paraxial radius of curvature of an image-side surface of the negative lens in the fourth lens unit.

72. The zoom lens according to claim 57, wherein the fifth lens unit comprises one lens, and satisfies the following conditional expression (6)

$$-1 < (r51 - r52)/(r51 + r52) < 4 \quad (6)$$

where,
r51 denotes a paraxial radius of curvature of an object-side surface of the lens in the fifth lens unit, and
r52 denotes a paraxial radius of curvature of an image-side surface of the lens in the fifth lens unit.

73. The zoom lens according to claim 57, wherein at the time of focusing from an infinite focusing state to a close focusing state, at the telephoto end, the fourth lens unit and the fifth lens unit move satisfying the following conditional expression (7)

$$0.2 < |\Delta G5(T)/\Delta G4(T)| < 2 \quad (7)$$

where,
ΔG4(T) denotes an amount of movement at the time of focusing from an infinite focusing state to a close focusing state of the fourth lens unit at the telephoto end, and
ΔG5(T) denotes an amount of movement at the time of focusing from an infinite focusing state to a close focusing state of the fifth lens unit at the telephoto end.

74. The zoom lens according to claim 57, wherein the following conditional expressions (8) and (9) are satisfied $$3.2 < ft/fw < 6 \quad (8)$$

$$1.4 < FNO(T) < 3.2 \quad (9)$$

where,
ft denotes a focal length at the telephoto end of the zoom lens,
fw denotes a focal length at the wide angle end of the zoom lens, and
FNO(T) denotes an F-number at the telephoto end for the zoom lens.

75. The zoom lens according to claim 57, further comprising:
an aperture stop which is disposed between the second lens unit and the fourth lens unit, and which determines an F-number, wherein
the following conditional expressions (I) and (II) are satisfied $$0.2 < D36W/\phi AW < 1.5 \quad (I)$$

$$1.0 < DS6W/\phi AW < 2.8 \quad (II)$$

where,
D36W denotes a distance along an optical axis from an image-side surface of the third lens unit up to an object-side surface of the sixth lens unit, at the wide angle end,
DS6W denotes a distance along the optical axis from the aperture stop up to the object-side surface of the sixth lens unit, at the wide angle end, and
$\phi$AW denotes the maximum diameter of an aperture when the F-number of the aperture stop is the minimum, at the wide angle end.

76. The zoom lens according to claim 75, wherein the following conditional expressions (III) and (IV) are satisfied $$0.6 < D36T/\phi AT < 2.3 \quad (III)$$

$$1.4 < DS6T/\phi AT < 3.5 \quad (IV)$$

where,
D36T denotes a distance along an optical axis from an image-side surface of the third lens unit up an object-side surface of the sixth lens unit, at the telephoto end,
DS6T denotes a distance along the optical axis from the aperture stop up to the object-side surface of the sixth lens unit, at the telephoto end, and
$\phi$AT denotes the maximum diameter of an aperture when the F-number of the aperture stop is the minimum, at the telephoto end.

77. The zoom lens according to claim 75, wherein the fourth lens unit and the fifth lens unit move at the time of a focusing operation.

78. The zoom lens according to claim 75, wherein the aperture stop moves toward the object side more at the telephoto end than at the wide angle end.

79. The zoom lens according to claim 57, the following conditional expression (A) is satisfied $$-0.8 < f4/f5 < 1.2 \quad (A)$$

where,
f4 denotes a focal length of the fourth lens unit, and
f5 denotes a focal length of the fifth lens unit.

80. The zoom lens according to claim 79, wherein the fourth lens unit and the fifth lens unit satisfy the following conditional expressions (B) and (C)

$$-0.7 < f4/fw < -0.3 \quad (B)$$

$$1.0 < |f5|/fw < 5.0 \quad (C)$$

where,
fw denotes a focal length at the wide angle end of the zoom lens.

* * * * *